US009336658B2

(12) United States Patent
Suda

(10) Patent No.: US 9,336,658 B2
(45) Date of Patent: May 10, 2016

(54) GAMING MACHINE AND METHODS OF ALLOWING A PLAYER TO PLAY GAMING MACHINES HAVING MODIFIABLE REEL FEATURES

(71) Applicant: Konami Gaming, Inc., Las Vegas, NV (US)

(72) Inventor: Satoshi Suda, Henderson, NV (US)

(73) Assignee: KONAMI GAMING, INC., Las Vegas, NV (US)

( * ) Notice: Subject to any disclaimer, the term of this patent is extended or adjusted under 35 U.S.C. 154(b) by 19 days.

(21) Appl. No.: 13/833,343

(22) Filed: Mar. 15, 2013

(65) Prior Publication Data

US 2014/0274287 A1 Sep. 18, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/34*** | (2006.01) |
| ***G07F 17/32*** | (2006.01) |

(52) U.S. Cl.

CPC ............ *G07F 17/34* (2013.01); *G07F 17/3213* (2013.01); *G07F 17/3267* (2013.01)

(58) Field of Classification Search

CPC .. G07F 17/32; G07F 17/3264; G07F 17/3267

USPC ...................................................... 463/16, 20

See application file for complete search history.

(56) References Cited

U.S. PATENT DOCUMENTS

| | | | |
|---|---|---|---|
| 4,037,845 | A | 7/1977 | Hooker |
| 5,722,891 | A | 3/1998 | Inoue |
| 5,976,016 | A | 11/1999 | Moody et al. |
| 5,997,401 | A | 12/1999 | Crawford |
| 6,186,894 | B1 | 2/2001 | Mayeroff |

(Continued)

FOREIGN PATENT DOCUMENTS

| | | | |
|---|---|---|---|
| CN | 1879133 | A | 12/2006 |
| CN | 102810232 | A | 12/2012 |

(Continued)

OTHER PUBLICATIONS

Patent Examination Report No. 1; AU 2014204424; Date of issue: Sep. 5, 2014.

(Continued)

*Primary Examiner* — Milap Shah
*Assistant Examiner* — Jason Pinheiro
(74) *Attorney, Agent, or Firm* — Howard & Howard Attorneys PLLC

(57) ABSTRACT

A method of allowing a player to play a gaming machine is described herein. The game includes a plurality of reels, each reel having a reel strip. The method includes initiating a primary game, responsively spinning the reels, randomly determining an outcome of the primary game and responsively stopping the reels to display the primary game. The method includes detecting if a triggering condition occurs in the primary game outcome, the triggering condition being defined as the at least one trigger symbol being displayed in at least one reel of the plurality of reels in the primary game outcome, and responsively modifying a reel feature of a reel strip associated with the at least one reel to generate an outcome of a secondary game including the modified reel strip.

8 Claims, 59 Drawing Sheets

(56) References Cited

U.S. PATENT DOCUMENTS

| | | | |
|---|---|---|---|
| 6,220,959 B1 | 4/2001 | Holmes, Jr. et al. | |
| 6,241,607 B1 | 6/2001 | Payne et al. | |
| 6,270,412 B1 | 8/2001 | Crawford et al. | |
| 6,394,902 B1 | 5/2002 | Glavich et al. | |
| 6,413,162 B1 | 7/2002 | Baerlocher et al. | |
| 6,471,208 B2 | 10/2002 | Yoseloff et al. | |
| 7,530,894 B1 | 5/2009 | Marks et al. | |
| 2004/0026854 A1 | 2/2004 | Inoue | |
| 2004/0248641 A1 | 12/2004 | Jarvis et al. | |
| 2005/0075163 A1 | 4/2005 | Cuddy et al. | |
| 2006/0058097 A1 | 3/2006 | Berman et al. | |
| 2006/0183534 A1 | 8/2006 | Yoshimi | |
| 2007/0167215 A1 | 7/2007 | Majima et al. | |
| 2008/0113743 A1* | 5/2008 | Dunaevsky et al. | 463/20 |
| 2008/0318664 A1 | 12/2008 | Saito | |
| 2010/0124969 A1 | 5/2010 | Hughes et al. | |
| 2012/0231869 A1 | 9/2012 | Englman et al. | |
| 2014/0106846 A1* | 4/2014 | Avin et al. | 463/20 |

FOREIGN PATENT DOCUMENTS

| | | |
|---|---|---|
| EP | 1 785 957 A1 | 5/2007 |
| EP | 2 472 484 A1 | 7/2012 |
| JP | 10-328351 | 12/1998 |
| JP | 3330338 | 8/1999 |
| JP | 2002-191782 | 7/2002 |

OTHER PUBLICATIONS

Patent Examination Report No. 1—Date of Issue Nov. 13, 2013.

Patent Examination Report No. 1 (AU 2013231158)—Date of Issue Dec. 19, 2013.

Patent Examination Report No. 1 (AU 2014208295); Date of Issue: Dec. 12, 2014.

Patent Examination Report No. 2 (AU 2014208295); Date of Issue: May 12, 2015.

Notice of Reasons for Rejection (JP14-5779-KNM); Dispatched on Oct. 6, 2015.

Macao Office Action with English Translation (MO I/1338); Dispatched on Nov. 11, 2015.

Final Office Action Mailed Nov. 23, 2015 (U.S. Appl. No. 14/032,118).

* cited by examiner

FIG. 54

| | |
|---|---|
| ONE PAIR | THERE ARE TWO CARDS (ONE PAIR) OF SAME NUMBER IN FIVE CARDS |
| TWO PAIR | THERE ARE TWO KINDS OF PAIRS IN FIVE CARDS |
| THREE CARD | THERE ARE THREE CARDS OF SAME NUMBER IN FIVE CARDS |
| STRAIGHT | NUMBERS ARE SEQUENTIAL IN ALL FIVE CARDS |
| FLUSH | ALL FIVE CARDS ARE OF SAME SUIT (SPADES, DIAMONDS, ETC.) |
| FULL HOUSE | THERE IS ONE PAIR AND THREE CARD IN FIVE CARDS |
| FOUR OF A KIND | THERE ARE FOUR SAME NUMBERS IN FIVE CARDS |
| STRAIGHT FLUSH | BOTH FLUSH AND STRAIGHT ARE IN FIVE CARDS |

GAMING MACHINE AND METHODS OF ALLOWING A PLAYER TO PLAY GAMING MACHINES HAVING MODIFIABLE REEL FEATURES

TECHNICAL FIELD

The subject matter disclosed herein relates generally to gaming machines and more particularly, to an apparatus and method for allowing players to play gaming machines having modifiable reel features.

BACKGROUND OF THE INVENTION

Gaming machines, such as slot machines, are a cornerstone of the gaming industry. At least some known gaming machines include a video display device to display a reel game that includes a plurality of reels, wherein each reel includes a plurality of symbols. During game play, the gaming machine accepts a wager from a player, the player selects one or more paylines, the gaming machine spins the reels, and sequentially stops each reel to display the generated combination of symbols on the reels. The gaming machine then awards the player an award based on the combination of symbols orientated along the selected payline.

At least some known gaming machines display bonus features based on the appearance of a special symbol in the game outcome. Known bonus features may include additional free games including additional spins of the game reels, or an additional award multiplier. The additional free games are conducted using the same reels having the same symbols that are used in the base game. Over time, during game play, the player may become frustrated because the additional free games are conducted using the same reels, thus the chance of winning an award is not significantly increased during the free games. Accordingly, new features are necessary to appeal to player interest and enhance excitement in order to entice longer play and increased profitability. The present invention is directed to satisfying these needs.

BRIEF SUMMARY OF THE INVENTION

In one aspect of the present invention, a method of providing a slot game to a player is provided. The slot game includes a plurality of reels, wherein each reel has a reel strip including a plurality of symbol positions and a plurality of game symbols displayed in each of the symbol positions in a predetermined order. The method includes allowing the player to make a wager on the game, initiating a primary game and responsively spinning the reels, and randomly determining an outcome of the primary game and responsively stopping the reels to display the outcome of the primary game. The outcome of the primary game is displayed in a grid and the spinning reels are visible in the grid during play of the game. The method also includes detecting if a triggering condition occurs in the primary game outcome, wherein the triggering condition being defined as a trigger symbol being displayed in at least one reel of the plurality of reels in the primary game outcome, and responsively modifying a reel feature of a reel strip associated with the at least one reel to generate an outcome of a secondary game including the modified reel strip.

In another aspect of the present invention, a gaming machine is provided. The gaming machine includes a display device for displaying a game, a user input device configured to generate a signal indicative of a player's selection input, and a controller that is coupled to the display device and the user input device. The game includes a plurality of reels, wherein each reel has a reel strip that includes a plurality of symbol positions and a plurality of game symbols displayed in each of the symbol positions in a predetermined order. The controller allows the player to make a wager on the game, initiates a primary game and responsively spins the reels. The controller randomly determines an outcome of the primary game, responsively stops the reels to display the outcome in a grid, and awards a first award to the player based on the primary game outcome. The controller detects if a triggering condition occurs in the primary game outcome, wherein the triggering condition is defined as a trigger symbol being displayed in at least one reel of the plurality of reels in the primary game outcome. The controller responsively modifies a reel feature of a reel strip associated with the at least one reel to generate an outcome of a secondary game that includes the modified reel strip and awards a second award to the player based on the secondary game outcome.

In yet another aspect of the present invention, a system is provided. The system includes a plurality of gaming devices and a system controller coupled to each gaming device. Each gaming device includes a user input device for accepting a player's selection input and a display device for allowing a player to play a game. The game includes a plurality of reels, wherein each reel has a reel strip that includes a plurality of symbol positions and a plurality of game symbols displayed in each of the symbol positions in a predetermined order. The system controller initiates a primary game based on the player selection input, responsively spins the reels, randomly determines an outcome of the primary game, stops the reels to display the outcome of the primary game in a grid, and awards a first award to the player based on the primary game outcome. The system controller detects if a triggering condition occurs in the primary game outcome, wherein the triggering condition is defined as a trigger symbol being displayed in at least one reel of the plurality of reels in the primary game outcome. The system controller responsively modifies a reel feature of a reel strip associated with the at least one reel to generate an outcome of a secondary game including the modified reel strip and awards a second award to the player based on the secondary game outcome.

In view of the above-noted disadvantages, one of one of the objects of the present invention is to provide a gaming machine that can raise a player's interest in a game by carrying out diverse re-drawing in accordance with progress of the game.

A gaming machine has a display unit having a first display area adapted to displaying a plurality of types of symbols and a second display area adapted to displaying specific symbols that have specific interrelationships, a draw control unit that determines the specific symbols to display for a first game, wherein after the specific symbols are displayed in the first game, the draw control unit controls the display of the specific symbols in the second display area at determined times of subsequent the games, and determines areas in which the specific symbols are not displayed in the first display area and wherein the plurality of types of symbols displayed in the first display area are predetermined by the draw control unit as symbols that have no specific interrelationship.

In this way, in a case where a predetermined symbol is stopped in a plurality of display regions, the display regions that display the predetermined symbols are set as specific display regions. Because drawing at predetermined times of games after the first game is carried out from a plurality of types of symbols that are to be displayed, there is a specific relationship among the symbols in each game and the symbols having a predetermined relationship are displayed in the specific display region. By this, an independent drawing result (re-drawing result) which differs from the general display region, can be displayed in the specific display region. The display regions other than the specific display regions are set as general display regions. In the general display regions, because drawing is carried out from a plurality of types of symbols that are to be displayed without the symbols having a predetermined relationship, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

A gaming machine has a display unit that performs a flash display of symbols in which symbols are moved in a constant fashion in a plurality of display areas and subsequently stops movement of the symbols to display all or a portion of the symbols in a substantially stationary fashion, a draw control unit that determines specific symbols to be stopped in a specific display area for a first game, and wherein the specific symbols stopped in one of the display areas, are different types of the symbols from those in other display areas in a predetermined number of times after the specific symbols are displayed in the first game.

In this way, in a case where a predetermined symbol is stop displayed in a plurality of display regions, the display regions that stop display the predetermined symbols are set as specific display regions, and because drawing in a predetermined times of games after the first game is carried out from a plurality of types of symbols that are to be displayed, so that the symbols are displayed the same in each game, same symbols are displayed in the specific display region. By this, an independent re-drawing result which differs from the general display region can be displayed in the specific display region. The display regions other than the specific display regions are set as general display regions. In the general display regions, because drawing is carried out from a plurality of type of symbols that are to be displayed, so that symbols are independently displayed, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

The gaming machine has wherein when one of the symbols in the other display areas is the same type of symbol as displayed in the specific display area, the draw control unit changes the symbols in the other display areas to the specific symbols, and controls all of the specific symbols to be same type of the symbols in a predetermined number of times after modified.

In this way, in a case where a symbol to be displayed in whichever ordinary display region is the same symbol as the symbol that is to be displayed in the specific display region, because the ordinary display region that has drawn the same symbols as the symbol that is to be displayed in the specific display region is changed to the specific display region, in a predetermined number of feature games after the next time, the number of regions that structure the specific display region increases every time the same symbol is drawn in the ordinary display region. Then, because a drawing from a plurality of types of symbols is carried out so that a same symbol is stop displayed in every specific display region including the increased specific display region, the same symbol is stop displayed in the entire specific display region. By this, diverse re-drawing can be carried out in the specific display region. As a result, a strong impression is provided to the player, and it is possible to arouse the player's interest.

The gaming machine has wherein when the symbols in one of the other display areas are in a win situation, the draw control unit modifies one of the other display areas to another specific display area, modifies the symbols in the another specific display area to the specific symbols, and controls all of the specific symbols in the one of the other display areas, being same type of the symbols in a predetermined number of times after modified.

In this way, in a case where a symbol to be displayed in whichever ordinary display region adjacent to the specific display region is the same symbol as the symbol that is to be displayed in the specific display region, because the ordinary display region that is adjacent to the specific display region, and has drawn the same symbols as the symbol that is to be displayed in the specific display region is changed to the specific display region, in a predetermined number of feature games after the next time, the number of regions that structure the specific display region increases every time the same symbol is drawn in the ordinary display region that is adjacent to the specific display region. Then, because a drawing from a plurality of types of symbols is carried out so that a same symbol is stop displayed in every specific display region including the increased specific display region, the same symbol is stop displayed in the entire specific display region. By this, diverse re-drawing can be carried out in the specific display region. As a result, a strong impression is provided to the player, and it is possible to arouse the player's interest.

The gaming machine has wherein at least one of the other display areas is adjacent to the specific display area.

In this way, in a case where a win situation is established in whichever of a plurality of ordinary display regions, during a game of a predetermined number of times, because the ordinary display region that is to establish a win changes to another specific display region independent from the specific display region, the number of specific display regions increases every time a win situation is established in the ordinary display regions. Then, because a drawing from a plurality of types of symbols is carried out so that a same symbol is stop displayed in every specific display, the same symbol is stop displayed respectively in each specific display region, the same symbol is respectively stop displayed in each specific display region. By this, diverse re-drawing can be carried out in the specific display region. As a result, a strong impression is provided to the player, and it is possible to arouse the player's interest.

The gaming machine has wherein the win situation is established when special symbols are displayed in one of the other display areas.

In this way, in a case where a win situation is established in whichever of a plurality of ordinary display regions by a predetermined symbol being displayed, during a game of a predetermined number of times, because the ordinary display region that is to establish a win changes to another specific display region independent from the specific display region, the number of specific display regions increases every time a win situation is established in the ordinary display regions by a predetermined symbol being displayed. Then, because a drawing from a plurality of types of symbols is carried out so that a same symbol is stop displayed in every specific display, the same symbol is stop displayed respectively in each specific display region, the same symbol is respectively stop displayed in each specific display region. By this, diverse re-drawing can be carried out in the specific display region. As a result, a strong impression is provided to the player, and it is possible to arouse the player's interest.

The gaming machine has wherein the draw control unit controls all of the specific symbols in the specific display area and one of the other display areas, being same type of the 10 symbols in a predetermined number of times after modified.

By this structure, in a case where the symbol to be displayed in the specific display regions and the other specific display region are the same, drawing is carried out so that the same symbol is displayed in every specific display region. Namely, the specific display region and the other specific display region display the same symbols by combining, and becoming one specific display region. By this, diverse re-drawing can be carried out in the specific display region. For example, variation of the game activity can be possible by for example, increasing the dividend in accordance with the increase in number of the regions that constitute the specific display region, etc. As a result, the player's interests can be aroused.

A gaming machine has a display unit displaying a plurality of types of symbols, upon starting a game, a draw control unit predetermining a specific symbol display area where specific symbols that establish a plurality of specific prizes are displayed at predetermined times after starting the game, wherein the draw control unit selects the specific symbols for one of the plurality of specific prizes, from a prize group to which the one of the plurality of specific prizes belongs, and predetermines a general display area where other symbols are displayed, wherein the general display area displays the other symbols independently of the specific symbols in each game.

In this way, in a case where a predetermined symbol that establishes a specific win is stop displayed in a plurality of display regions, the display regions that stop display the predetermined symbols that establish a specific win are set as specific display regions in a predetermined times of games from the next game, and because drawing is carried out from a plurality of types of symbols that are to be displayed, so that which ever one win that is the same as a win group that the specific win group belongs to (the group to which the win belongs to) is established in each game, wins can be changed in each game, maintaining a win situation. By this, players feel intrigued, and can raise the player's interest towards the game. The display regions other than the specific display regions are set as general display regions. In the general display regions, because drawing is carried out from a plurality of type of symbols that are to be displayed, so that symbols are independently displayed, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

The gaming machine has wherein when one of the other symbols in the general display area adjacent to the specific display area is the same type of the specific symbols in the specific display area, the draw control unit modifies the general display area adjacent the specific display area correspond to the specific symbol display area, and controls all symbols in the specific symbol display area to establish a prize that belongs to different group from the one of the plurality of specific prizes.

In this way, in a case where a symbol to be displayed in whichever ordinary display region adjacent to the specific display region is the same symbol as the symbol that is to be displayed in the specific display region, because the ordinary display region that is adjacent to the specific display region, and has drawn the same symbols as the symbol that is to be displayed in the specific display region is changed to the specific display region, in a predetermined number of feature games after the next time, the number of regions that structure the specific display region increases every time the same symbol is drawn in the ordinary display region that is adjacent to the specific display region. Then, because a drawing from a plurality of types of symbols is carried out in every specific display region including the increased specific display region, so that at least one win among win groups different from win groups that the specific win belongs to in each game is established. Namely by the number of regions structuring the specific display region increasing, the grading of the wing groups are changed, and players alternate between hope and despair every time the number of regions increase. By this, it is possible to arouse the player's interests towards the game.

BRIEF DESCRIPTION OF THE DRAWINGS

These objects and other objects and advantages of the present invention will become more apparent upon reading of the following detailed description and the accompanying drawings in which:

FIG. 54 is a diagram showing a structure of wins of the gaming machine according to the ninth embodiment.

DETAILED DESCRIPTION OF THE INVENTION

Figure 1:
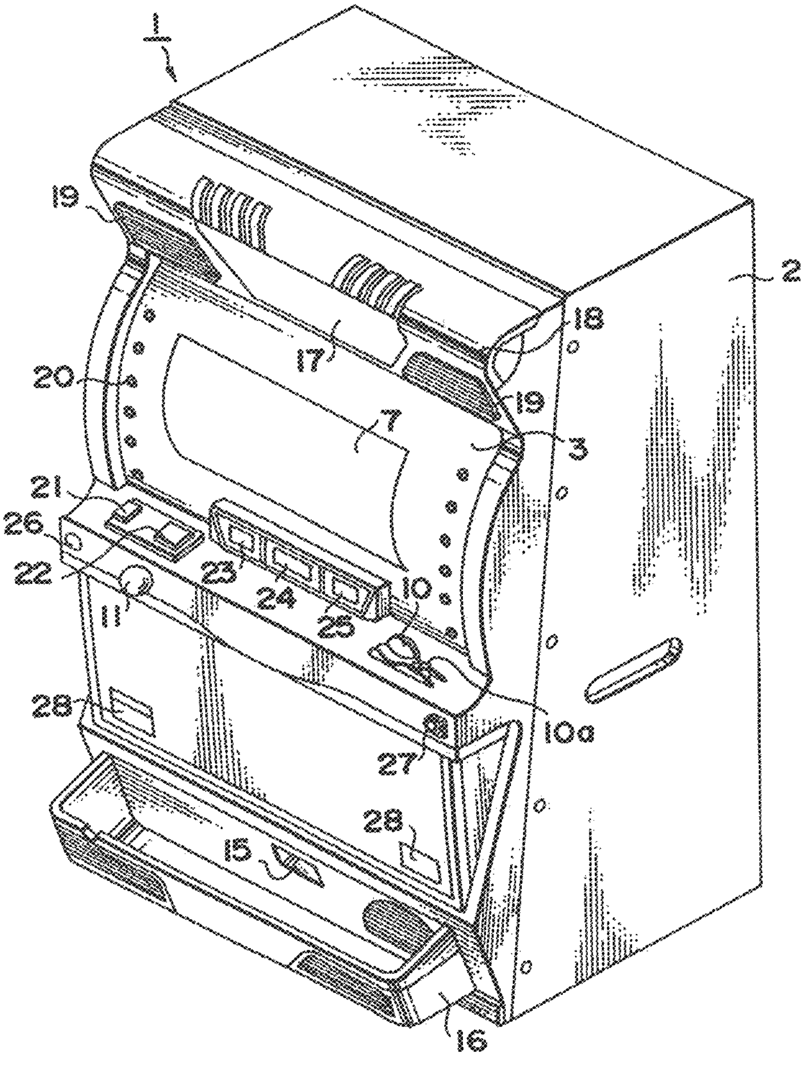
FIG. 1 is a perspective view of the exterior of a gaming machine according to a first embodiment.

With reference to the drawings and in operation, the present invention overcomes at least some of the disadvantages of known gaming machines by providing a gaming machine that displays a game that includes a plurality of reels, each having an associated reel strip, and that modifies a reel feature of a reel strip associated with one or more reels to generate a bonus game outcome. More specifically, the gaming machine generates and displays a primary game outcome and detects if a triggering condition occurs in the primary game outcome. The gaming machine then responsively modifies a reel feature of a reel strip associated with a reel to generate an outcome of a secondary game including the modified reel strip. By providing a gaming machine that modifies a reel feature for use in a bonus game, the player's expectation for achieving a win during the bonus game is increased and the enjoyment of the game is improved. Thus, the amount of time that the game is played by patrons of a gaming establishment is thereby increased.

(1) Definition of Re-Drawing Reel

The purpose of re-drawing is to maintain an established win situation or a situation where particular symbols appear on the reel. One example is a case where three "cherry" symbols match on a slot machine. In this case, a win situation of "three matches" is established. Re-drawing maintains this win situation, and switches the kind of desired symbol to, for example "bar", and "7", etc. Also, re-drawing is to carry out re-drawing of symbols, maintaining a situation where same symbols appear in every position of up, middle, and down of the first to third reels, or maintaining a situation where same symbols appear in positions of each column, assuming that re-drawing is carried out in the first to third reels, in a five-reel slot machine. It is possible that the original symbol is re-drawn. In the case of "in a case where predetermined symbols are displayed stopped to a plurality of display regions, in a predetermined number of games after that game, in special display regions where the predetermined symbols are displayed, in at least game units, drawing is carried out from a plurality of kinds of symbols that are to be displayed having a predetermined relationship among the symbols", "predetermined relationship" corresponds to the above "established win situation, or a situation where symbols appear on the reels".

(2) Re-Drawing Reel

The re-drawing reel is for carrying out the above-discussed re-drawing. Symbol alignment of the re-drawing reel are all the same. By aligning the symbol alignment in a same position, and by rotating or stopping the reels, synchronizing timing and speed, the win situation can be maintained, and re-drawing of symbols can be carried out. A group of a plurality of re-drawing reels that maintain a common win situation will be described as "re-drawing reel group".

(3) Appearance of the Re-Drawing Reel

Appearance of the re-drawing reel is switching of an ordinary reel to a re-drawing reel under a condition that a certain setting condition is established. This setting condition can be for example, appearance of a predetermined symbol. Below, this predetermined symbol will be described as a "trigger symbol". Or, a situation where a predetermined win (for example "BAR-BAR-BAR" and "7-7-7", etc.), being established by a combination of symbols, can be the "condition" of above. Or, in a case where a poker game is carried out, one establishment of the winning combinations, such as shown in FIG. 54, can be the "condition" of above. In a case of a video slot, because the reel is drawn by program-like processing, switching of the reel is easy. Symbol alignment of the ordinary reel and the re-drawing reel may be different. In a case of a rotating drum type reel, because switching is physically difficult, in most cases, the alignment symbol of the ordinary reel and the re-drawing reel are the same. Therefore, "to synchronization control" or "not to synchronization control" becomes the difference in separating the ordinary reel and the re-drawing reel. By changing the symbol alignment and synchronization timing, a plurality of re-drawing reels can be made to appear at the same time.

(4) Increase of the Re-Drawing Reel

Increase of the re-drawing reel is carrying out the increase operation discussed, under the condition that some kind of setting condition is established. Here also, a predetermined symbol appearing, and a predetermined win situation being established by a combination of symbols, can be the setting condition. Also, for example, in a case where a poker game is carried out, one establishment of the winning combinations, such as shown in FIG. 54, can be the "condition" of above.

1. Increase in number of the re-drawing reels included in the re-drawing reel group 2. Increase in number of the re-drawing reel group itself Establishment of a win situation by a combination of a plurality of kinds of symbols may be the condition for the appearance of the re-drawing reel, or the increase of the re-drawing reel. For example, cases where combinations of symbols that express a specific meaning content, are displayed, such as "G" "0" "D" (GOD), and "C" "0" "I" "N" (COIN). The embodiments of the present invention will be described, with reference to the drawings.

(First Embodiment)

Figure 5:
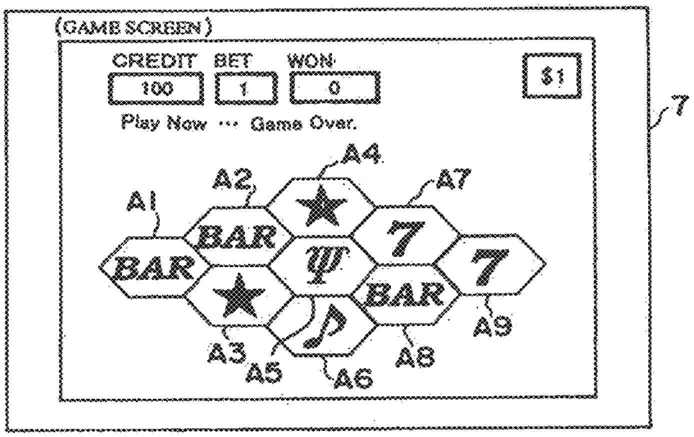
FIG. 5 is a diagram showing a screen display example of the gaming machine according to the first embodiment.
Figure 7:
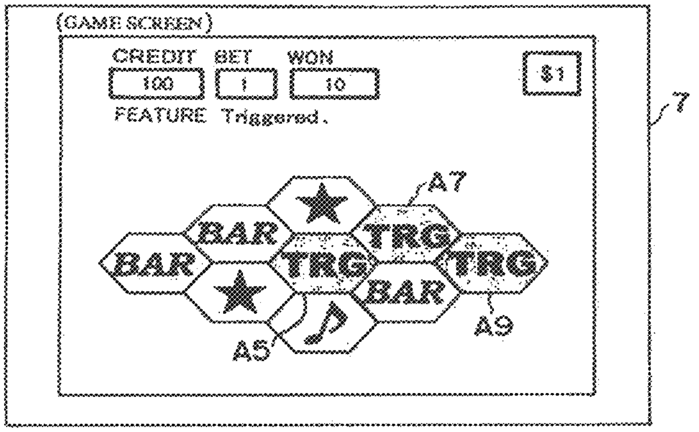
FIG. 7 is a diagram showing a screen display example of the gaming machine according to the first embodiment.

As shown in FIG. 5, a gaming machine according to the first embodiment, uses nine independent hexagon reels A1 to A9 that respectively have different symbol alignments. The hexagon reels A1 to A9 structure a display region. In this gaming machine, if three or more sides of hexagons of a same symbol are adjacent, when each reel stops, it is a win. As shown in FIG. 7, in a case where trigger symbols "TRG" are displayed stopped, at the same time win is established and a predetermined pay is carried out, for five next games, feature games are carried out. Feature games are so called free games, and a game starts without a BET.

In FIG. 7, reels (A5, A7, A9) where trigger symbols appear, are switched to re-drawing reels at a start of a feature game. This re-drawing reel has a same symbol alignment, and stops the symbols at the same position by synchronously rotating. The re-drawing reel structures a specific display region. The reels that are not a re-drawing reel, is an ordinary reel, and structures a general display region.

The reels that establish a win situation during a feature game is switched to a re-drawing reel, in a unit of a symbol according to the win situation. Therefore, each time a win situation occurs in the feature game, an independent new re-drawing reel is generated. A plurality of kinds of re-drawing reels independently rotate, and stop. However, in a case where a same symbol is displayed stopped in a plurality of kinds of re-drawing reels, those reels combine, and one re-drawing reel, wherein the number of reels is increased is generated. Below, the first embodiment will be described in detail.

Figure 6:
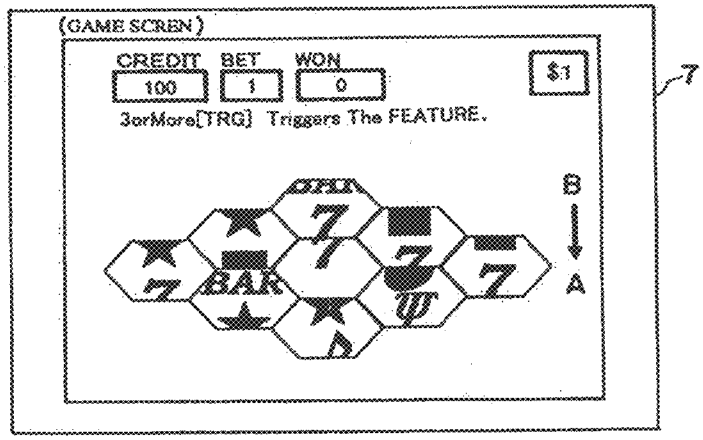
FIG. 6 is a diagram showing a screen display example of the gaming machine according to the first embodiment.

As shown in FIG. 1, a gaming machine 1 according to the first embodiment, comprises a chassis 2, and a front panel 3 in front of the chassis 2, which is attached so that it can be opened and closed. In the rear of the front panel 3, a symbol display unit 7 structured by a liquid crystal panel or a CRT (Cathode Ray Tube) is provided. In the first embodiment, the symbol display unit 7 adopts a video reel method, and displays nine hexagon reels A1 to A9, by executing a program. For example, FIG. 5 shows a wait state of an ordinary game, and FIG. 6 shows a state of changing display of symbols by each reel A1 to A9 rotating in a direction from B to A, in an ordinary game. The symbol display unit 7 includes trigger symbols and other kinds of symbols, and while it change displays a plurality of types of symbols column-wise, as above, it stop displays symbols of the change display, based on a result of an interior drawing.

In front of the chassis 2, a medal (the medal may be real money, such as a coin) slot 10, and a medal return button 10*a*, which returns the medal, in a case where the inserted medal is stuck, etc. A start lever 11 is for carrying out starting operation of a rotating display (change display) of the symbol display unit 7.

A game in the gaming machine 1 starts by a player carrying out a BET operation. The BET operation is carried out by credits or by inserting money. As above, a medal or a coin can be used, as having an equivalent value as money. BET operation can be possible by providing a device that receives inserting of bills, and a card reader/writer. After BET operation by a player, when the start lever 11 is operated, the symbol display unit 7 change displays the symbols. After a predetermined time has passed, the symbol display unit 7 sequentially stop displays the change-displayed symbols. The order for stopping may be that every reel stops at once, or the reels may be stopped in an order from reel A1 to A9. In a case of sequentially stopping, the reels can be stopped having a time interval of for example 0.5 seconds. When three or more predetermined symbols are adjacent at this stopped state, a win situation corresponding to that symbol is obtained.

On the lower side of the front panel 3, a medal pay-off opening 15 and a medal receiving tray 16 is provided, and on the upper side of the front panel 3, a game rendition indicator 17, which is driven for • game rendition is provided. The game rendition indicator 17 comprises for example LCD (Liquid Crystal Device) or various types of lamps. In the first embodiment, an embodiment where LCD is adopted is shown. On the upper side of the front panel 3, a bonus game indicator 18 is provided. The bonus game indicator 18 comprises LED (Light Emitting Diode), and displays, a winning state or a win of a feature game or a bonus prize, which provide a high game value to the player, rendition of a game, and error occurrence. A speaker 19 generates audio assist, music, and sound effects, etc.

A plurality of lamps 20 provided on the front panel 3 carries out displays concerning the game, such as display of a win situation line validated in accordance with the inserted number of medals (or number of credits that are BET), and display of a win situation, by turning on, turning off, or blinking the lamps 20. An accumulated metal inserting button 21 is a button for using a predetermined number of medals accumulated (credited) in a not shown medal accumulation device, and an accumulated metal inserting button 22 is a button for using a maximum specified number of medals accumulated in a not shown metal accumulation device. A medal accumulated number display unit 23 displays the number of medals accumulated in the not shown metal accumulation device. A win situation number display unit 24 displays number of times of win situation and number of times left, during a bonus prize of a win situation. A medal pay-off number display unit 25 comprises for example, LED. A pay off button 26 pays off the accumulated medals, and a locking mechanism 27 locks the door, by a rotating direction. A format of the gaming machine 1 and a name of a maker is written on a label 28.

Figure 2:
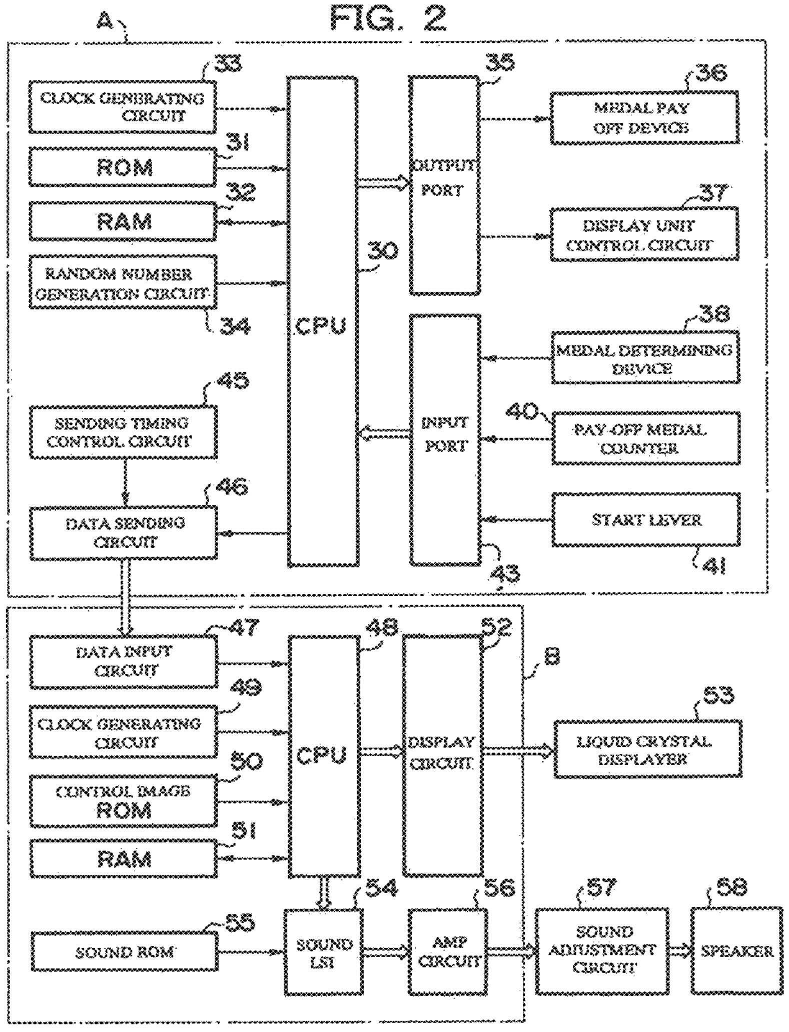
FIG. 2 is a diagram showing the electric structure of the gaming machine according to the first embodiment.

FIG. 2 is a diagram showing an electric structure of the gaming machine according to the first embodiment. As shown in FIG. 2, the gaming machine 1 electrically comprises a main substrate A and a sub substrate B. In the main substrate A, a CPU 30 comprises a ROM 31 and a RAM 32, and carries out control operation in accordance with a pre-set program. Besides a control program for controlling operation of the gaming machine 1, a win group drawing table used for carrying out pre-determination (internal drawing) of win groups, is stored in the ROM 31.

A clock generation circuit 33 which generates a standard clock pulse, and a random number generation circuit 34 which generates a certain number of random numbers, are connected to the CPU 30. The CPU 30, the ROM 31, the RAM 32, and the random number generation circuit 34 structure a drawing control unit. A control signal passed from the CPU 30 is output to a medal pay-off device 36 which carries out pay off of medals, and a display unit control circuit 37 which controls the symbol display unit 7 via an output port 35. The symbol display unit 7 and the display control circuit 37 structure the display unit.

A signal output from a medal determining device 38 which determines adequacy of a medal, a pay off medal counter 40 which counts the number of medals that are to be paid, and a start lever 41 which starts the rotation of the reels, is input to the CPU 30 via an input port 43. The signal output from the CPU 30 is output to the sub substrate B via a data sending circuit 46, receiving control from a sending timing control circuit 45 which controls signal sending timing to the sub substrate B.

In the sub substrate B, the signal output from the data sending circuit 46 is input to a data input circuit 47. The signal input to the data input circuit 47 is processed in a CPU 48. A clock generating circuit 49, a ROM 50 which has recorded various programs and image data, and a RAM 51 are connected to the CPU 48. Data concerning images is output to a liquid crystal displayer 53 via a display circuit 52 which carries out image processing, etc., from the CPU 48. In the liquid crystal displayer 53, characters, still images, and moving images, etc. are displayed. Data concerning sound is output to an amp circuit 56 via a sound LSI 54 which carries out sound processing, etc., from the CPU 48. The sound LSI 54 extracts necessary sound data from a sound ROM 55, and carries out processing of sound data. The sound data that receives processing of amplification, etc., by the amp circuit 56, is output to a speaker 58 via a sound adjustment circuit 57 which carries out adjustment of sound.

Figure 3:
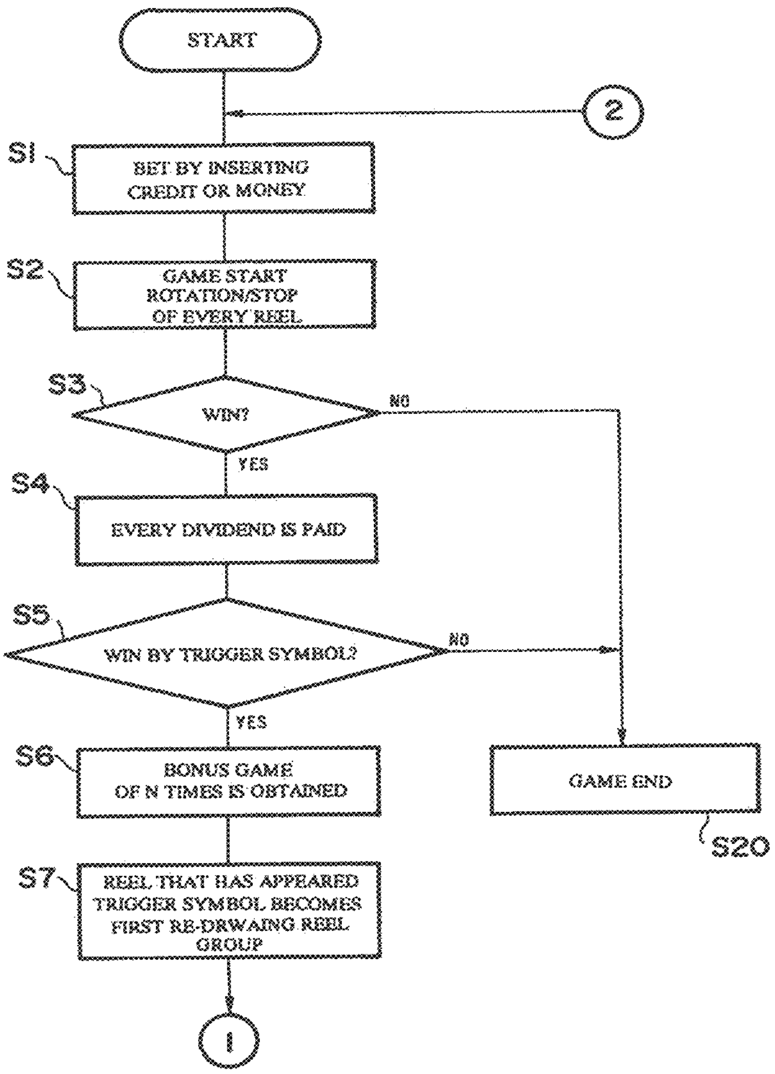
FIG. 3 is a flowchart showing performance of the gaming machine according to the first embodiment.
Figure 4:
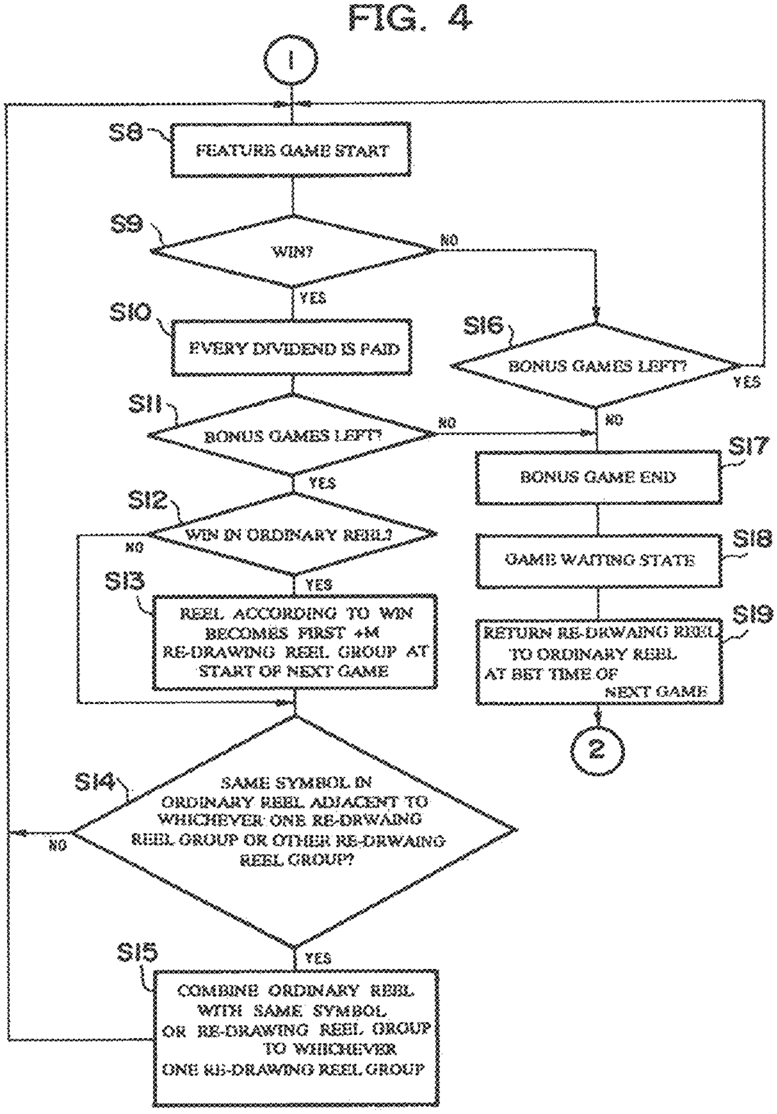
FIG. 4 is a flowchart showing performance of the gaming machine according to the first embodiment.

Performance of the gaming machine according to first embodiment structured as above, will be described with reference to FIGS. 3 to 12. FIGS. 3 and 4 are flowcharts showing main performance of the gaming machine according to the first embodiment, and FIGS. 5 to 12 are diagrams showing screen display examples. In a wait state of an ordinary game, a screen such as shown in FIG. 5 is displayed in the symbol display unit 7. Namely, reels A1 to A9 having a shape of a hexagon, which independently change or stop displays symbols, is displayed in a center part of a screen. Other than the reels A1 to A9, a credit meter which displays number of credits, a BET meter which displays number of BETs, and WON meter which indicates number of medals that are paid off to a player at a time of a win situation. In the first embodiment, as above, a win situation is established when three or more sides of hexagons of same symbols are adjacent, when each reel A1 to A9 stops.

In the flowchart shown in FIG. 3, when a player inserts credits or money (these can be medals, coins, or cards), and carries out BET operation (STEP S1), a game is started (Step S2). At the same time as start of the game, as shown in FIG. 6, each reel A1 to A9 rotates in a direction from B to A in FIG. 6, and change displays symbols. Here, symbol alignment and rotating timing of each reel A1 to A9 each differ. Therefore, while the reels are rotating, it is unlikely that one reel becomes the same situation as another reel. Each reel A1 to A9 stops at predetermined timing, after a predetermined time has passed after starting rotation.

In the flowchart shown in FIG. 3, it is determined whether a win situation is established or not (Step S3). In a case where a win situation is not established, the game ends (Step S20), and in a case where a win situation is established, every dividend corresponding to that win is paid (Step S4). The dividend at this time, is determined in accordance with the BET situation. Then, it is determined whether the win is a win situation established by the trigger symbol (Step S5). In a case where the win situation is not established by the trigger symbol, the game ends (Step S20).

On the other hand, as shown in FIG. 7, in a case where a win situation is established by trigger symbols being adjacent at three sides of hexagons in reels A5, A7, and A9, a feature game as a bonus game is started. Namely, the feature game is carried out in a case where three ore more trigger symbols are adjacent. The number of times of the feature game is n (n is a natural number) times from the next game. In the first embodiment, the number of times of the feature game is five times (Step S6).

Reels A5, A7, and A9 that have displayed trigger symbols when a first feature game is started, are switched to re-drawing reels (Step S7). The reels A5, A7, and A9 that become re-drawing reels are called a "first re-drawing reel group" as one group. Symbol alignment is the same, and synchronously rotates and stops at the same position on the reel in each reel A5, A7, and A9 which structure the re-drawing reel group.

By this, an independent re-drawing result, which differs from the ordinary reel, can be displayed to the re-drawing reel group. Because a plurality of symbols are drawn for the ordinary reels where trigger symbols are not displayed, so that arbitrary symbols are independently displayed, the ordinary reels and the re-drawing reels are respectively independent, and mixed. Namely, re-drawing is not carried out using every region, but a re-drawing result is displayed in the re-drawing reels that are a part of the display regions, and in another one part of the region, the ordinary drawing result is displayed. By this, because two types of regions, the ordinary reels and the re-drawing reels coexist, and display drawing results, a new kind of game which arouses the player's interests, can be realized. Every display region may be a re-drawing reel (specific display region) in accordance with process of the game.

Figure 8:
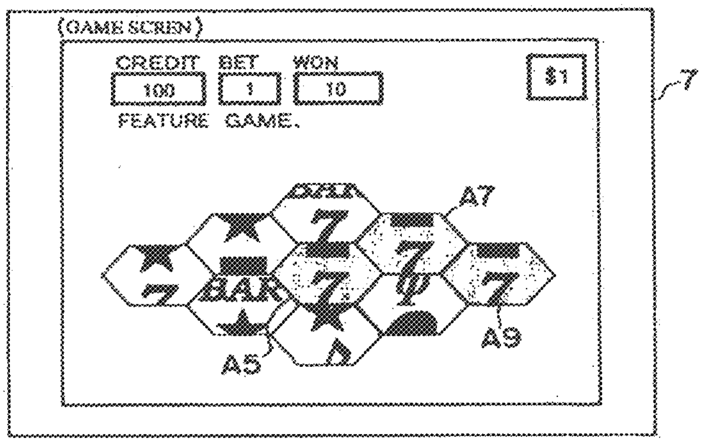
FIG. 8 is a diagram showing a screen display example of the gaming machine according to the first embodiment.
Figure 9:
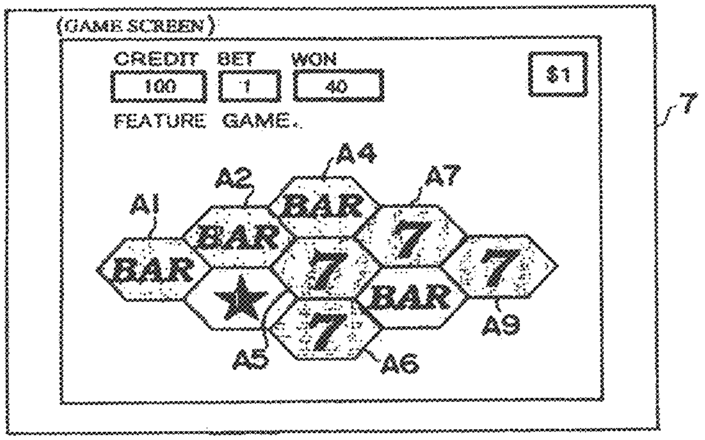
FIG. 9 is a diagram showing a screen display example of the gaming machine according to the first embodiment.

In the flowchart shown in FIG. 4, a feature game (bonus game) is started (Step S8). As shown in FIG. 8, the first re-drawing reel group (A5, A7, and A9) synchronously rotates, and the other reels independently rotate randomly. When the rotation of every ordinary reel and the first re-drawing reel group stops, it is determined whether a win situation is established or not (Step S9). In a case where a win situation is not established, the flow forwards to Step S 16, and as shown in FIG. 9, in a case where a win situation is established, every dividend is paid (Step S 10). The dividend at this time is set in accordance with the BET state. In FIG. 9, a win situation is established by the "BAR" symbols matching in adjacent reels A1, A2, and A4. Also, a win situation is established by "7" symbols matching in adjacent reels A6, A5, A7, and A9.

Then, it is determined whether there are any feature games (bonus games) left (Step S 11). In a case where there aren't any feature games left, the flow forwards to Step S17, and in a case where there are feature games left, it is determined whether a win situation is established in the ordinary reels (Step S12). In Step S12, in a case where a win situation is not established in the ordinary reels, the flow forwards to Step S14, and in a case where a win situation is established in the ordinary reels, the reels according to the win situation becomes a first +$m^{th}$ (m is a natural number) re-drawing reel group (Step S 13). In this case, it becomes a second re-drawing reel group.

In this way, during the period of a feature game, in a case where a win situation is established in whichever of the plurality of, ordinary reels, because the ordinary reels involved in the win situation are changed to new reels, independent from the existing reels, each time a win situation is established in the ordinary reels, the number of re-drawing reel groups increases. Because drawing is carried out from a plurality of types of symbols so that the same symbols are respectively stop displayed in each re-drawing reel group, diverse re-drawing can be carried out in each re-drawing reel group. As a result, a strong impression is provided to the players, and is possible to arouse the player's interests.

Then, it is determined whether there are any same symbols in whichever one of the re-drawing reel groups and an adjacent ordinary reel, or in another re-drawing reel group (Step S14). In a case where there isn't this kind of symbol, the flow forwards to Step S8, and in a case where there is this kind of symbol, the ordinary reel or the re-drawing reel group that has displayed the same symbols is combined to one re-drawing reel group (Step S 15). Namely, as shown in FIG. 9, the reel A6 is adjacent to the first re-drawing reel group A5, A7, and A9, and has displayed a same symbol "7", the reel A6 is switched to a re-drawing reel, and structures the first re-drawing reel. Therefore, reels A5, A6, A7, and A9 have the same symbol alignment, and synchronously rotates and stops at the same position.

In this way, in a case where a symbol displayed in whichever ordinary reel is the same symbol as the symbol displayed in the re-drawing reel group, because the ordinary reel is changed to a re-drawing reel and is combined to the existing re-drawing reel group, in a predetermined number of feature games after the next time, the number of reels that structure the re-drawing reel group increases. Then, because a drawing from a plurality of types of symbols is carried out so that a same symbol is stop displayed in every re-drawing reel group, the same symbol is stop displayed in the entire re-drawing reel group. By this, diverse re-drawing can be carried out in the specific display region, a strong impression is provided to the player, and it is possible to arouse the player's interest.

Figure 10:
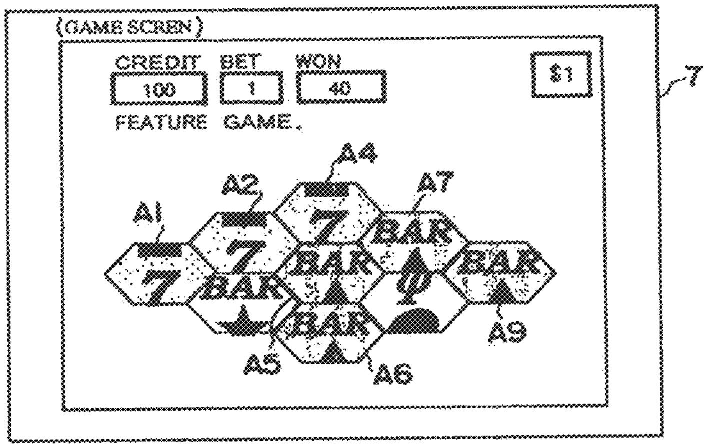
FIG. 10 is a diagram showing a screen display example of the gaming machine according to the first embodiment.
Figure 11:
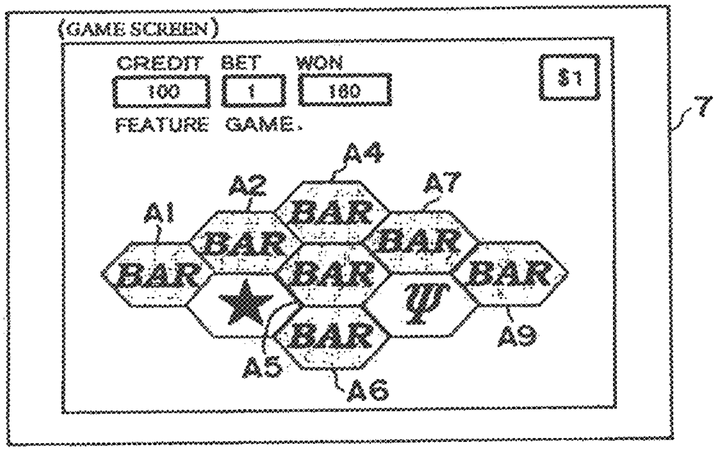
FIG. 11 is a diagram showing a screen display example of the gaming machine according to the first embodiment.

Next, the flow returns to Step S8, and a second feature game (bonus game) is carried out. Here, as shown in FIG. 10, the first re-drawing reel group (A5, A6, A7, and A9) that has the number of reels increased, the second re-drawing reel group (A1, A2, and A4), and the other ordinary reels (A3, and A8) respectively rotate independently. When every ordinary reel and re-drawing reel stops, it is determined whether a win situation is established or not (Step S9). For example, as shown in FIG. 11, in a case where a win situation is established in the first re-drawing reel group (A5, A6, A7, and A9), by a "BAR" symbol matching, and a win situation is established in the second re-drawing reel group (A1, A2, and A4), by the "BAR" symbol matching, dividend is paid (Step S 10), and it is determined whether there are any feature games (bonus games) left (Step S11). In a case where a feature game is left, it is determined whether a win situation is established, and when a win situation is not established, the flow forwards to Step S14, and when a win situation is established in the ordinary reels, the reels according to the win situation becomes a first +$m^{th}$ (m is a natural number) re-drawing reel group (Step S 13). The case shown in FIG. 11, is a situation where a win situation is not established in the ordinary reels.

Then, it is determined whether there are any same symbols in whichever one of the re-drawing reel groups and an adjacent ordinary reels, or in another re-drawing reel group (Step S14). For example, in FIG. 11, the same "BAR" symbol is displayed in the first re-drawing reel group (A5, A6, A7, and A9), and the second re-drawing reel group (A1, A2, A4). Therefore, the first and second re-drawing reels are combined to form a new reel group (a new re-drawing reel group) (Step S15). Namely, as shown in FIG. 11, reels (A1, A2, A4, A5, A6, A7, and A9) structure a new re-drawing reel group.

Figure 12:
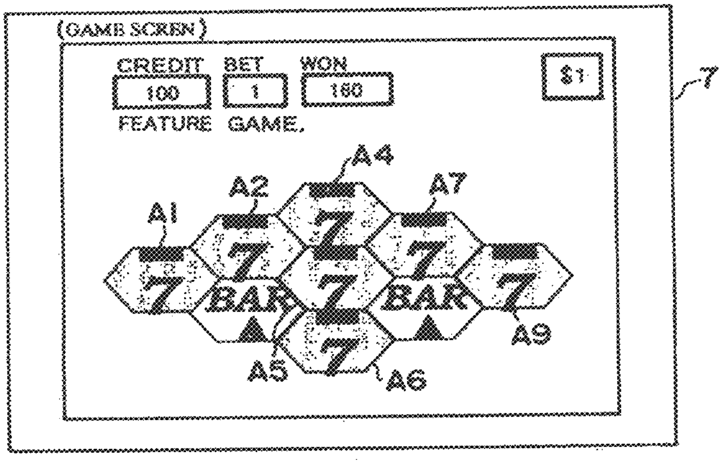
FIG. 12 is a diagram showing a screen display example of the gaming machine according to the first embodiment.

In the next game, as shown in FIG. 12, a new re-drawing reel group (A1, A2, A4, A5, A6, A7, and A9) and the ordinary reels (A3 and A8) respectively rotate independently.

In this way, in a case where the symbols displayed in each re-drawing reel group are the same, the re-drawing reel groups combine, and becomes one re-drawing reel group, and displays the same symbol. By this, diverse re-drawing can be carried out in the re-drawing reel. For example, by raising the odds, accompanying the increase in number of the re-drawing reels, the player's interests can be aroused.

As the above, a third to fifth feature game is carried out. Namely, in Step S9, in a case where a win situation is not established, it is determined whether a feature game (bonus game) is left (Step S 16), and in a case where there is a feature game (bonus game) left, the flow forwards to Step S8. On the other hand, in Step S16, in a case where there isn't a feature game (bonus game) left, the flow forwards to Step S17. In Step S11, in a case where there isn't a feature game (bonus game) left, the feature game (bonus game) ends (Step S17), and moves to a game waiting state (Step S18). At the • BET time of the next game, the re-drawing reel is retuned to an ordinary reel (Step S19). From the next game, an ordinary game is carried out once again.

(Second Embodiment)

Figure 15:
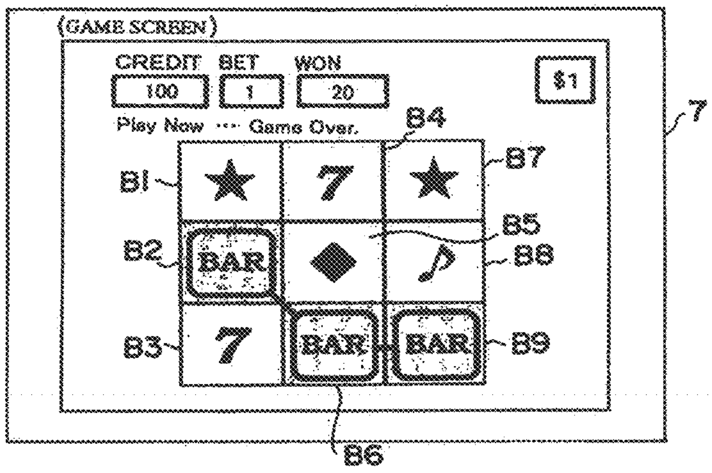
FIG. 15 is a diagram showing a screen display example of the gaming machine according to the second embodiment.

In the second embodiment, a symbol display unit 7 displays a screen, such as shown in FIG. 15. Namely, as shown in FIG. 15, in an ordinary game, nine independent reels B1 to B9 having a quadrangle shape, wherein alignment of symbols each differ, are displayed. The reels B1 to B9 structure a display region. In the second embodiment, if a same symbol is adjacent in three or more sides or corners of the reels B1 to B9, when each reel stops, it is a win. Hardware structure of the gaming machine according to the second embodiment, is the same as that of the first embodiment.

Figure 13:
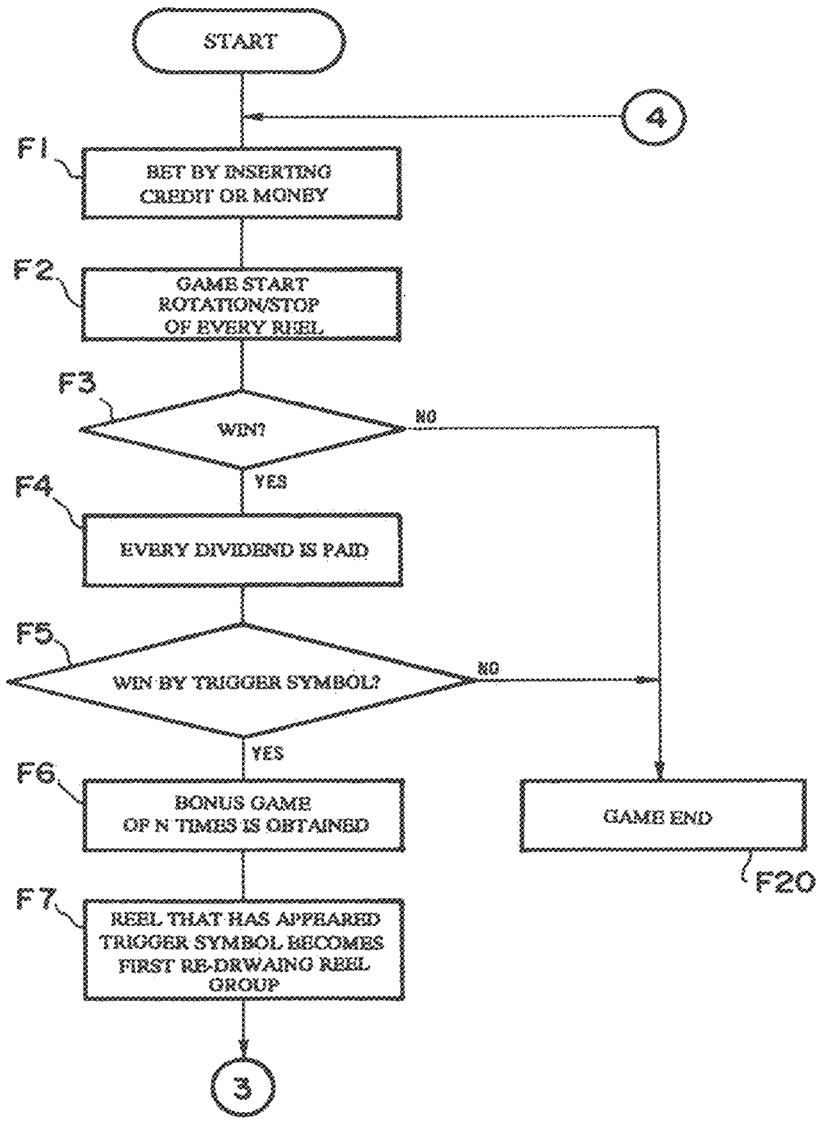
FIG. 13 is a flowchart showing performance of a gaming machine according to a second embodiment.

Performance of the gaming machine according to the second embodiment, will be described with reference to FIGS. 13 and 14. In the flowchart shown in FIG. 13, when a player inserts credits or money (these can be medals, coins, or cards), and carries out BET operation (STEP Fl), a game is started (Step F2). At the same time as start of the game, each reel B1 to B9 rotates, and change displays symbols. Each reel B1 to B9 stops at predetermined timing, after a predetermined time has passed after starting rotation.

Then, it is determined whether a win situation is established or not (Step F3). In a case where a win situation is not established, the game ends (Step F20), and in a case where a win situation is established, every dividend corresponding to that win is paid (Step F4). The dividend at this time, is determined in accordance with the BET situation. For example, as shown in FIG. 15, in a case where a symbol "BAR" is adjacent in three reels B2, B6, and B9, a win situation is established by the "BAR".

Figure 16:
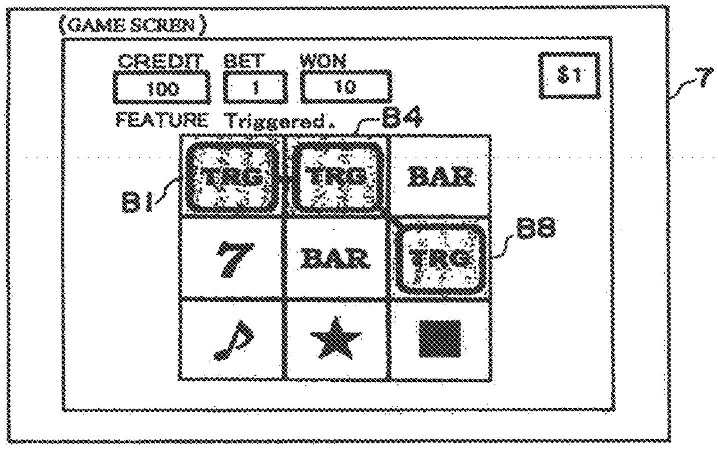
FIG. 16 is a diagram showing a screen display example of the gaming machine according to the second embodiment.

Then, it is determined whether the win is a win situation established by the trigger symbol (Step F5). In a case where the win situation is not established by the trigger symbol, the game ends (Step F20). On the other hand, as shown in FIG. 16, in a case where a win situation is established by three or more trigger symbols "TRG" being adjacent in reels B1, B4, and B8, dividend is provided to the player, and a feature game as a bonus game starts.

Namely, the feature game is carried out in a case where a win situation is established by three ore more trigger symbols being adjacent. In the second embodiment, the number of times of the feature game is five times (Step F6). When the first free game is started, reels B1, B4, and B8 that have trigger symbols displayed, is switched to re-drawing reels (Step F7). The reels B1, B4, and B8 that become re-drawing reels are called a "first re-drawing reel group" as one group. In the same way as the first embodiment, symbol alignment is the same, and synchronously rotates and stops at the same position on the reel in each reel B1, B4, and B8 which structure the re-drawing reel group.

Figure 14:
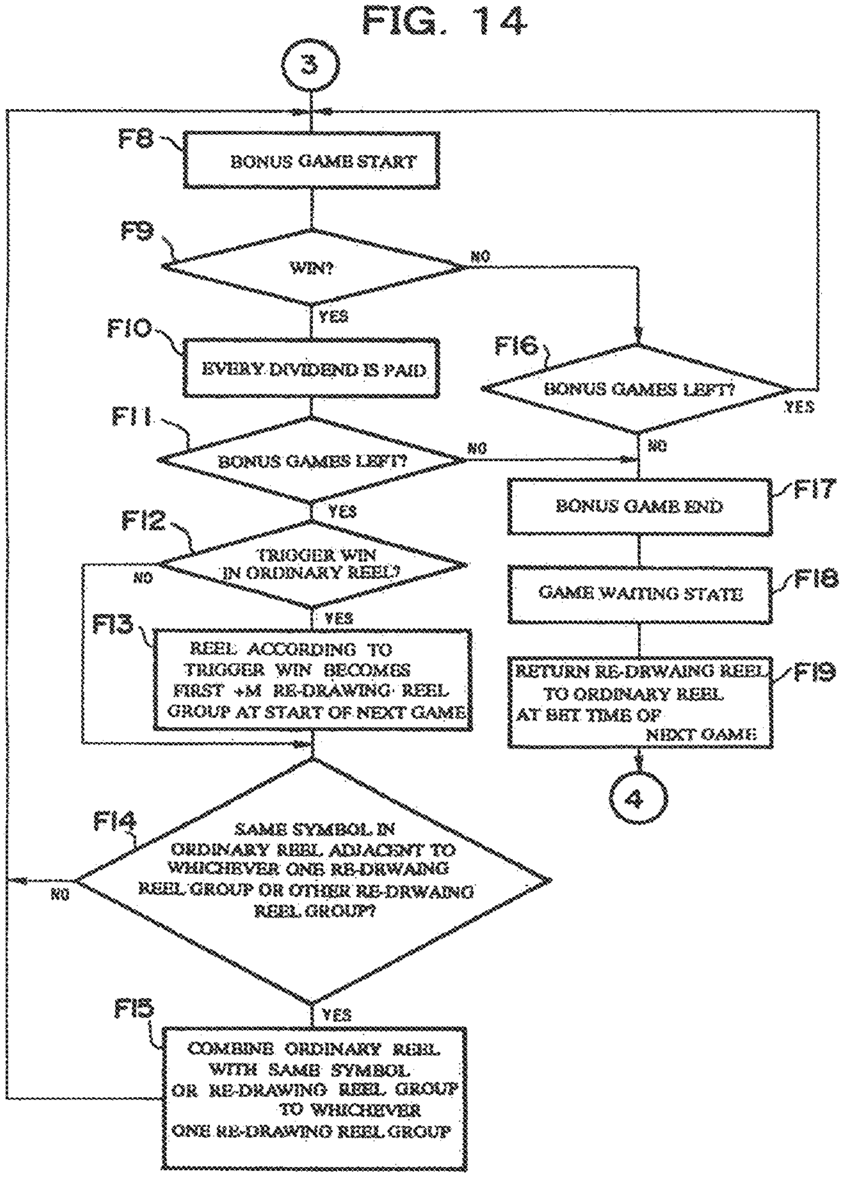
FIG. 14 is a flowchart showing performance of the gaming machine according to the second embodiment.
Figure 17:
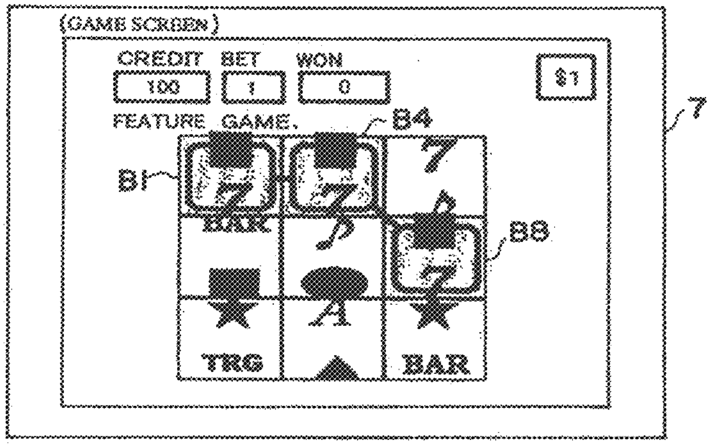
FIG. 17 is a diagram showing a screen display example of the gaming machine according to the second embodiment.
Figure 18:
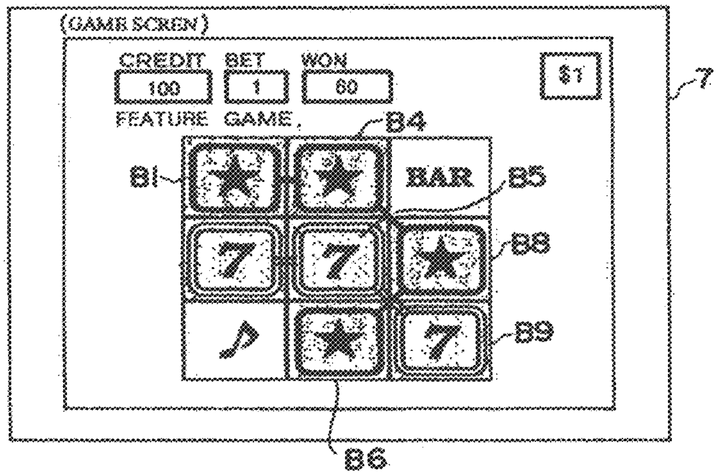
FIG. 18 is a diagram showing a screen display example of the gaming machine according to the second embodiment.

In the flowchart shown in FIG. 14, a feature game (bonus game) is started (Step F8). As shown in FIG. 17, the first re-drawing reel group (B1, B4, and B8) and other ordinary reels rotate in a direction from B to A in the drawings, but the first re-drawing reel group (B1, B4, and B8) synchronously rotates. The ordinary reels (B2, B3, B5, B6, B7, and B9) respectively rotate randomly, independently. When the rotation of every ordinary reel and the first re-drawing reel group stops, it is determined whether a win situation is established or not (Step F9). In a case where a win situation is not established, the flow forwards to Step F16, and as shown in FIG. 18, in a case where a win situation is established, every dividend is paid (Step F10). The dividend at this time is set in accordance with the BET state.

For example, in FIG. 18, because four "0" symbols are displayed in the first re-drawing reel group (B1, B4, and B8) and the adjacent reel B6, a win situation by four same symbols being adjacent, is established. In the ordinary reels (B2, B5, and B9), a win situation is established by three "7" symbols being adjacent.

Then, it is determined whether there are any feature games (bonus games) left (Step Fl 1). In a case where there aren't any feature games left, the flow forwards to Step F17, and in a case where there are feature games left, it is determined whether a win situation is established in the ordinary reels by a trigger symbol (Step F12). In Step F12, in a case where a win situation is not established in the ordinary reels by the trigger symbol, the flow forwards to Step F14, and in a case where a win situation is established in the ordinary reels by the trigger symbol, the reels according to the win situation becomes a first +$m^{th}$ (m is a natural number) re-drawing reel group (Step F13).

Then, it is determined whether there are any same symbols in whichever one of the re-drawing reel groups and an adjacent ordinary reel, or in another re-drawing reel group (Step F14). In a case where there isn't these kinds of symbols, the flow forwards to Step F8, and in a case where there are theses kind of symbols, the ordinary reel or the re-drawing reel group that has displayed the same symbols is combined to one re-drawing reel group (Step F15).

For example, in FIG. 18, because the same symbol "0" as displayed in the first re-drawing reel group (B1, B4, and B8) is displayed in reel B6, which is adjacent to the first redrawing reel group, the reel B6 is combined to the first re-drawing reel group. Namely, the first re-drawing reel group is structured by reels B1, B4, B6 and B8. These reels have a same symbol alignment, and stops the symbol alignment in each reel, by synchronously rotating. On the other hand, in FIG. 18, a win situation is established by three "7" symbols being adjacent. However, because it is not a win situation by the trigger symbol, these ordinary reels (B2, B5, B9) do not change to re-drawing reels.

Figure 19:
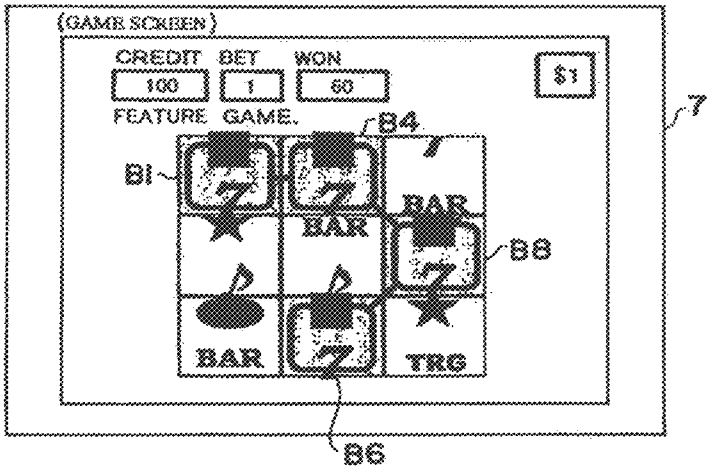
FIG. 19 is a diagram showing a screen display example of the gaming machine according to the second embodiment.
Figure 20:
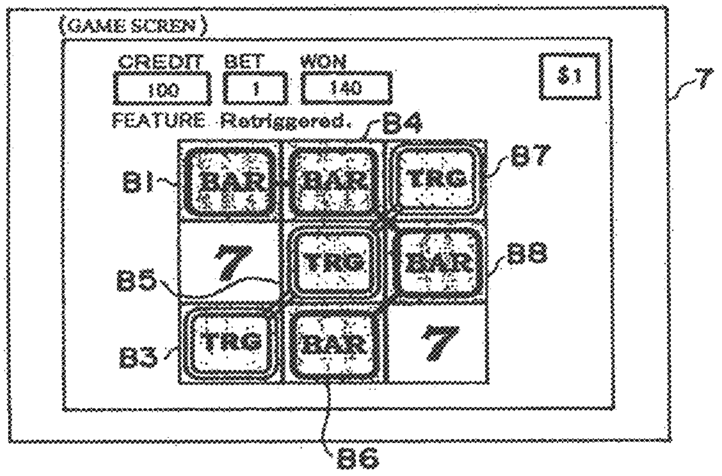
FIG. 20 is a diagram showing a screen display example of the gaming machine according to the second embodiment.

Next, the flow returns to Step F8, and a second feature game (bonus game) is carried out. Here, as shown in FIG. 19, the first re-drawing reel group (B1, B4, B6, and B8) that has the number of reels increased, and the other ordinary reels (B2, B3, B5, B7, and B9) respectively rotate independently. When every ordinary reel and re-drawing reel stops, it is determined whether a win situation is established or not (Step F9). For example, as shown in FIG. 20, in a case where a win situation is established in the first re-drawing reel group (B1, B4, B6, and B8), by a "BAR" symbol matching, and a win situation is established in the ordinary reels (B3, B5, and B7) by the "BAR" symbol matching, dividend is paid (Step F10), and it is determined whether there are any feature games (bonus games) left (Step Fl 1). In a case where a feature game is left, it is determined whether a win situation is established by the trigger symbol, and when a win situation is not established, the flow forwards to Step F14, and when a win situation is established in the ordinary reels by the trigger symbol, the reels according to the win situation becomes a first +'nth (m is a natural number) re-drawing reel group (Step F13). Here, because a win situation is established in the ordinary reels (B3, B5, and B7) by the trigger symbol, a second re-drawing reel is structured by these reels (B3, B5, and B7).

In this way, during the period of a feature game, in a case where a win situation is established in whichever of the plurality of ordinary reels, by the trigger symbol being displayed, because the ordinary reels involved in the win situation are changed to independent reels other than the existing re-drawing reels, each time a win situation is established in the ordinary reels by the trigger symbol, the number of re-drawing reel groups increases. Because drawing is carried out from a plurality of types of symbols so that the same symbols are respectively stop displayed in each re-drawing reel group, the same symbol is respectively stop displayed in the re-drawing reel groups. By this, diverse re-drawing can be carried out in each re-drawing reel group. As a result, a strong impression is provided to the players, and it is possible to arouse the player's interests.

Figure 21:
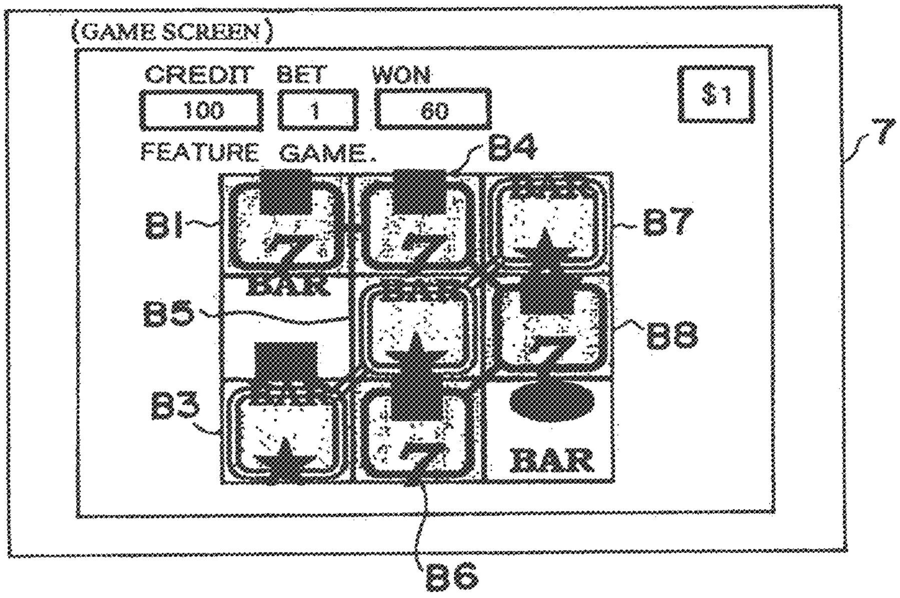
FIG. 21 is a diagram showing a screen display example of the gaming machine according to the second embodiment.

Then, it is determined whether there are any same symbols in whichever one of the re-drawing reel groups and an adjacent ordinary reel, or in another re-drawing reel group (Step F14). In a case where there isn't this kind of symbol, the flow forwards to Step F8, and in a case where there is this kind of symbol, as above, the symbols are combined to the re-drawing reel group (Step F15). In the case shown in FIG. 20, this kind of symbol does not exist Next, in the third feature game, as shown in FIG. 21, the first re-drawing reel group (B1, B4, B6, and B8), the second re-drawing reel group (B3, B5, and B7), and the ordinary reels (B2, and B9) respectively rotate independently (Step F8).

When every ordinary reel and re-drawing reel stops, it is determined whether a win situation is established or not (Step F9). In a case where there is no win situation, the flow forwards to Step F16, and in a case where a win situation is established, every dividend is paid (Step F10). The dividend at this time is set in accordance with the BET state. Then, it is determined whether there are any feature games (bonus games) left (Step Fl 1). In a case where there aren't any feature games left, the flow forwards to Step F17, and in a case where there are feature games left, it is determined whether a win situation is established in the ordinary reels by the trigger symbol (Step F12). In Step F12, in a case where a win situation is not established in the ordinary reels by the trigger symbol, the flow forwards to Step F14, and in a case where a win situation is established in the ordinary reels by the trigger symbol, the reels according to the win situation becomes a first +$m^{th}$ (m is a natural number) re-drawing reel group (Step F13).

Figure 22:
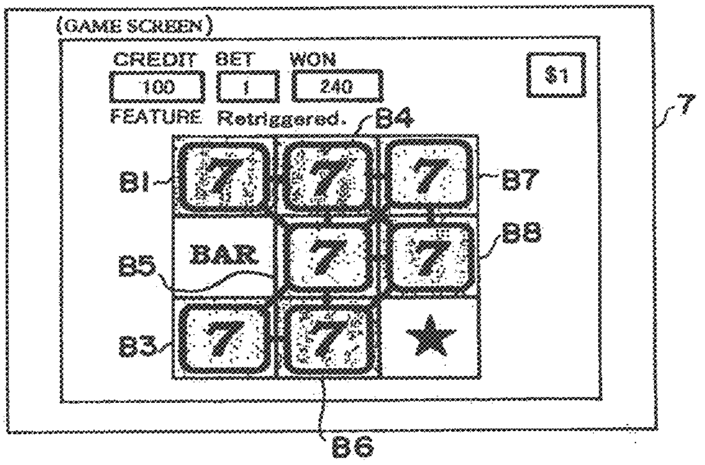
FIG. 22 is a diagram showing a screen display example of the gaming machine according to the second embodiment.
Figure 23:
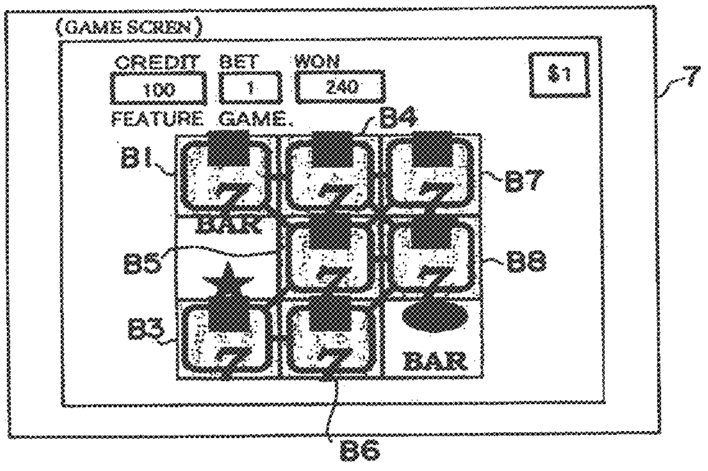
FIG. 23 is a diagram showing a screen display example of the gaming machine according to the second embodiment.

Then, it is determined whether there are any same symbols in whichever one of the re-drawing reel groups and an adjacent ordinary reel, or in another re-drawing reel group (Step F14). As shown in FIG. 22, when a same symbol "7" is displayed in the first re-drawing reel group (B1, B4, B6, and B8), and the second re-drawing reel group (B3, B5, and B7), the first and the second re-drawing reel group combines, and generates one re-drawing reel group. In the fourth feature game, as shown in FIG. 23, the re-drawing reels group structured by reels (B1, B3, B4, B5, B6, B7, and B8), and the ordinary reels (B2, and B5) independently rotate from a direction of B to A in FIG. 23.

In Step F9, in a case where a win situation is not established, it is determined whether a feature game (bonus game) is left, and in a case where there is a feature game (bonus game) left, the flow forwards to Step F8, and games are carried out until the number of feature games reaches a predetermined number (five times). In a case where there isn't a feature game (bonus game) left. In step S11, in a case where there isn't a feature game (bonus game) left, the feature game (bonus game) ends (Step F17), and moves to a game waiting state (Step F18). At the BET time of the next game, the re-drawing reel is retuned to an ordinary reel (Step F19). From the next game, an ordinary game is carried out once again.

In this way, in a case where the symbols displayed in each re-drawing reel group are the same, the re-drawing reel groups combine, and become one re-drawing reel group, and displays the same symbol. By this diverse re-drawing can be carried out in the re-drawing reel. For example, by raising the odds, accompanying the increase in number of the re-drawing reels, the player's interests can be aroused.

(Third Embodiment)

In the third embodiment, a win situation is established, in a case where three or more same symbols are adjacent in an ordinary game. In a case where a win situation is established by three trigger symbols being adjacent, feature games (bonus games) are carried out five games, after that game. In these feature games, reels where the trigger symbols appeared in the ordinary game, are switched to re-drawing reels. In a case where the same symbol is displayed in an ordinary reel that is adjacent to the re-drawing reels, the ordinary reel is combined to the re-drawing reels. Namely, the number of reels that structure the re-drawing reels increase. During the period of the feature game, a win situation by the trigger symbol, does not occur. The hardware structure of the gaming machine according to the third embodiment, can be structured in the same way as the first embodiment.

The performance of the gaming machine according to the third embodiment, will be described with reference to the flowcharts of FIGS. 24 and 25. In a waiting state of an ordinary game, a screen such as shown in FIG. 5 is displayed. Namely, reels A1 to A9 that have hexagon shapes, and which independently change or stop displays a symbol, is displayed in the center part of the screen. Other than that, a credit meter which displays number of credits, a BET meter which displays number of BETs, and WON meter which indicates the number of medals to be paid to a user, at a win situation are displayed. In the third embodiment, as above, a win situation is established when three or more sides of hexagons of a same symbol are adjacent, when each reel A1 to A9 stops.

Figure 24:
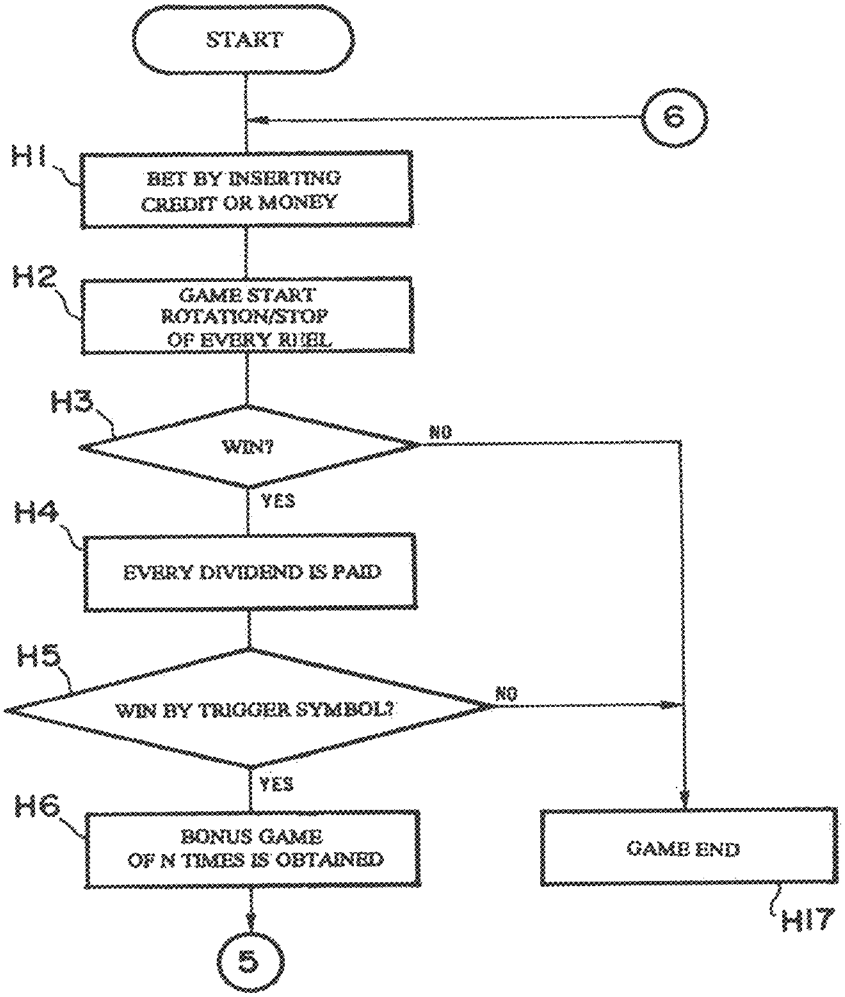
FIG. 24 is a flowchart showing performance of a gaming machine according to a third embodiment.

In the flowchart shown in FIG. 24, when a player inserts credits or money (these can be medals, coins, or cards), and carries out BET operation (STEP H1), a game is started (Step H2). At the same time as start of the game, as shown in FIG. 6, each reel A1 to A9 rotates in a direction from B to A in FIG. 6, and change displays symbols. Here, symbol alignment and rotating timing of each reel A1 to A9 differ. Therefore, while the reels are rotating, it is unlikely that one reel becomes the same situation as another reel. Each reel A1 to A9 stops at predetermined timing, after a predetermined time has passed after starting rotation.

In the flowchart shown in FIG. 24, it is determined whether a win situation is established or not (Step H3). In a case where a win situation is not established, the game ends (Step H17), and in a case where a win situation is established, every dividend corresponding to that win is paid (Step H4). The dividend at this time, is determined based on the BET situation. Then, it is determined whether the win is a win situation established by the trigger symbol (Step H5). In a case where the win situation is not established by the trigger symbol, the game ends (Step H17).

On the other hand, as shown in FIG. 7, in a case where a win situation is established by trigger symbols being adjacent at three sides of hexagons in reels A5, A7, and A9, a feature game as a bonus game is started. Namely, the feature game is carried out in a case where three ore more trigger symbols are adjacent. The number of times of the feature game is n (n is a natural number) times from the next game. In the third embodiment, as above, the number of times of the feature game is five times (Step H6).

Figure 25:
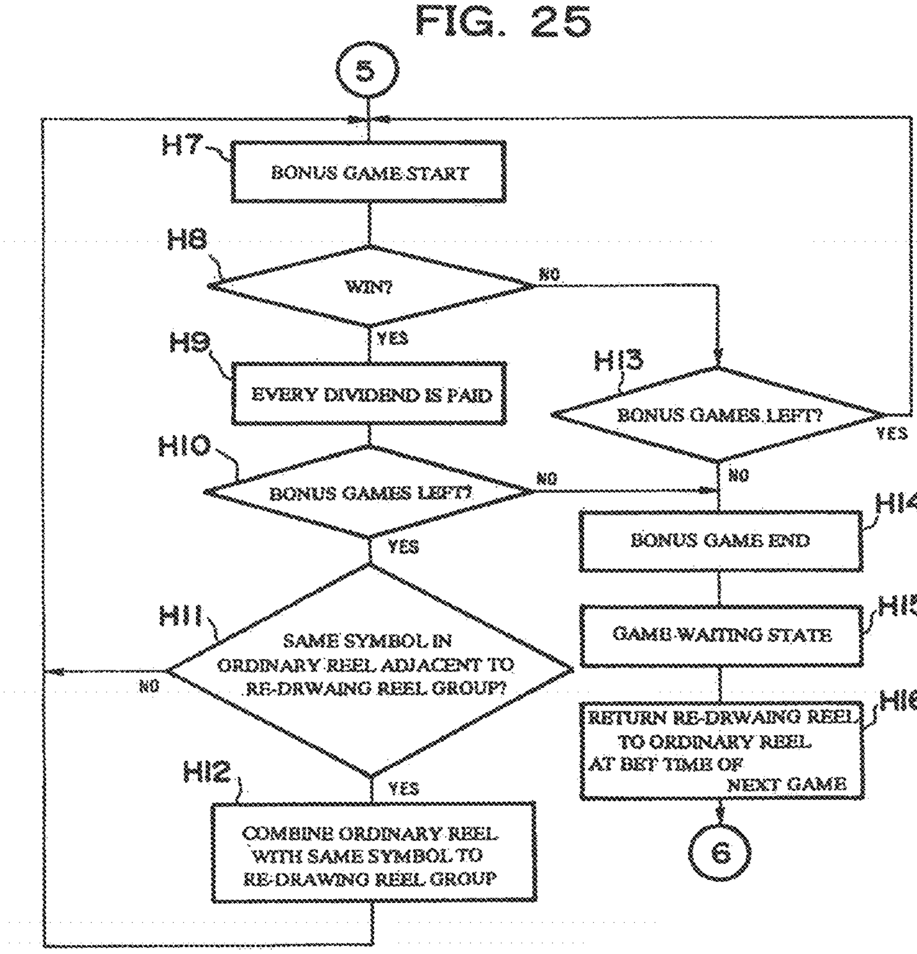
FIG. 25 is a flowchart showing performance of the gaming machine according to the third embodiment.

In the flowchart shown in FIG. 25, when a first feature game (bonus game) is started (Step H7), reels A5, A7, and A9 that have displayed trigger symbols, are switched to re-drawing reels. The reels A5, A7, and A9 that become re-drawing reels are called a "re-drawing reel group" as one group. Each reel A5, A7, and A9 that structures the re-drawing reel group have the same symbol alignment, and synchronously rotates and stops at the same position on the reel. For example, as shown in FIG. 8, the re-drawing reel group (A5, A7, A9) synchronously rotates, and the other reels independently rotate randomly. When rotation of every ordinary reel and re-drawing reel group stops, it is determined whether a win situation is established (Step H8). In a case where a win situation is not established, the flow forwards to Step H13, and as shown in FIG. 9, in a case where a win situation is established, every dividend is paid (Step H9). The dividend at this time is determined in accordance with the BET state. In FIG. 9, a win situation is established by "BAR" symbols matching in adjacent reels A1, A2, and A4. Also, a win situation is established in adjacent reels A6, A5, A7, and A9, by "7" symbols matching.

In the fourth embodiment, in a case where a win situation is established by three trigger symbols being adjacent, feature games (bonus games) are carried out five games after that game. At the starting time of these feature games, reels where the trigger symbols appeared in the ordinary game, are switched to re-drawing reels. In a case where the same symbol is displayed in an ordinary reel that is adjacent to the re-drawing reels, the ordinary reel is combined to the re-drawing reels. Namely, the number of reels that structure the re-drawing reels increase. In a case where a plurality of re-drawing reels exist, when a same symbol is displayed in adjacent re-drawing groups, the re-drawing groups are combined, and become one re-drawing reel group. Further, in the fourth embodiment, differing from the third embodiment, a win situation is established by a trigger symbol, during the period of the feature game, and the number of feature games is added by that win. Namely, every time a win situation is established by the trigger symbol, during the period of the feature game, the number of feature games increase. In the feature game, in a case where a win situation is established in an ordinary reel by the trigger symbol, the ordinary reel according to that win, is switched to an independent re-drawing reel, which differs from the existing re-drawing reels. The hardware structure of the gaming machine according to the fourth embodiment, can be structured in the same way as the second embodiment.

Next, performance of the gaming machine according to the fourth embodiment will be described with reference to the flowcharts of FIG. 26 and FIG. 27. In the flowchart shown in FIG. 26, a feature game (bonus game) is started (Step T3). As shown in FIG. 17, the first re-drawing reel group (B1, B4, and B8) and other ordinary reels rotate in a direction from B to A in the drawings, but the first re-drawing reel group (B1, B4, and B8) synchronously rotates. The ordinary reels (B2, B3, B5, B6, B7, and B9) respectively rotate randomly, independently. When the rotation of every ordinary reel and the first re-drawing reel group stops, it is determined whether a win situation is established or not (Step T4). In a case where a win situation is not established, the flow forwards to Step T13, and as shown in FIG. 18, in a case where a win situation is established, every dividend is paid (Step T5). The dividend at this time is set in accordance with the BET state. Here, for example, in FIG. 18, because four "0" symbols are displayed in the first re-drawing reel group (B1, B4, and B8) and the adjacent reel B6, a win situation by four same symbols being adjacent, is established. In the ordinary reels (B2, B5, and B9), a win situation is established by three "7" symbols being adjacent.

Then, it is determined whether there are any feature games (bonus games) left (Step T6). In a case where there aren't any feature games left, and a win situation by the trigger symbol is not established, the flow forwards to Step T14, and in a case where there are feature games left, or a win situation by the trigger symbol is established, it is determined whether there are any same symbols in whichever one of the re-drawing reel groups and an adjacent ordinary reels (Step T7). In a case where there isn't this kind of symbol, the flow forwards to Step T9, and in a case where there is this kind of symbol, the ordinary reel that has displayed the same symbols is combined to the re-drawing reels (Step T8).

For example, in FIG. 18, because the same symbol "0" as displayed in the first re-drawing reel group (B1, B4, and B8) is displayed in reel B6, which is adjacent to the first re-drawing reel group, the reel B6 is combined to the first re-drawing reel group. Namely, the first re-drawing reel group is structured by reels B1, B4, B6 and B8. These reels have a same symbol alignment, and stops the symbol alignment in each reel, by synchronously rotating.

Then, it is determined whether the symbols in adjacent re-drawing reel groups are the same or not (Step T9). In a case where the symbols are not the same in the adjacent re-drawing reel groups, the flow forwards to Step T11, and in a case where the symbols are the same in the adjacent re-drawing reel groups, the re-drawing groups that have displayed the same symbol, are combined to one re-drawing reel group (Step T10).

Next, it is determined whether a win situation is established by the trigger symbol (Step T12). In a case where a win situation is not established by the trigger symbol, the flow forwards to step T3, and in a case where a win situation is established by the trigger symbol, a feature game (bonus game) of an addition of n times is added to the player. The number of additional games can be for example, five times.

Figure 26:
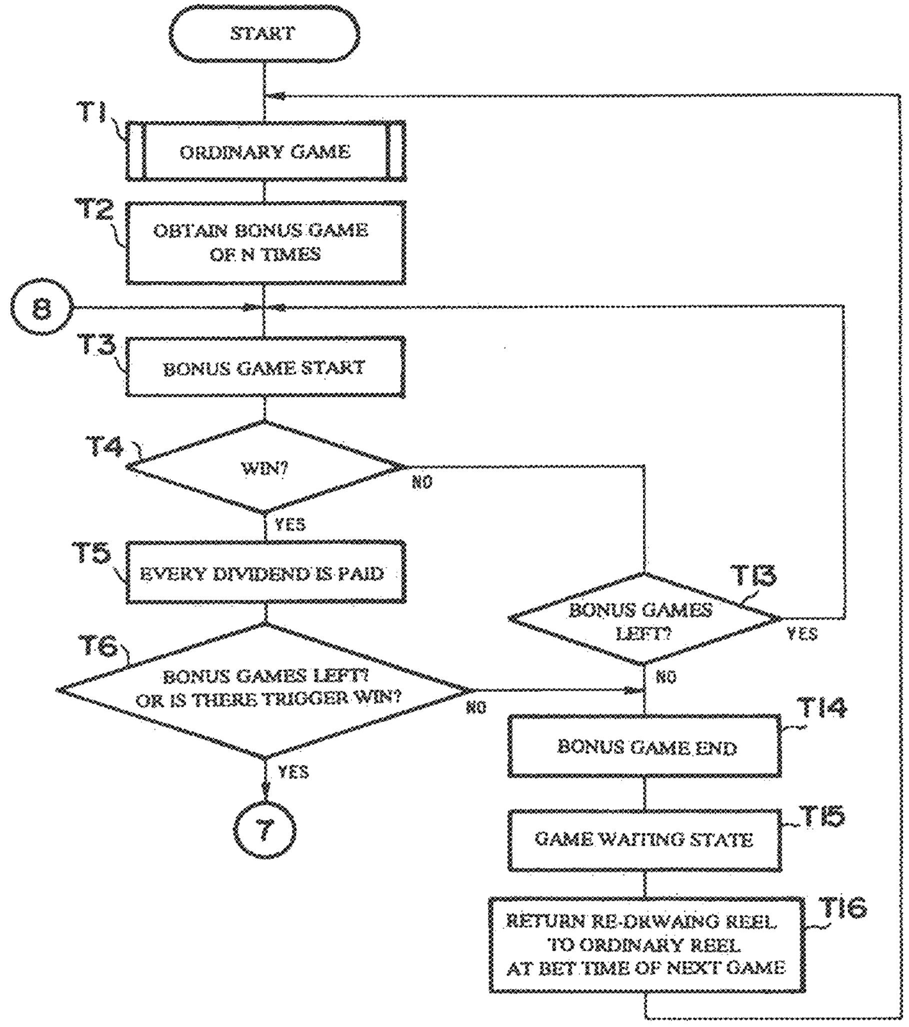
FIG. 26 is a flowchart showing performance of a gaming machine according to a fourth embodiment.
Figure 27:
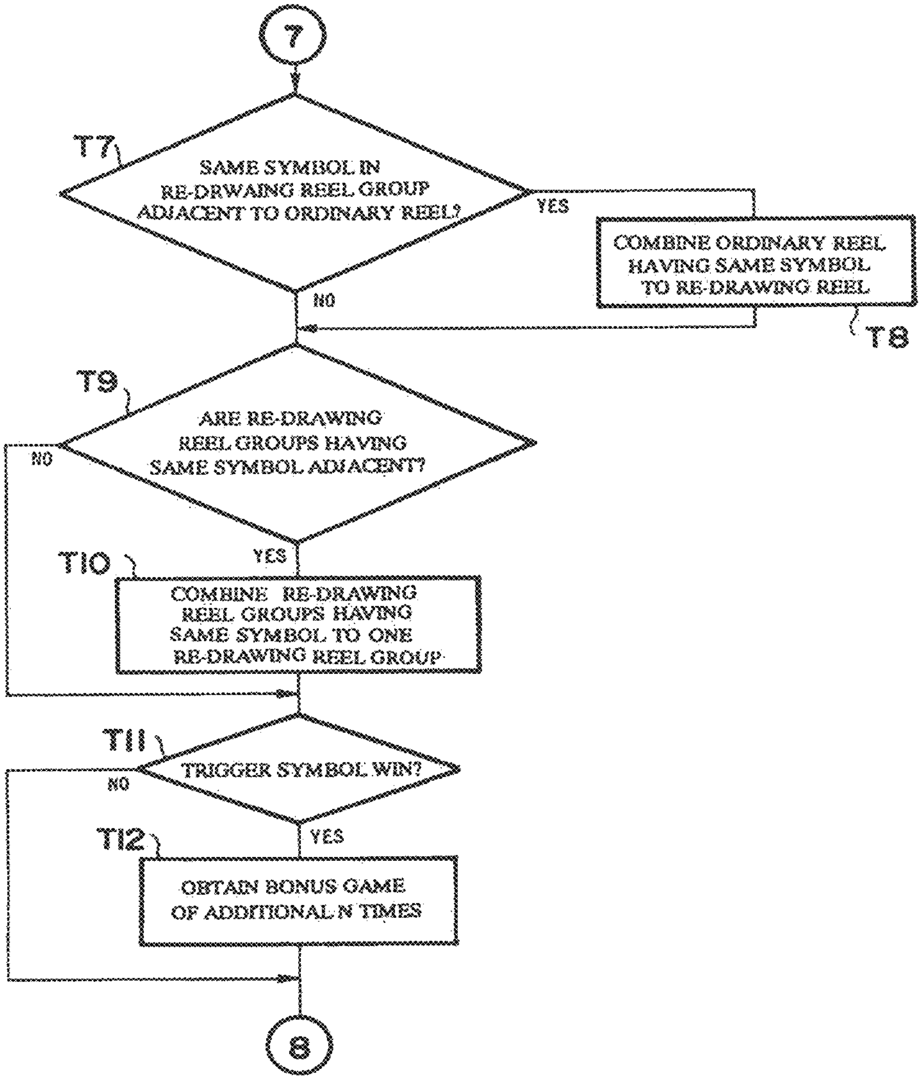
FIG. 27 is a flowchart showing performance of the gaming machine according to the fourth embodiment.

The flow returns to Step T3 in FIG. 26, and a second feature game (bonus game) is carried out. Here, as shown in FIG. 19, the first re-drawing reel group (B1, B4, B7, and B9) that has the number of reels increased, and the other ordinary reels (B2, B3, B5, B7, and B9) respectively rotate independently. When every ordinary reel and re-drawing reel stops, it is determined whether a win situation is established or not (Step T4). For example, as shown in FIG. 20, in a case where a win situation is established in the first re-drawing reel group (B1, B4, B6, and B8), by a "BAR" symbol matching, and a win situation is established in the ordinary reels (B3, B5, and B7) by the "BAR" symbol matching, dividend is paid (Step T5), and it is determined whether there are any feature games (bonus games) left, or whether there is a win situation by the trigger symbol (Step T6). In a case where a feature game is left, or in a case where there is a win situation by the trigger symbol, it is determined whether there is a same symbol in the ordinary reels adjacent to the re-drawing reel group (Step T7).

In Step T7, in a case where there isn't a same symbol in the ordinary reels adjacent to the re-drawing reel group, the flow forwards to Step T9, and in a case where there is a same symbol in an ordinary reel adjacent to the re-drawing reel group, the ordinary reel that has displayed the same symbol, is combined to the re-drawing reel group (Step T8). Then, it is determined whether re-drawing reel groups that have the same symbol are adjacent or not (Step T9). In a case where there are no adjacent re-drawing reel groups, the flow forwards to step T11. On the other hand, in a case where there are adjacent re-drawing reel groups, the re-drawing reel groups are combined to one re-drawing reel group (Step T10).

It is determined whether a win situation is established by the trigger symbol (Step T12). In a case where a win situation is not established by the trigger symbol, the flow forwards to Step T3, and in a case where a win situation is established by the trigger symbol, the player obtains feature games (bonus games) of an additional n times (Step T12). For example, in FIG. 20, because a win situation is established in the ordinary reels (B3, B5, B7), by the trigger symbol, a second re-drawing reel group is structured by reels B3, B5, and B7.

In a third feature game, as shown in FIG. 21, the first re-drawing reel group (B1, B4, 30 B6, and B8), the second re-drawing reel group (B3, B5, and B7), and the ordinary reels (B2 and B9) respectively rotate independently (Step F8).

When rotation of every reel stops, it is determined whether there is a win situation or not (Step F9). In a case where a win situation is not established, the flow forwards to Step T13, and in a case where a win situation is established, every dividend corresponding to that win is paid (Step F5). The dividend at this time, is determined based on the BET situation. Then, it is determined whether there are any feature games (bonus games) left, or whether a win situation is established by the trigger symbol (Step T6). In a case where there aren't any feature games (bonus games) left and a win situation is not established by the trigger symbol, the flow forwards to Step T14. On the other hand, in a case where feature games (bonus games) are left, or a win situation is established by a trigger symbol, it is determined whether there is a same symbol in the ordinary reels adjacent to the re-drawing reel (Step T7). In a case where there isn't a same symbol in the ordinary reels adjacent to the re-drawing reel group, the flow forwards to Step T9, and in a case where there is a same symbol in an ordinary reel adjacent to the re-drawing reel group, the ordinary reel is combined to the re-drawing reel group (Step T8).

Then, it is determined whether a same symbol is displayed in adjacent re-drawing reel groups (Step T10). As shown in FIG. 22, when a same symbol "7" is displayed in the first re-drawing reel group (B1, B4, B6, and B8), and the second re-drawing reel group (B3, B5, and B7), the first and the second re-drawing reel group combines, and one re-drawing reel group is generated. Next, it is determined whether a win situation is established by the trigger symbol (Step Ti), and in a case where a win situation is not established by the trigger symbol, the flow forwards to Step T3, and in a case where a win situation is established by the trigger symbol, bonus games of an additional n times is provided to the player (Step T12). Then, the flow forwards to Step T3.

In the fourth feature game, as shown in FIG. 23, the re-drawing reels group structured by reels (B1, B3, B4, B5, B6, B7, and B8), and the ordinary reels (B2, and B5) independently rotate from a direction of B to A in FIG. 23.

In Step T4, in a case where a win situation is not established, it is determined whether a feature game (bonus game) is left (Step T13), and in a case where there is a feature game (bonus game) left, the flow forwards to Step T3, and games are carried out until the number of feature games reaches a predetermined number. In a case where there isn't a feature game (bonus game) left, the flow forwards to Step T14. In Step T6, in a case where there isn't a feature game (bonus game) left, and there isn't a win situation by the trigger symbol, the feature game (bonus game) ends (Step T14), and moves to a game waiting state (Step T15). At the BET time of the next game, the re-drawing reel is retuned to an ordinary reel (Step T16). From the next game, an ordinary game is carried out once again.

(Fifth Embodiment)

In the fifth embodiment, a win situation is established, in a case where three or more same symbols are adjacent in an ordinary game. In a case where a win situation is established by three trigger symbols being adjacent, feature games (bonus games) are carried out five games after that game. In these feature games, reels where the trigger symbols appeared in the ordinary game, are switched to re-drawing reels. In a case where the same symbol is displayed in an ordinary reel that is adjacent to the re-drawing reels, the ordinary reel is combined to the re-drawing reels. Namely, the number of reels that structure the re-drawing reels increases. In a case where a plurality of re-drawing reels exist, when a same symbol is displayed in adjacent re-drawing groups, the re-drawing groups are combined, and becomes one re-drawing reel group. During the period of the feature game, a win situation by the trigger symbol, does not occur. The hardware structure of the gaming machine according to the fifth embodiment, can be structured in the same way as the first embodiment.

The performance of the gaming machine according to the third embodiment, will be described with reference to the flowcharts of FIGS. 28 and 29. In a waiting state of an ordinary game, a screen such as shown in FIG. 5 is displayed in the symbol display unit 7. Namely, reels A1 to A9 that have hexagon shapes, and which independently change or stop displays a symbol, is displayed in the center part of the screen. Other than that, a credit meter which displays number of credits, a BET meter which displays number of BETs, and a WON meter which indicates the number of medals to be paid to a user, at a win situation. In the fifth embodiment, as above, a win situation is established when three or more sides of hexagons of a same symbol are adjacent, when each reel A1 to A9 stops.

Figure 28:
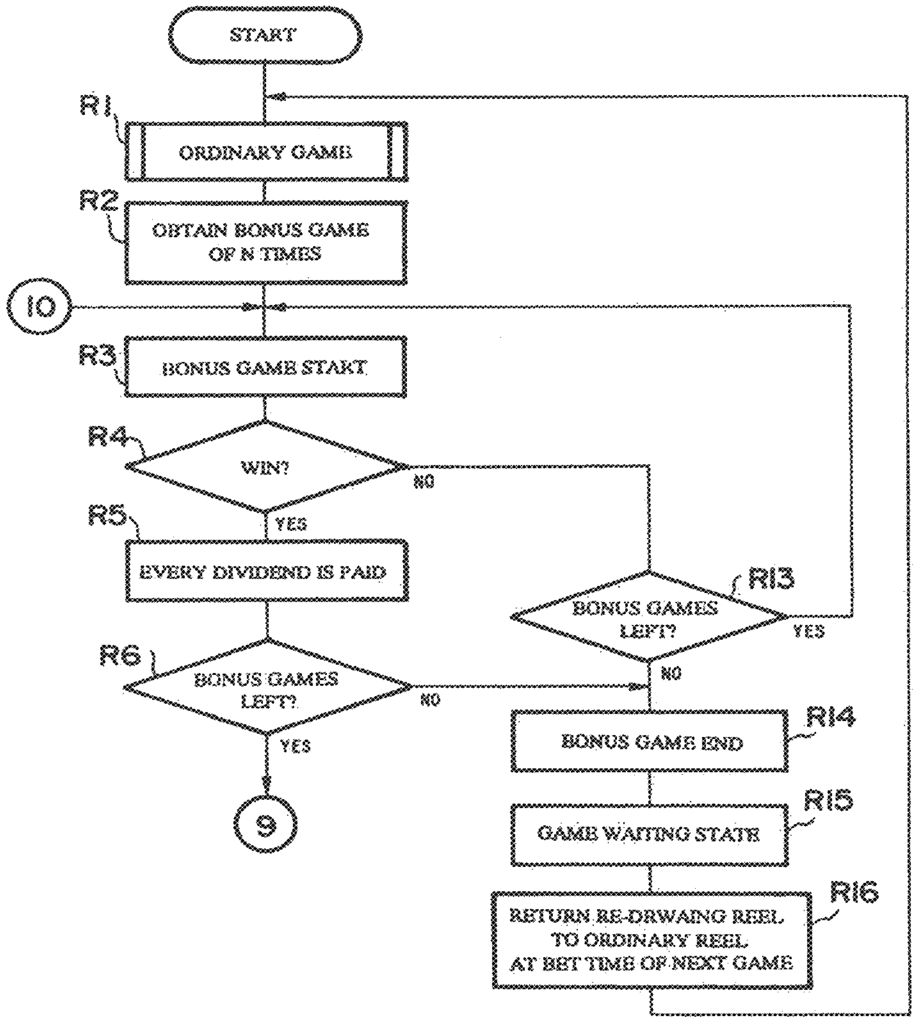
FIG. 28 is a flowchart showing performance of a gaming machine according to a fifth embodiment.
Figure 29:
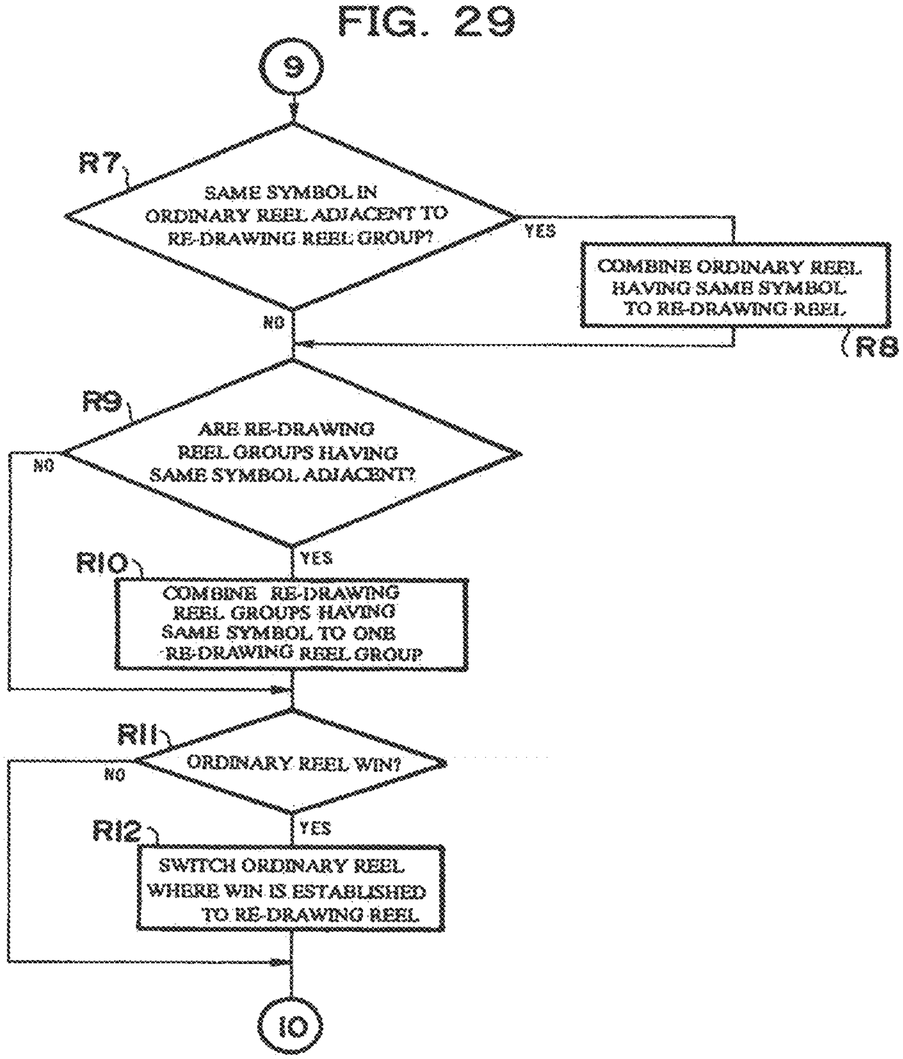
FIG. 29 is a flowchart showing performance of the gaming machine according to the fifth embodiment.

In the flowchart shown in FIG. 28, an ordinary game such as the first embodiment, is carried out (Step R1). Then, as shown in FIG. 7, in a case where a win situation is established by three or more trigger symbols "TRG" being adjacent, a dividend is provided to the player, and feature games (free games) as bonus games, are started. In the fifth embodiment, the number of feature games is five (Step R2).

When a first free game (bonus game) is started (Step R3), reels A5, A7, and A9 that have displayed trigger symbols, are switched to re-drawing reels (Step S7). The reels A5, A7, and A9 that become re-drawing reels are called a "first re-drawing reel group" as one group. Symbol alignment is the same, and synchronously rotates and stops at the same position on the reel in each reel A5, A7, and A9, which structure the re-drawing reel group.

For example, as shown in FIG. 8, the first re-drawing reel group (A5, A7, and A9) synchronously rotates, and the other reels independently rotate randomly. When the rotation of every ordinary reel and the first re-drawing reel group stops, it is determined whether a win situation is established or not (Step R4). In a case where a win situation is not established, the flow forwards to Step R13, and as shown in FIG. 9, in a case where a win situation is established, every dividend is paid (Step R5). The dividend at this time is set in accordance with the BET state. In FIG. 9, a win situation is established by the "BAR" symbols matching in adjacent reels A1, A2, and A4. Also, a win situation is established by "7" symbols matching in adjacent reels A6, A5, A7, and A9.

Then, it is determined whether there are any feature games (bonus games) left (Step R6). In a case where there aren't any feature games left, the flow forwards to Step R14, and in a case where there are feature games left, it is determined whether a win situation is established in the ordinary reels that are adjacent to the re-drawing reel group (Step R7). In a case where there isn't this kind of symbol, the flow forwards to Step R9, and in a case where there is this kind of symbol, the ordinary reel that has displayed the same symbol is combined to one re-drawing reel group (Step R8). Namely, as shown in FIG. 9, the reel A6 is adjacent to the first re-drawing reel group A5, A7, and A9, and has displayed a same symbol "7", the reel A6 is switched to a re-drawing reel, and structures the first re-drawing reel. Therefore, reels A5, A6, A7, and A9 have the same symbol alignment, and synchronously rotates and stops at the same position.

Then, it is determined whether same symbols are displayed in adjacent re-drawing reel groups, in a case where a plurality of re-drawing reel groups exist (Step R9). In a case where same symbols are not displayed in adjacent re-drawing reel groups, the flow forwards to step R11, and in a case where same symbols are displayed in adjacent re-drawing reel groups, the re-drawing reel groups that have displayed the same symbol, are combined (Step R10). Next, it is determined whether a win situation is established in the ordinary reels (Step R11). In a case where a win situation is not established in the ordinary reels, the flow forwards to Step R3, and in a case where a win situation is established in the ordinary reels, the ordinary reels that have established a win, is switched to a re-drawing reel (Step R12). For example, in a case shown in FIG. 9, a win situation is established by the "BAR" symbols matching in adjacent reels A1, A2, and A4. Therefore, these ordinary reels are switched to re-drawing reels, and become a second re-drawing reel group.

Next, the flow returns to Step R3, and a second feature game (bonus game) is carried out. Here, as shown in FIG. 10, the first re-drawing reel group (A5, A6, A7, and A9) that has the number of reels increased, the second re-drawing reel group (A1, A2, and A4), and the other ordinary reels (A3, and A8) respectively rotate independently. When every ordinary reel and re-drawing reel stops, it is determined whether a win situation is established or not (Step R4). For example, as shown in FIG. 11, in a case where a win situation is established in the first re-drawing reel group (A5, A6, A7, and A9), by a "BAR" symbol matching, and a win situation is established in the second re-drawing reel group (A1, A2, and A4), by the "BAR" symbol matching, dividend is paid (Step R5), and it is determined whether there are any feature games (bonus games) left (Step R6). In a case where a feature game is left, it is determined whether same symbols have appeared in ordinary reels adjacent to the re-drawing reel groups (here, it is the first and second re-drawing reel group) (Step R7). In a case where the same symbols have not appeared in the ordinary reels adjacent to the re-drawing reels, the flow forwards to Step R9, and in a case where the same symbols appear in the ordinary reels adjacent to the re-drawing reels, the ordinary reel that has the same symbol, is combined to the adjacent re-drawing reel group (Step R8).

In a case where a plurality of re-drawing reel groups exist, it is determined whether same symbols appear in adjacent re-drawing reel groups (Step R9). In a case where same symbols do not appear in adjacent re-drawing reel groups, the flow forwards to Step R10, and in a case where same symbols appear in adjacent re-drawing reel groups, the re-drawing reel group that has appeared the same symbol, is combined to one re-drawing reel group (Step R10). For example, as shown in FIG. 11, the same "BAR" symbol is displayed in the first re-drawing reel group (A5, A6, A7, and A9), and the second re-drawing reel group (A1, A2, A4). Therefore, the first and second re-drawing reels are combined to form a new reel group (a new re-drawing reel group). Namely, as shown in FIG. 11, reels (A1, A2, A4, A5, A6, A7, and A9) structure a new re-drawing reel group.

Next, it is determined whether a win situation is established in the ordinary reels (Step R11), and in a case where a win situation is not established, the flow forwards to Step R3, and in a case where a win situation is established, the reels according to that win are switched to re-drawing reels (Step R12). The case shown in FIG. 11, is a case where a win situation is not established in the ordinary reels.

In the next game, as shown in FIG. 12, a new re-drawing reel group (A1, A2, A4, A5, 5 A6, A7, and A9) and the ordinary reels (A3 and A8) respectively rotate independently.

As the above, third to fifth feature games are further carried out. Namely, in Step R4, in a case where a win situation is not established, it is determined whether a feature game (bonus game) is left (Step R13), and in a case where there is a feature game (bonus game) left, the flow forwards to Step R3. On the other hand, in Step R13, in a case where there isn't a feature game (bonus game) left, the flow forwards to Step R14. In Step R6, in a case where there isn't a feature game (bonus game) left, the feature game (bonus game) ends (Step R14), and moves to a game waiting state (Step R15). At the BET time of the next game, the re-drawing reel is returned to an ordinary reel (Step R15). From the next game, an ordinary game is carried out once again.

As described in the first to fifth embodiment, by the condition of re-drawing reels appearing, the condition of reels that structure the re-drawing reels increasing, and the number of the re-drawing reels themselves increasing, the game variation increases. By applying a plurality of trigger symbols, a more diverse game can be carried out.

(Sixth Embodiment)

A gaming machine according to a sixth embodiment, differs from the above first to fifth embodiments, in that the gaming machine comprises a reel that displays three-position reels, i.e., a reel that can display symbols in three columns, up, medium, and bottom, in one reel. This gaming machine determines whether it is a win situation or not, by a win line. The reel that the gaming machine comprises may be a rotating drum type, or a video type.

Figure 32:
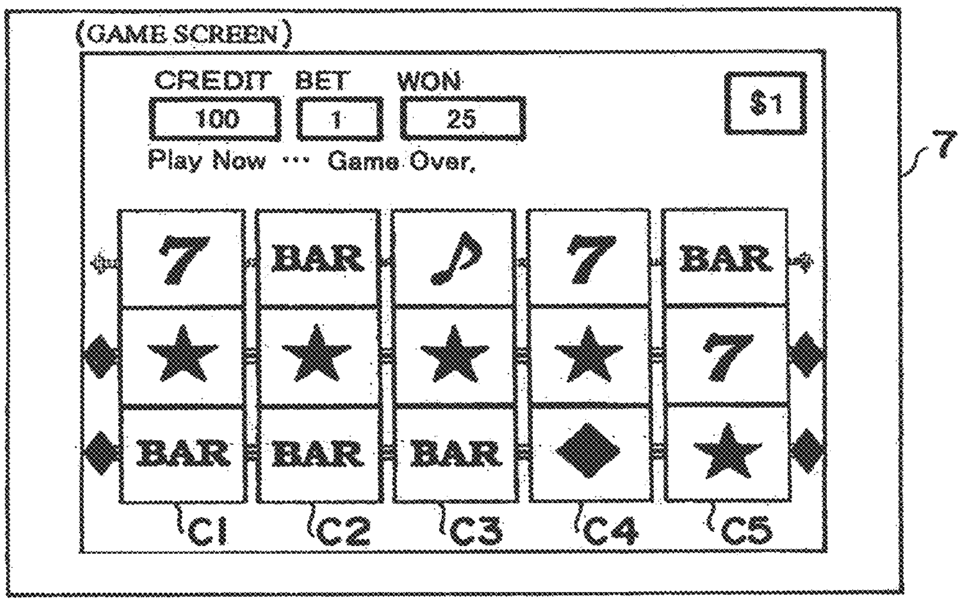
FIG. 32 is a diagram showing a screen display example of the gaming machine according to the sixth embodiment.

In a waiting state of an ordinary game, a screen such as shown in FIG. 32, is displayed in a symbol display unit 7. Namely, five independent reels C1 to C5 that have different symbol alignment are displayed in a center part of the screen. These reels C1 to C5 structure a display region. There are symbol stop positions in up, middle, down column of the three columns, in each of the reels C1 to C5. A win line is set in each column. Betting on a pre-set win line is carried out, and a win situation in a game in the sixth embodiment is established in a case where a combination of equal to or more than a predetermined number of symbols match. For example, it can be set so that a win situation is established when three or more symbols appear on the win line.

In the case shown in FIG. 32, a win is situation is established by four "El" symbols matching in the win line of the middle column. Also, a win situation is established by three "BAR" symbols matching.

Ways for the symbols to match, for a win situation to be established may be for example, "the symbols may be in any place, as long as it is on the win line", "the symbols are adjacent on the win line", "the symbols are adjacent in an order from left end to the right direction", "the symbols are adjacent in an order from the right end to the left direction", and "the symbols are adjacent in an order from left end to right direction and right end to left direction", etc.

In the reels C1 to C5, a "scatter symbol" which is effective just by appearing in any reel, not concerning the win line. In the symbol display unit 7, a credit meter which displays number of credits, a BET meter which displays number of BETs, and a WON meter which shows the number of medals to be paid to the player when a win situation is established, are displayed.

In the sixth embodiment, in a case where three or more "trigger symbols", which are scatter symbols, appear in any of three or more reels, feature games (bonus games) are carried out five games after that game. In these feature games, reels where the trigger symbols appeared in the ordinary game, are switched to re-drawing reels. The reel that has displayed a trigger symbol during a feature game, is switched to a re-drawing reel from the next game. Namely, the number of re-drawing reels that structure one re-drawing reel group increases. The hardware structure of the gaming machine according to the sixth embodiment, can be structured in the same way as the first embodiment.

In the flowchart shown in FIG. 3, when a player inserts credits or money (these can be medals, coins, or cards), and carries out BET operation (STEP S1), a game is started (Step S2). At the same time as start of the game, as shown in FIG. 6, each reel A1 to A9 rotates in a direction from B to A in FIG. 6, and change displays symbols. Here, symbol alignment and rotating timing of each reel A1 to A9 each differ. Therefore, while the reels are rotating, it is unlikely that one reel becomes the same situation as another reel. Each reel A1 to A9 stops at predetermined timing, after a predetermined time has passed after starting rotation.

In the flowchart shown in FIG. 3, it is determined whether a win situation is established or not (Step S3). In a case where a win situation is not established, the game ends (Step S20), and in a case where a win situation is established, every dividend corresponding to that win is paid (Step S4). The dividend at this time, is determined in accordance with the BET situation. Then, it is determined whether the win is a win situation established by the trigger symbol (Step S5). In a case where the win situation is not established by the trigger symbol, the game ends (Step S20).

Performance of the gaming machine according to a sixth embodiment structured as above, will be described with reference to flowcharts in FIGS. 30 and 31.

Figure 30:
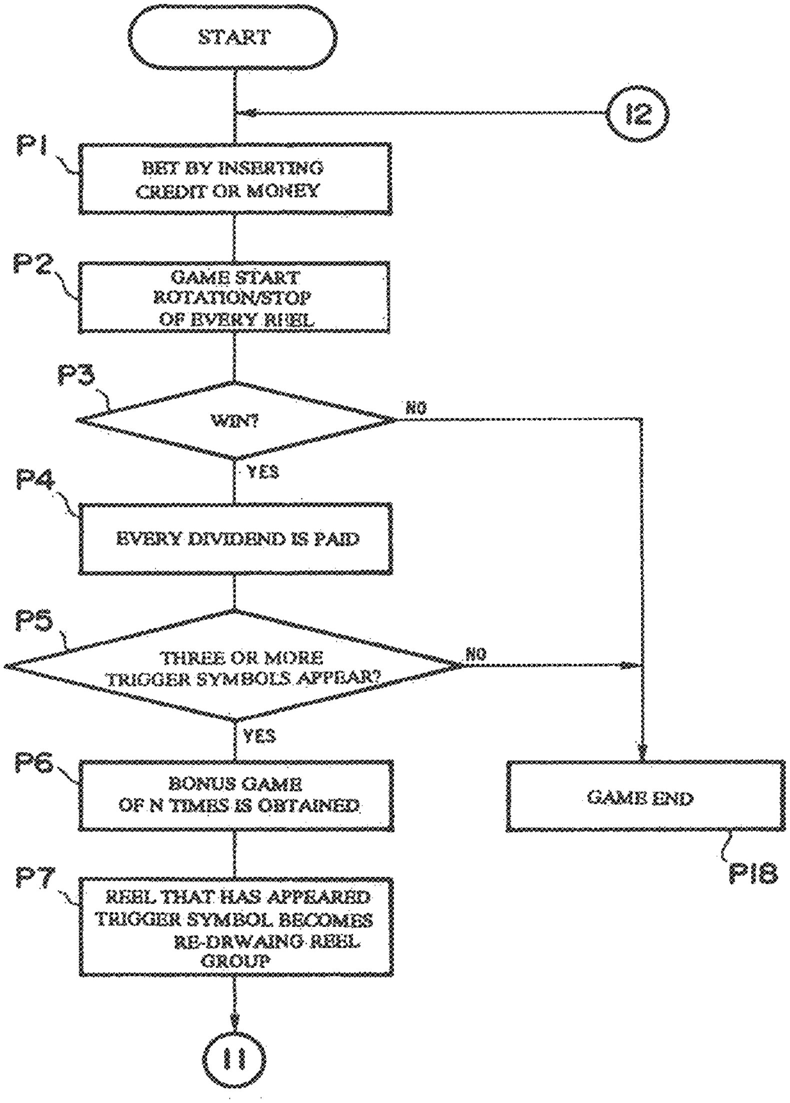
FIG. 30 is a flowchart showing performance of a gaming machine according to a sixth embodiment.
Figure 31:
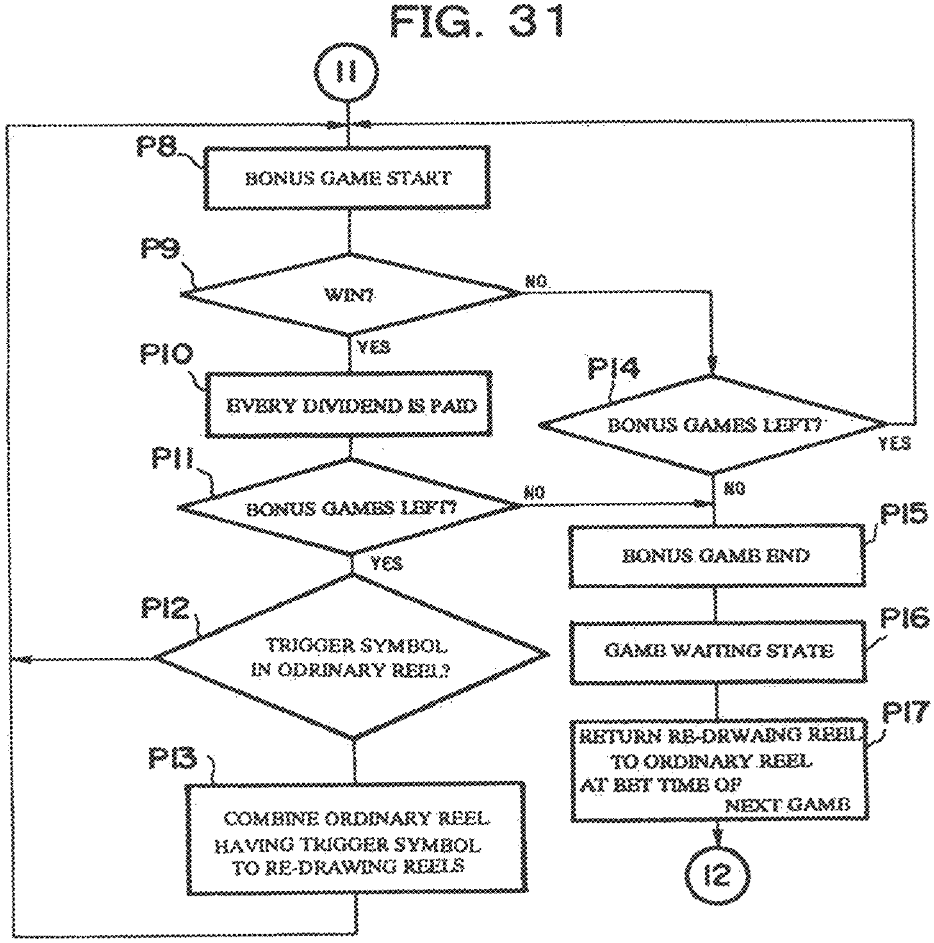
FIG. 31 is a flowchart showing performance of the gaming machine according to the sixth embodiment.

In the flowchart shown in FIG. 30, when a player inserts credits or money (these can be medals, coins, or cards), and carries out BET operation (STEP P1), a game is started (Step P2). At the same time as start of the game, each reel C1 to C5 rotates, and change displays symbols. Here, symbol alignment and rotating timing of each reel C1 to C5 each differ. Therefore, while the reels are rotating, it is unlikely that one reel becomes the same situation as another reel. Each reel C1 to C5 stops at a predetermined timing, after a predetermined time has passed after starting rotation. Then, it is determined whether a win situation is established or not (Step P3). In a case where a win situation is not established, the game ends (Step P18), and in a case where a win situation is established, every dividend corresponding to that win is paid (Step P4). The dividend at this time, is determined in accordance with the BET situation. Then, it is determined whether the win is a win situation established by three or more trigger symbols appearing (Step P5). In a case where the win situation is not established by the three or more trigger symbols appearing, the game ends (Step P18).

Figure 33:
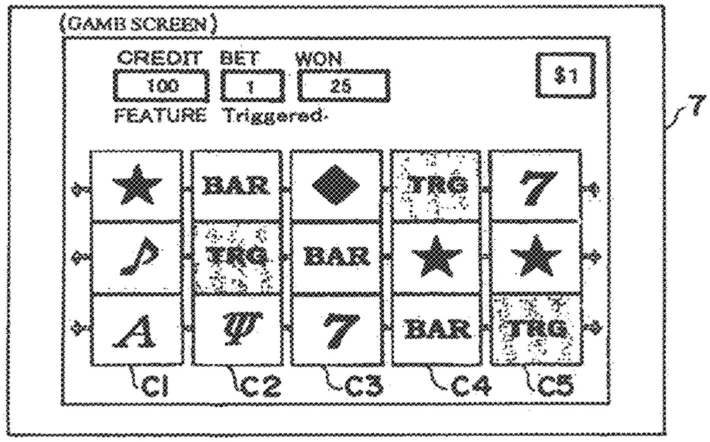
FIG. 33 is a diagram showing a screen display example of the gaming machine according to the sixth embodiment.

On the other hand, as shown in FIG. 33, in a case where a win situation is established by a total of three trigger symbols appearing in reels A5, A7, and A9, a feature game as a bonus game is started. Namely, the feature game is carried out in a case where three ore more trigger symbols appear in three or more of any reels. The number of times of the feature game is n (n is a natural number) times from the next game. In the sixth embodiment, the number of times of the feature game is five times (Step P6).

Figure 34:
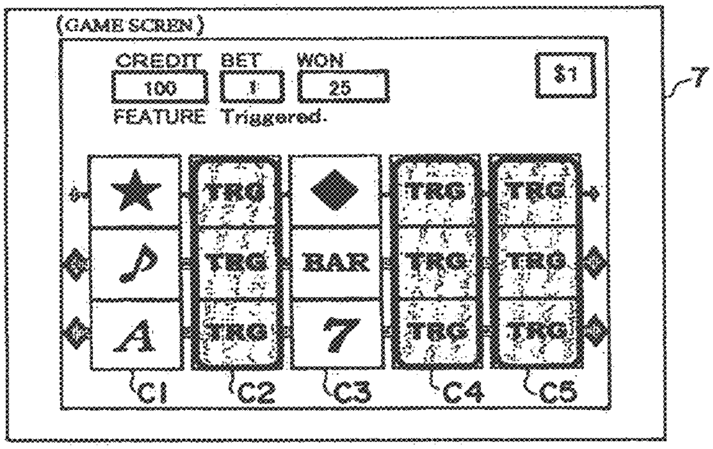
FIG. 34 is a diagram showing a screen display example of the gaming machine according to the sixth embodiment.

Reels C2, C4, and C5 that have displayed trigger symbols when a first free game is started, are switched to re-drawing reels. The reels C2, C4, and C5 that become re-drawing reels are called a "re-drawing reel group" as one group. As shown in FIG. 34, in the re-drawing reels, three same symbols are placed sequentially, and is set so that only the same symbols always stop on the reel. The re-drawing reels maintain a situation where the same symbols appear in every position, and carries out re-drawing of the symbols. Symbol alignment of the re-drawing reels and the ordinary reels are completely different. Here, because a win situation is not necessarily established in a maintained state, it does not necessarily mean that a win situation is maintained. Reels, wherein trigger symbols appeared, during the feature game period, are switched to re-drawing reels.

Figure 35:
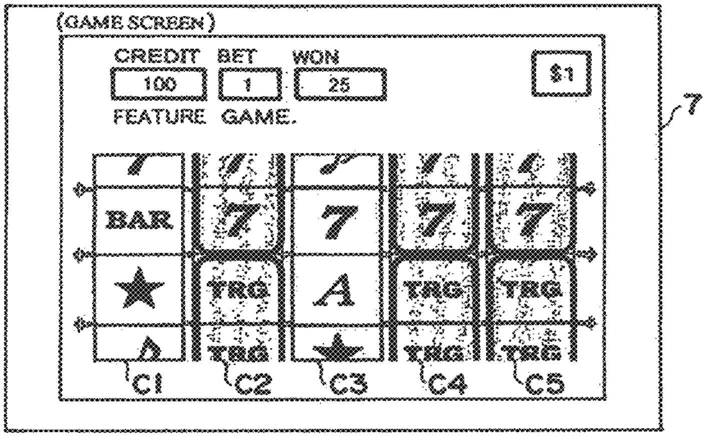
FIG. 35 is a diagram showing a screen display example of the gaming machine according to the sixth embodiment.

When a feature game (bonus game) is started (Step P8), as shown in FIG. 35, the re-drawing reel group (C2, C4, and C5) synchronously rotates the three sequential symbols, and the other reels (C1 and C3) independently rotate randomly. When the rotation of every ordinary reel and the re-drawing reel group stops, it is determined whether a win situation is established or not (Step P9). In a case where a win situation is not established, the flow forwards to Step P14. In a case where a win situation is established, every dividend is paid (Step P10). The dividend at this time is set in accordance with the BET state. For example, as shown in FIG. 36, when five "0" symbols match on the middle win line, a win situation corresponding to that symbol, and the number thereof is established.

Then, it is determined whether there are any feature games (bonus games) left (Step P11). In a case where there aren't any feature games left, the flow forwards to Step P15, and in a case where there are feature games left, it is determined whether a trigger symbol appeared in the ordinary reels or not (Step P12). In a case where a trigger symbol does not appear in the ordinary reels, the flow forwards to Step P8, and in a case where a trigger symbol appears in the ordinary reels, the ordinary reel that has appeared a trigger symbol is switched to a re-drawing reel, and combined (Step P13).

Figure 36:
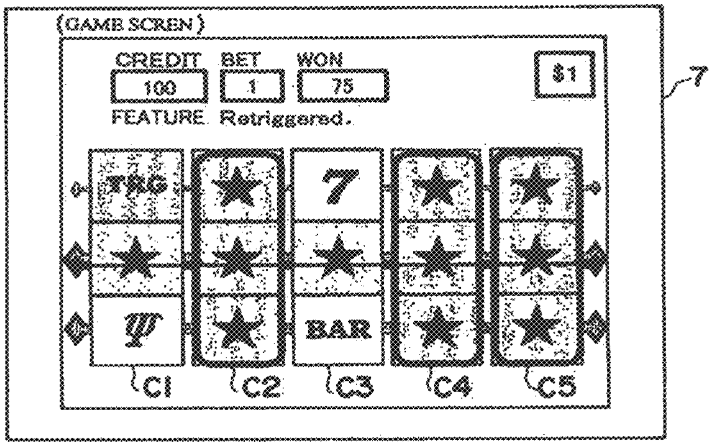
FIG. 36 is a diagram showing a screen display example of the gaming machine according to the sixth embodiment.

For example, in the case shown in FIG. 36, a trigger symbol appears in an ordinary reel C1, at the same time a win situation is established by five "0" symbols matching. Therefore, the reel C1 is switched to a re-drawing reel. Then, in the next feature game, the reel C1 has the same symbol alignment as the other re-drawing reels, and synchronously rotates, and stops at the same position on the reel. Namely, in the feature game, re-drawing reels structured by redrawing reels (C1, C2, C4, and C5), and an ordinary reel C4, co-exist.

Figure 37:
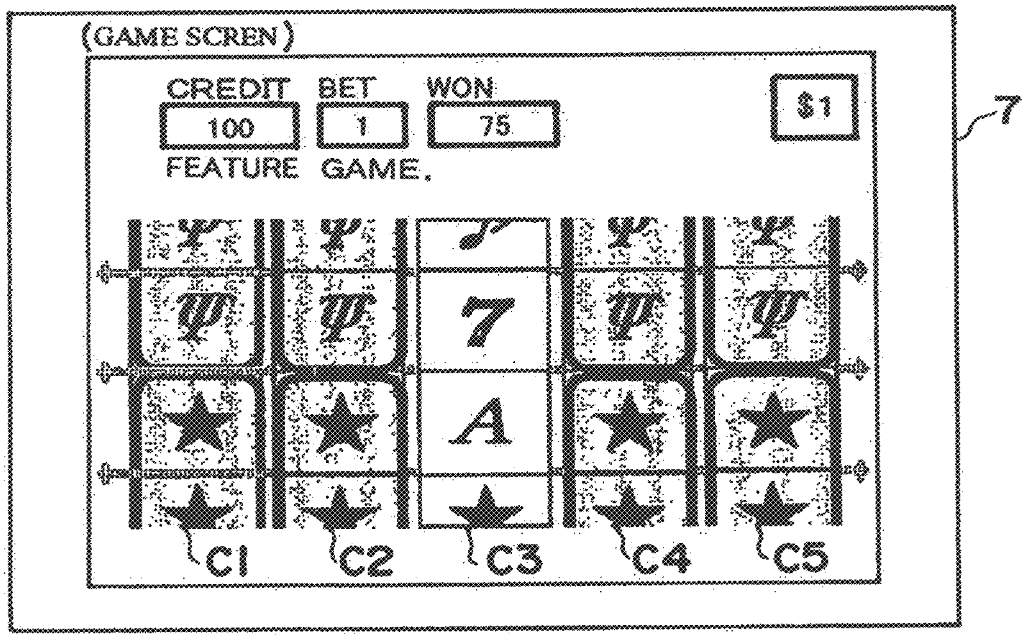
FIG. 37 is a diagram showing a screen display example of the gaming machine according to the sixth embodiment.

Next, the flow returns to Step P8, and as the above, the second to fifth feature games are carried out. As shown in FIG. 37, the re-drawing reels (C1, C2, C4, and C5) and the ordinary reel C3 respectively rotate independently. When every rotation of the reels stop, it is determined whether a win situation is established (Step P9), and in a case where win situation is not established, it is determined whether any feature games (bonus games) are left (Step P 14), and in a case where feature games (bonus games) are left, the flow forwards to Step P8. On the other hand, in Step P14, in a case where there aren't any feature games (bonus games), the flow forwards to Step P15. In Step P11, in a case where there aren't any feature games (bonus games) left, the feature game (bonus game) ends (Step P15), and moves to a game waiting state (Step P16). At the BET time of the next game, the re-drawing reel is retuned to an ordinary reel (Step P 17). From the next game, an ordinary game is carried out once again.

(Seventh Embodiment)

The seventh embodiment is also a gaming machine that comprises five reels, in the same way as the sixth embodiment. However, symbol alignment in the re-drawing reels and the ordinary reels are completely the same. Namely, the re-drawing reels in the seventh embodiment, do not have placed three same symbols sequentially, but have the same symbol alignment as the ordinary reels. In the seventh embodiment, when a trigger symbol appears in an ordinary reel during a feature game, the ordinary reel is switched to a re-drawing reel. Namely, the number of re-drawing reels that structure one re-drawing reel group increases. Other structure in the seventh embodiment, is the same as the sixth embodiment.

Figure 38:
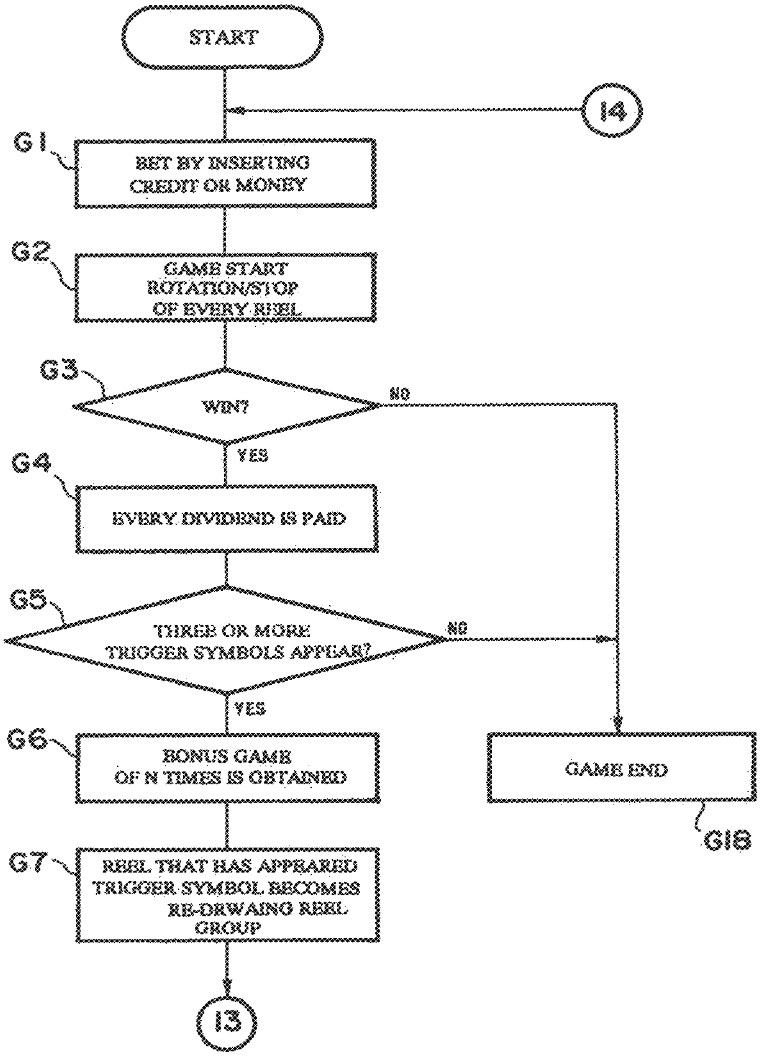
FIG. 38 is a flowchart showing performance of a gaming machine according to a seventh embodiment.
Figure 39:
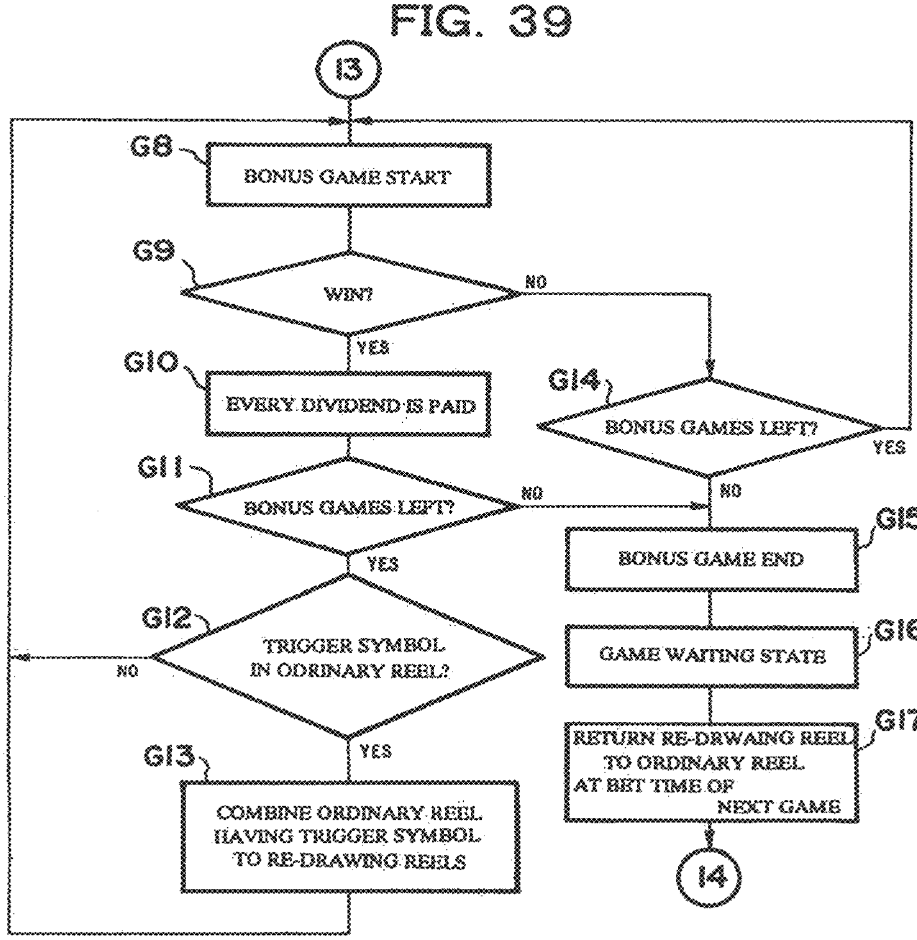
FIG. 39 is a flowchart showing performance of the gaming machine according to the seventh embodiment.
Figure 40:
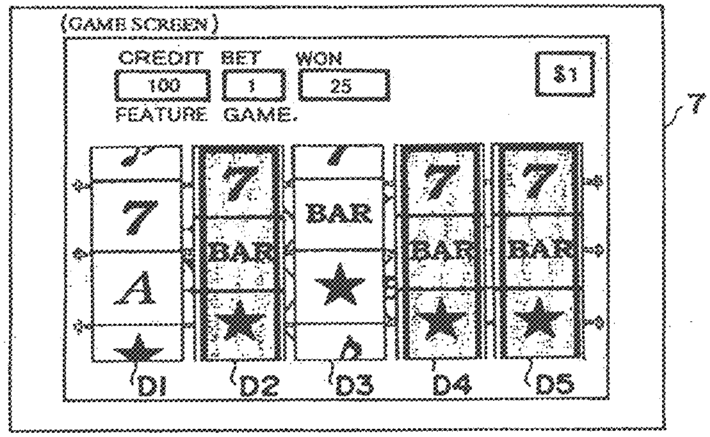
FIG. 40 is a diagram showing a screen display example of a gaming machine according to the seventh embodiment.

Performance of the gaming machine according to the seventh embodiment, will be described with reference to FIGS. 38 and 39. In the flowchart shown in FIG. 38, when a player inserts credits or money (these can be medals, coins, or cards), and carries out BET operation (STEP G1), a game is started (Step G2). At the same time as start of the game, as shown in FIG. 40, each reel D1 to D5 rotates, and change displays symbols. The reels D1 to D5 structure a display region. Here, symbol alignment and rotating timing of each reel D1 to D5 differ. Therefore, while the reels are rotating, it is unlikely that one reel becomes the same situation as another reel. Each reel D1 to D5 stops at a predetermined timing, after a predetermined time has passed after starting rotation. Then, it is determined whether a win situation is established or not (Step G3). In a case where a win situation is not established, the game ends (Step G18), and in a case where a win situation is established, every dividend corresponding to that win is paid (Step G4). The dividend at this time, is determined in accordance with the BET situation. Then, it is determined whether the win is a win situation established by three or more trigger symbols appearing (Step G5). In a case where the win situation is not established by three or more trigger symbols appearing, the game ends (Step G18).

On the other hand, in a case where a win situation is established by three or more trigger symbols appearing, a feature game as a bonus game is started. Namely, the feature game is carried out in a case where three ore more trigger symbols appear on whichever three or more reels. The number of times of the feature game is n (n is a natural number) times from the next game. In the seventh embodiment, the number of times of the feature game is five times (Step G6).

Figure 41:
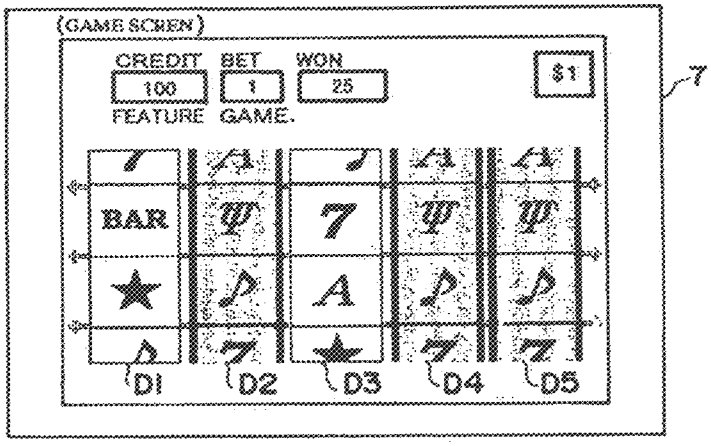
FIG. 41 is a diagram showing a screen display example of the gaming machine according to the seventh embodiment.

Reels that have displayed trigger symbols when a first free game (bonus game) is started (for example, reels D2, D4, and D5), are switched to re-drawing reels. The reels D2, D4, and D5 that become re-drawing reels are called a "re-drawing reel group" as one group. As shown in FIG. 41, the re-drawing reels are set so that only the same symbols always stop on the same win line. The re-drawing reels maintain a situation where the same symbols appear in every position, and carries out re-drawing of the symbols. Here, because a win situation is not necessarily established in a maintained state, it does not necessarily mean that a win situation is maintained. Reels, wherein trigger symbols appeared, during the feature game period, are switched to re-drawing reels.

When a feature game (bonus game) is started (Step G8), as shown in FIG. 41, the re-drawing reel group (D2, D4, and D5) synchronously rotates, and the other reels (ordinary reels: D1 and D3) independently rotate randomly. When the rotation of every ordinary reel and the first re-drawing reel group stops, it is determined whether a win situation is established or not (Step G9). In a case where a win situation is not established, the flow forwards to Step G14. In a case where a win situation is established, every dividend is paid (Step G10). The dividend at this time is set in accordance with the BET state. For example, as shown in FIG. 42, when five "BAR" symbols match in the bottom column, a win situation in accordance with that symbols and the number of symbols, is established.

Then, it is determined whether there are any feature games (bonus games) left (Step G11). In a case where there aren't any feature games (bonus games) left, the flow forwards to Step G15, and in a case where there are feature games (bonus games) left, it is determined whether triggers symbols have appeared in the ordinary reels (Step G 12). In a case where trigger symbols have not appeared in the ordinary reels, the flow forwards to Step G15, and in a case where trigger symbols have appeared in the ordinary reels, the ordinary reel that has appeared a trigger symbols is switched to a re-drawing reel, and combined (Step G13).

Figure 42:
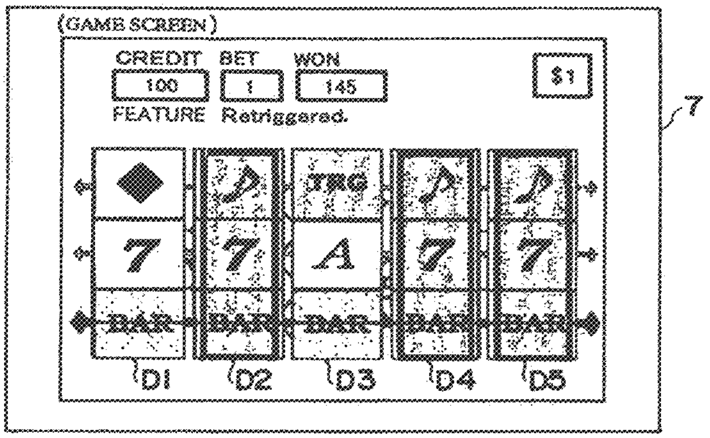
FIG. 42 is a diagram showing a screen display example of the gaming machine according to the seventh embodiment.
Figure 43:
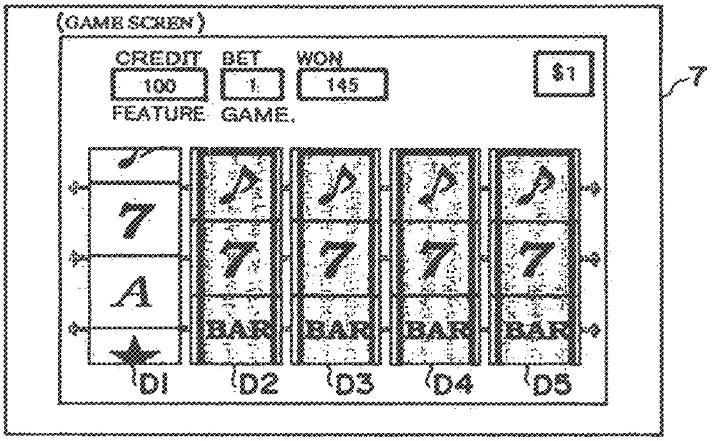
FIG. 43 is a diagram showing a screen display example of the gaming machine according to the seventh embodiment.

For example, in the case shown in FIG. 42, a win situation is established by five "BAR" symbols matching in the bottom column, and a trigger symbol appearing in an ordinary reel D3. Therefore, the reel D3 is switched to a re-drawing reel. Then, in the next feature game, the reel D3 has the same symbol alignment as the other re-drawing reels, and synchronously rotates, and stops at the same position on the reel. Namely, as shown in FIG. 43, in the next feature game, re-drawing reels structured by re-drawing reels (D2, D3, D4, and D5), and an ordinary reel D1, co-exist.

Figure 44:
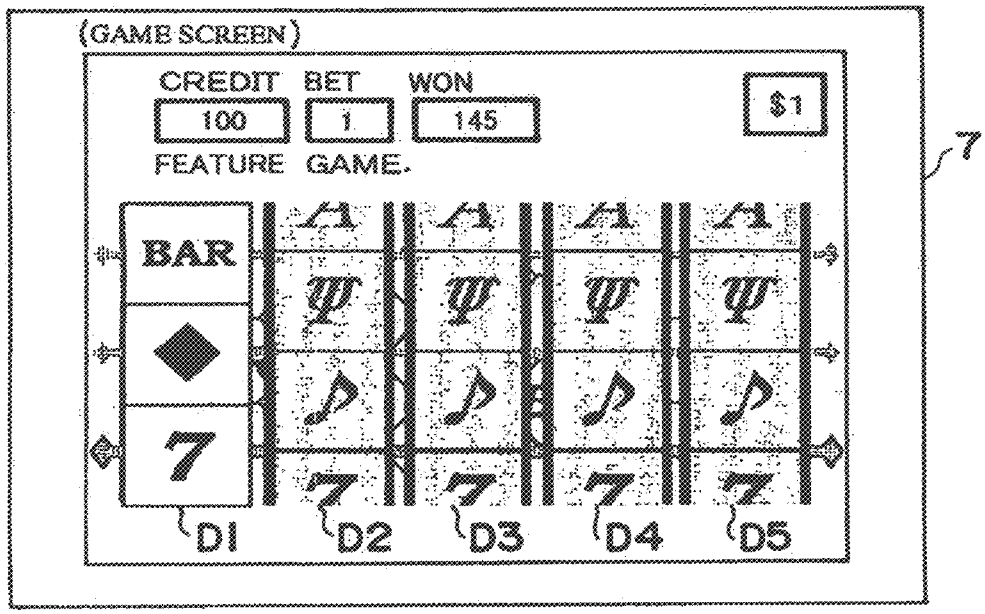
FIG. 44 is a diagram showing a screen display example of the gaming machine according to the seventh embodiment.

Next, the flow returns to Step G8, and as the above, the second to fifth feature games are carried out. As shown in FIG. 44, the re-drawing reels (D2, D3, D4, and D5) and the ordinary reel D1 respectively rotate independently. When every rotation of the reels stop, it is determined whether a win situation is established (Step G9), and in a case where win situation is not established, it is determined whether any feature games (bonus games) are left (Step G14), and in a case where feature games (bonus games) are left, the flow forwards to Step G8. On the other hand, in Step G14, in a case where there aren't any feature games (bonus games), the flow forwards to Step G15. In Step G11, in a case where there aren't any feature games (bonus games) left, the feature game (bonus game) ends (Step G15), and moves to a game waiting state (Step G16). At the BET time of the next game, the re-drawing reel is retuned to an ordinary reel (Step G17). From the next game, an ordinary game is carried out once again.

(Eighth Embodiment)

In the eighth embodiment, an embodiment where the number of re-drawing reel groups increase during a feature game, will be described. The structure of the gaming machine, is the same as the sixth embodiment.

Figure 45:
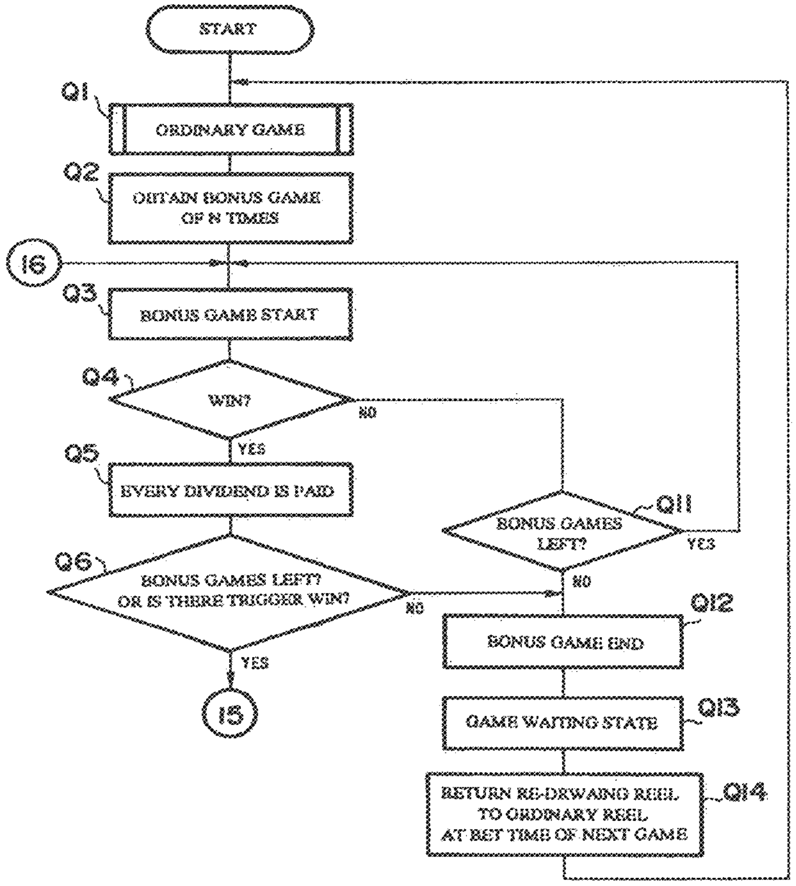
FIG. 45 is a flowchart showing performance of a gaming machine according to an eighth embodiment.
Figure 46:
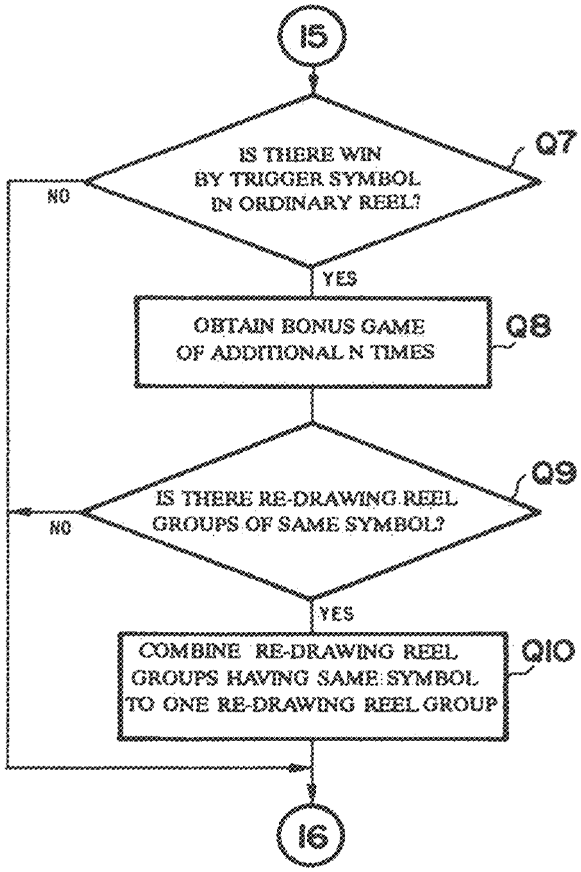
FIG. 46 is a flowchart showing performance of the gaming machine according to the eighth embodiment.

The performance of the gaming machine according to the eighth embodiment, will be described with reference to the flowcharts of FIGS. 45 and 46. In the flowchart shown in FIG. 45, in the same way as the sixth embodiment and the seventh embodiment, an ordinary game is carried out (Step Q1). Then, in a case where a win situation is established by a total of three trigger symbols appearing, feature games as bonus games start. The number of times of the feature game is n (n is a natural number) times from the next game. In the eighth embodiment, the number of times of the feature game is five times (Step Q2).

When a first free game (bonus game) starts, the reel that has displayed a trigger symbol, is switched to a re-drawing reel. The reels that become re-drawing reels, are called a "redrawing reel group" as one group. Three same symbols may be placed sequentially in the redrawing reels, in the same way as the sixth embodiment, and may have the same symbol alignment as the ordinary reels, in the same way as the seventh embodiment. The re-drawing reels are set so that only the same symbols always stop on the reel. The re-drawing reels maintain a situation where the same symbols appear in every position, and carries out re-drawing of the symbols. Here, because a win situation is not necessarily established in a maintained state, it does not necessarily mean that a win situation is maintained.

When a feature game (bonus game) is started (Step Q3), the re-drawing reels (C2, synchronously rotate three sequential symbols, and the other reels independently rotate randomly. When the rotation of every ordinary reel and the re-drawing reel group stops, it is determined whether a win situation is established or not (Step Q4). In a case where a win situation is not established, the flow forwards to Step Q11. In a case where a win situation is established, every dividend is paid (Step Q5). The dividend at this time is set in accordance with the BET state.

Then, it is determined whether there are any feature games (bonus games) left, or whether there is a win situation by the trigger symbol (Step Q6). In a case where there aren't any feature games left and there isn't a win situation by the trigger symbol, the flow forwards to Step Q12, and in a case where there are feature games left, or there is a win situation by the trigger symbol, it is determined whether a win situation is established by the trigger in an ordinary reel (Step Q7). In a case where a win situation by a trigger symbol is not established in an ordinary reel, the flow forwards to step Q3, and in a case where a win situation by a trigger symbol is established in an ordinary reel, the player obtains a feature game (bonus game) of an addition of n times (Step Q8). Then, in the next game, the ordinary reel that has established a win situation by the trigger symbol, is switched to an independent re-drawing reel, which differs from the already existing re-drawing reels.

Then, it is determined whether same symbols are displayed in re-drawing reel groups, in a case where a plurality of re-drawing reel groups exist (Step Q9). In a case where there aren't 5 any re-drawing reel groups, wherein the same symbols appear, the flow forwards to Step Q3. On the other, in a case where there are re-drawing reel groups, wherein the same symbols appear, the re-drawing reel groups having the same symbols are combined to one re-drawing reel group (Step Q10). Because it is the first feature game, combining in Step Q10 is not carried out.

Next, the flow returns to Step Q3, and a second feature game is carried out. The re-drawing reel groups and the ordinary reels respectively rotate independently. When every ordinary reel and re-drawing reel stops, it is determined whether a win situation is established or not (Step Q4). In a case where win situation is established, every dividend is paid (Step Q5), and is determined whether any feature games (bonus games) are left, or whether there is a win by a trigger symbol (Step Q6). In a case where there aren't any feature games (bonus games) left, and there isn't a win by the trigger symbol, the flow forwards to Step Q12. On the other hand, in a case where a feature game (bonus game) is left, or there is a win by the trigger symbol, it is determined whether there is a win by the trigger symbol in and ordinary reel (Step Q7). In a case where there isn't a win by the trigger symbol in the ordinary reel, the flow forwards to Step Q3, and in a case where there is a win by the trigger symbol in the ordinary reel, the player obtains feature games (bonus games) of an additional n times, and the ordinary reel according to the win by the trigger symbol, is switched in the next game, to an independent re-drawing reel, different from the already existing re-drawing reels.

In a case where a plurality of re-drawing reel groups exist, it is determined whether same symbols appear in the re-drawing reel groups (Step Q9). In a case where there are re-drawing reel groups wherein a same symbol appears, the re-drawing reel group that has appeared the same symbol, is combined to one re-drawing reel group (Step Q10).

The flow forwards to step Q3, and feature games from the third feature game and later, are carried out. Namely, after the feature game is started (Step Q3), it is determined whether a win situation is established or not (Step Q4). In a case where a win situation is not established, it is determined whether any feature games (bonus games) are left (Step Q11), and in a case where there is a feature game (bonus game) left, the flow forwards to Step Q3. On the other hand, in Step Q11, in a case where there isn't a feature game (bonus game) left, the flow forwards to. Step Q12. In step Q6, in a case where there isn't a feature game (bonus game) left, the feature game (bonus game) ends (Step Q12), and moves to a game waiting state (Step Q13). At the BET time of the next game, the re-drawing reel is retuned to an ordinary reel (Step Q14). From the next game, an ordinary game is carried out once again.

Other than the above described sixth to ninth embodiments, reels that simply have a few same symbols sequentially placed can be used as re-drawing reels, and can carry out re-drawing so that a situation where same symbols appear in the positions of the up, middle and down column.

(Ninth Embodiment)

In the ninth embodiment, in a case where a symbol that establishes a specific win is top displayed in whichever of a plurality of ordinary reels, the ordinary reel that has displayed the symbols that establish a specific win are switched to re-drawing reels, in a predetermined number of games from the next game. Drawing from a plurality of types of symbols is carried out, so that at least one win from a same win group as the win group that the specific win belongs to, is established in the re-drawing reel.

Figure 49:
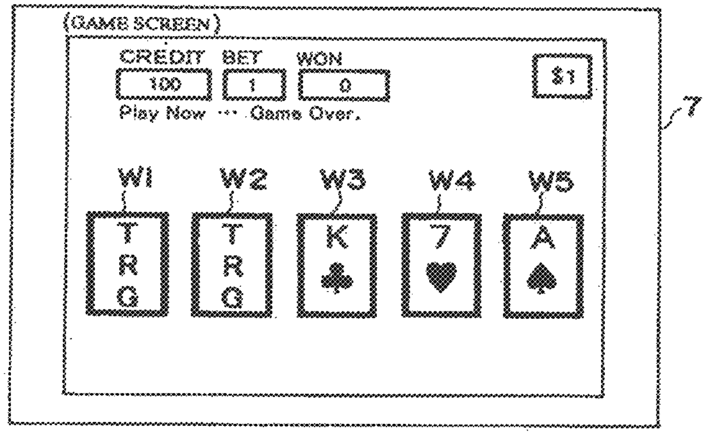
FIG. 49 is a diagram showing a screen display example of a gaming machine according to a ninth embodiment.

For example, a poker game is carried out. As shown in FIG. 49, either a symbol drawn on a card or a trigger symbol is displayed by five reels W1 to W5. The reels W1 to W5 structure a display region. Each reel W1 to W5 is displayed in a state where the cards are turned face down, so that the symbols can not be seen at a start of the game. After the game starts, symbols are displayed in each reel W1 to W5 in a way that the cards are sequentially turned over. When a win situation is established by a trigger symbol, feature games (bonus games) are carried out five games after that game. At the start of the feature game, the ordinary reels (W1 and W2) that had displayed trigger symbols, are switched to re-drawing reels.

Figure 52:
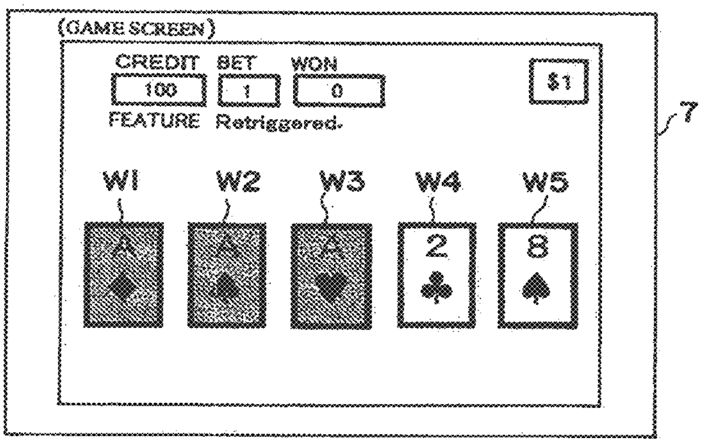
FIG. 52 is a diagram showing a screen display example of the gaming machine according to the ninth embodiment.

In the first feature game, symbols are drawn so that a win situation by two cards is established in the re-drawing reels (W1 and W2). In a poker game, it is “one pair”. During the feature game period, as shown in FIG. 52, in a case where a win situation is established in the ordinary reel W2 by the combination of re-drawing reels (W1 and W2), the ordinary reel W3 is combined as a re-drawing reel. Namely, in the next feature game, symbols are drawn so that a win situation is established in three cards. In a poker game, it corresponds to “three of a kind”.

FIG. 54 shows the kinds of well-known wins in for example, a poker game. First, “no pair” corresponds to a situation where none of the below wins exist. “One pair” is a situation where there are two cards (one pair) of a same number in the five cards. “Two pair” is a situation where there are two kinds of pairs in the five cards. “Three card” is a situation where there are three cards of a same number in the five cards. “Straight” is a situation where numbers are sequential in all five cards. “Flush” is a situation where all five cards are of a same suit (for example, spades, or diamonds). “Full house” is a situation where there is a “pair” and a “three card” in the five cards. “Four of a kind” is a situation where there are four cards of a same number in the five cards. “Straight flush” is a situation where the five cards are a “flush” and a “straight”. These plurality of types of wins structure a “win group”.

In a gaming machine according to a ninth embodiment, in a case where there are for example, two re-drawing reels, symbols that have the possibility of being “one pair” is drawn. In a case where there are four re-drawing reels, symbols that have the possibility of being “two pair” or “four of a kind” is drawn. In a case where there are five re-drawing reels, symbols that have the possibility of being “straight”, “flush”, “full house” or “straight flush” is drawn.

The hardware structure of the gaming machine according to the ninth embodiment, is the same as the first embodiment.

Figure 47:
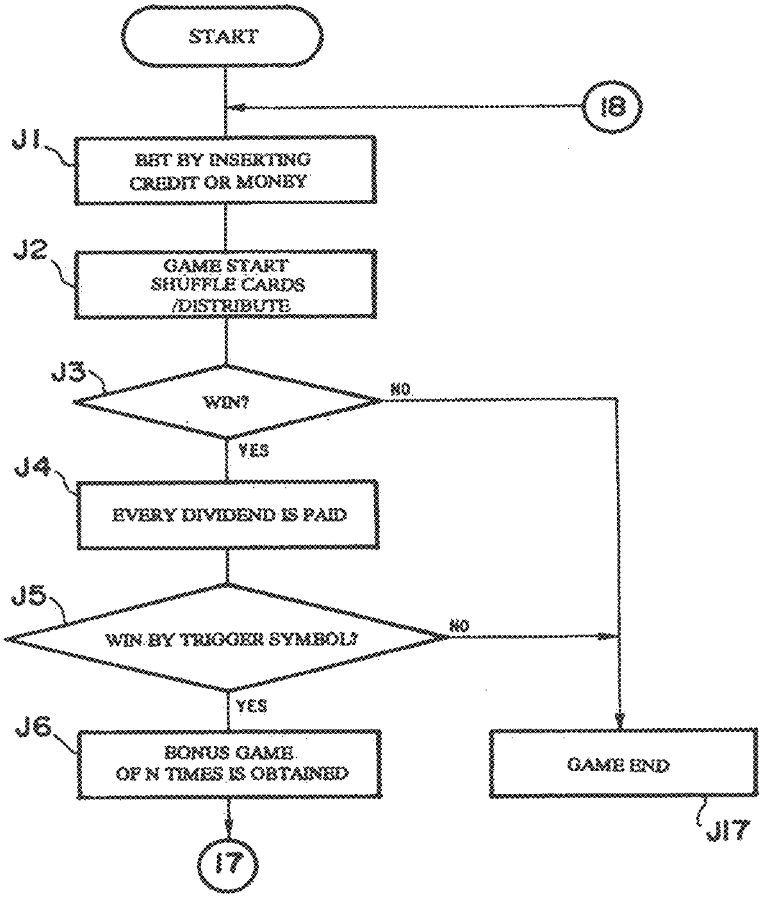
FIG. 47 is a flowchart showing performance of a gaming machine according to a ninth embodiment.
Figure 48:
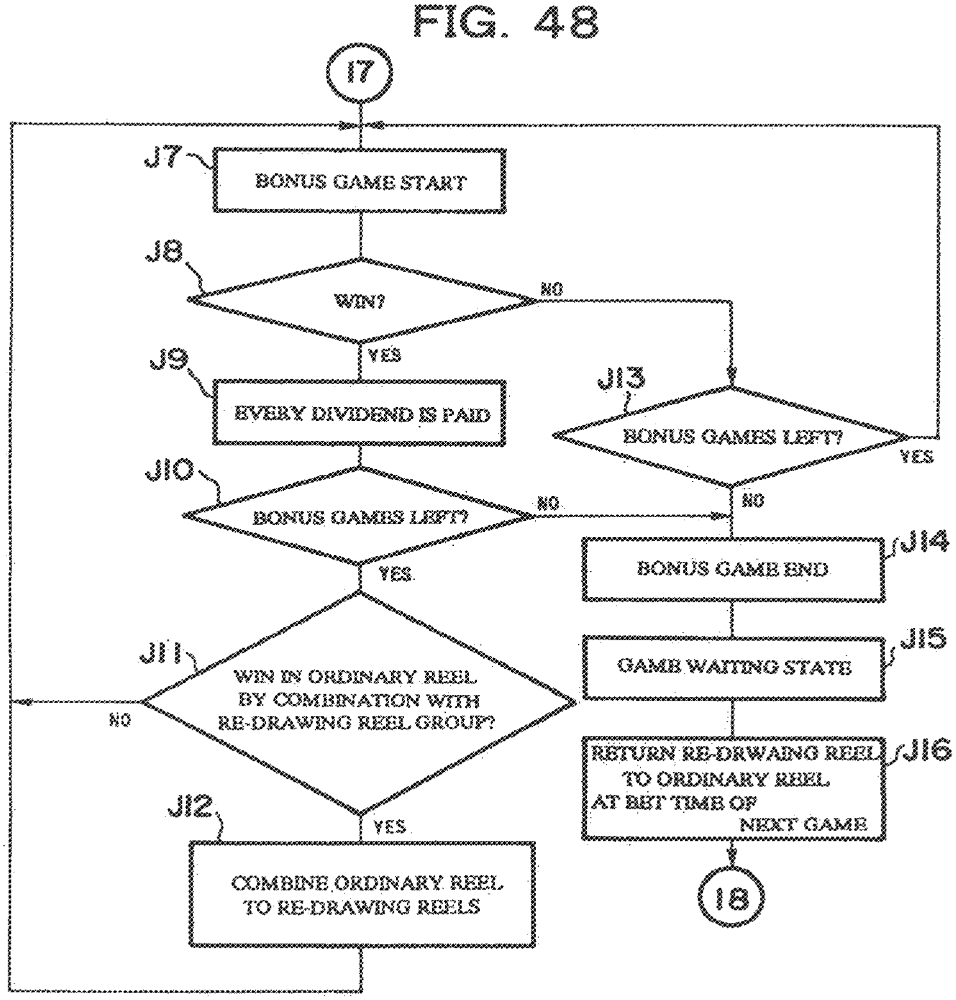
FIG. 48 is a flowchart showing performance of the gaming machine according to the ninth embodiment.

Performance of the gaming machine according to the ninth embodiment will be described. FIGS. 47 and 48 are flowcharts showing performance of the gaming machine according to the ninth embodiment, and FIGS. 49 to 53 are diagrams showing screen display examples of a symbol display unit 7. In a wait state of an ordinary game, a screen such as shown in FIG. 49 is displayed in the symbol display unit 7. Namely, reels W1 to W5 having a shape of a rectangle, which independently change or stop displays symbols, is displayed in a center part of a screen, as cards. Other than the reels W1 to W5, a credit meter which displays number of credits, a BET meter which displays number of BETs, and a WON meter which indicates number of medals that are paid off to a player at a time of a win situation. In the ninth embodiment, as above, a win situation occurs when a win in a poker game is established.

In the flowchart shown in FIG. 47, when a player inserts credits or money (these can be medals, coins, or cards), and carries out BET operation (STEP J1), a game is started (Step J2). At the same time as start of the game, each reel W1 to W5 change displays symbols, as though shuffling is carried out. Here, symbol alignment and change display timing of each reel W1 to W5 differ. Therefore, while the reels are changing, it is unlikely that one reel becomes the same situation as another reel. Each reel A1 to A9 stops at a predetermined timing, after a predetermined time has passed after starting change display.

Then, it is determined whether a win situation is established or not (Step J3). In a case where a win situation is not established, the game ends (Step J17), and in a case where a win situation is established, every dividend corresponding to that win is paid (Step J4). The dividend at this time, is determined in accordance with the BET situation. Then, it is determined whether the win is a win situation established by the trigger symbol (Step J5). In a case where the win situation is not established by the trigger symbol, the game ends (Step J17).

On the other hand, as shown in FIG. 49, in a case where a win situation is established by two trigger symbols being displayed (one pair) in reels W1 and W2, a feature game as a bonus game is started. Namely, the feature game is carried out in a case where a win situation is established by the trigger symbols. Here, the win situation by the trigger symbols, is established in a case where a plurality of trigger symbols appear. The number of times of the feature game is n (n is a natural number) times from the next game. In the ninth embodiment, the number of times of the feature game is five times (Step J6).

When a first feature game (bonus game) is started, reels W1 and W2 that have displayed trigger symbols, are switched to re-drawing reels (Step J7). The reels W1 and W2 that become re-drawing reels are called a “re-drawing reel group” as one group. Each reel W1 and W2 that structures the re-drawing reel group have the same symbol alignment, and synchronously rotates and stops at the same position on the reel, so as to stop display a symbol that establishes “one pair”.

Figure 50:
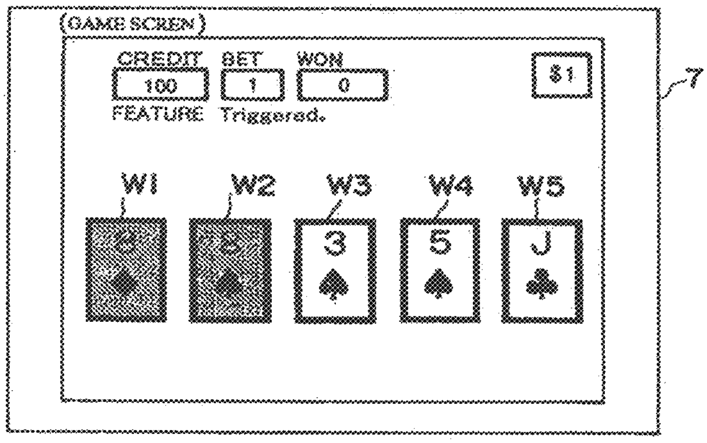
FIG. 50 is a diagram showing a screen display example of the gaming machine according to the ninth embodiment.
Figure 51:
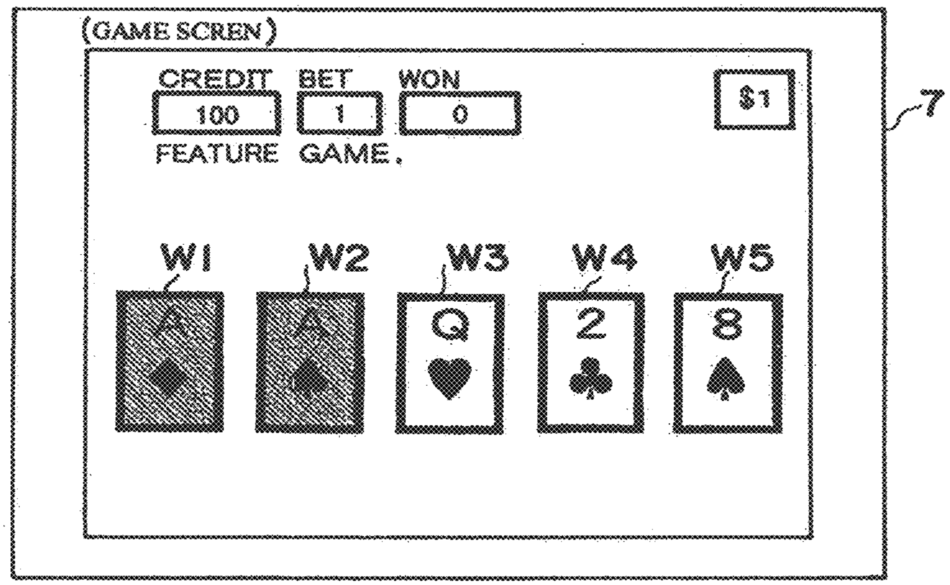
FIG. 51 is a diagram showing a screen display example of the gaming machine according to the ninth embodiment.

A feature game (bonus game) is started, and the re-drawing reels (W 1 and W2) synchronize and change display symbols, and the other reels respectively change display symbols randomly. When change display of every ordinary reel and re-drawing reel group stops, it is determined whether a win situation is established (Step J8). In a case where a win situation is not established, the flow forwards to Step J13, and as shown in FIG. 50, in a case where a win situation is established, every dividend is paid (Step J9). The dividend at this time is determined in accordance with the BET state. In FIG. 50, a win situation of “one pair” is established by “8” symbols matching in the re-drawing reels W1 and W2). For example, in FIG. 51, a win situation of “one pair” is established by “A” symbols matching in the re-drawing reels (W1 and W2). Then, it is determined whether there are any feature games (bonus games) left (Step J10). In a case where there aren’t any feature games left, the flow forwards to Step J14, and in a case where there are feature games left, it is determined whether a win situation is established in an ordinary reel by a combination with the re-drawing reels (Step J11). In Step J11, in a case where a win situation is not established in the ordinary reel with the combination of the re-drawing reels, the flow forwards to Step J7, and in a case where a win situation is established in the ordinary reel with the combination of the re-drawing reels, the reels according to that win is combined to the re-drawing reel group at the start of the next game (Step J12).

Next, the flow returns to Step J7, and a second feature game (bonus game) is carried out. The re-drawing reel group (W1 and W2) and the other ordinary reels (W3 to W5) respectively change display symbols independently. When every ordinary reel and re-drawing reel stops, it is determined whether a win situation is established or not (Step J8). For example, as shown in FIG. 52, in a case where a win situation of "three card" is established by an "A" symbol matching in the re-drawing reel group (W 1 and W2) and the ordinary reel W3, dividend corresponding to that win is paid (Step J9), and it is determined whether there are any feature games (bonus games) left (Step J10). In a case where a feature game is left, it is determined whether a win situation is established in the ordinary reel, and when a win situation is not established, the flow forwards to Step J7, and when a win situation is established, the reel W3 according to the win situation, is combined to the re-drawing reel group from the next game (Step J12).

Figure 53:
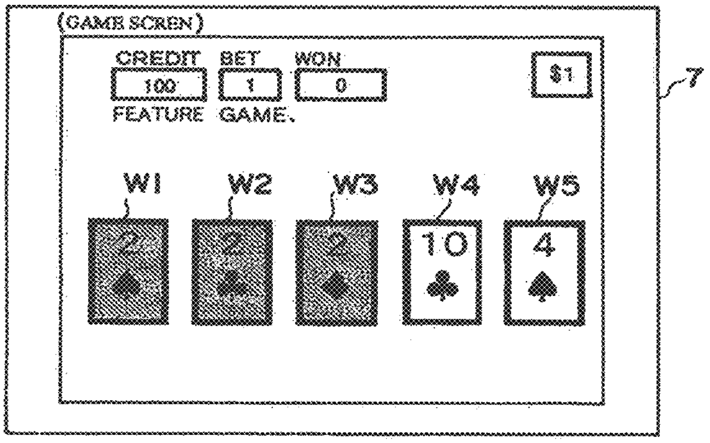
FIG. 53 is a diagram showing a screen display example of the gaming machine according to the ninth embodiment.

In the next game, the reel group (W1, W2, and W3) and the ordinary reels (W4 and W5) independently change displays and stop displays symbols. Then, in the re-drawing reel group (W1, W2, and W3), drawing is carried out from a combination of symbols that can establish for example, "three card", as shown in FIG. 53, and change display and stop display of symbols are carried out.

As the above, third to fifth feature games are carried out. Namely, in Step J8, in a case where a win situation is not established, it is determined whether there are any feature games (bonus games) left (Step J13), and in a case where feature games (bonus games) are left, the flow forwards to Step J7. On the other hand, in a case where there aren't any feature games (bonus games) left, the flow forwards to Step J14. In Step J10, in a case where there aren't any feature games (bonus games) left, the feature game (bonus game) ends (Step J14), and moves to a game waiting state (Step J15). At the BET time of the next game, the re-drawing reel is retuned to an ordinary reel (Step J16). From the next game, an ordinary game is carried out once again.

In this way, according to the ninth embodiment, in a case where symbols that establish a specific win are stop displayed in whichever of a plurality of ordinary reels, because drawing is carried out from a plurality of types of symbols so that any one win of a same win group as the win group that the specific win belongs to (group to which the win belongs to) is established, the win can be changed, maintaining the win situation. By this, players feel intrigued, and the player's interest towards the game can be raised. In the ordinary reels that have displayed symbols other than symbols that establish a specific win, because drawing is carried out from a plurality of types of symbols, so that arbitrary symbols are respectively displayed independently, ordinary reels and re-drawing reels independently exist and co-exist. Namely, re-drawing is not carried out using every reel, but re-drawing results are displayed in re-drawing reels, which are part of the display region, and ordinary drawing results are displayed in one part of the remaining display region. By this, because drawing results are displayed by two types of regions: the re-drawing reels and the ordinary reels, existing, a new kind of game that arouses the player's interests can be realized. Every display region can become a re-drawing reel, in accordance with the course of the game.

Besides the embodiments described above, as a result of drawing, in a case where a symbol that is to be displayed in whichever ordinary reel is the same as the symbol to be displayed in the re-drawing reel, in special games of a predetermined number of times after the next game, the ordinary reel and the re-drawing reel may be combined. Namely, in a case where a symbol that is the same as the re-drawing reel is displayed in an ordinary reel that is not necessarily adjacent, the ordinary reel and the re-drawing reel are combined.

By this, during the period of the feature game, every time a same symbol as the re-drawing reel is displayed—in an ordinary reel, the number of reels that structure the re-drawing reel group increases. Because drawing is carried out from a plurality of types of symbols so that the same symbol is stop displayed in every re-drawing reel, the same symbols are stop displayed in the re-drawing reel group. By this, diverse re-drawing can be carried out in the re-drawing reels. As a result, a strong impression can be provided to the players, and it is possible to arouse the player's interests.

Characteristic performance of the present invention such as above, can be carried out by controlling a computer to execute a control program. Namely, this control program is structured so that a series of processing including: a processing of displaying a plurality of types of symbols in a plurality of display regions (for example, A1 to A9 shown in FIG. 5), upon starting a game; and in a case of stop displaying a predetermined symbol (for example TRG shown in FIG. 7), in the plurality of display regions, a processing of setting the display regions that stop display the predetermined symbol as specific display regions (for example, A5, A7, and A9), and in a predetermined times of games after the first game, draws for the specific display regions, symbols from the plurality of types of symbols that are to be displayed, so that there is a specific relationship among the symbols in each game, and at the same time setting the display regions other than the specific display region as a general display region, and draws for the general display region, a symbol from the plurality of types of symbols that are to be displayed, so that there isn't a predetermined relationship among the symbols, as an instruction group that can be executed by the computer.

In this way, in a case where a predetermined symbol is stop displayed in a plurality of display regions, the display regions that stop display the predetermined symbols are set as specific display regions, and because drawing in a predetermined times of games after the first game is carried out from a plurality of types of symbols that are to be displayed, so that there is a specific relationship among the symbols in each game, symbols having a predetermined relationship are displayed in the specific display region. By this, an independent drawing result (re-drawing result) which differs from the general display region can be displayed in the specific display region. The display regions other than the specific display regions are set as general display regions. In the general display regions, because drawing is carried out from a plurality of types of symbols that are to be displayed without the symbols having a predetermined relationship, the general display regions and specific display regions are respectively independent and coexist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

Another control program is structured so that a series of processing including: processing of displaying changing display which displays, constantly changing a plurality of symbols in a stopped state to a plurality of types of symbols on a plurality of display regions (for example, A1 to A9 shown in FIG. 5), upon starting of a game, and stop display which once again stops the symbols that are changing at each display region, setting the display regions where the predetermined symbols are to be displayed stopped, as a specific display region, and in a predetermined times of games after the first game, draws for the specific display region (for example, A5, A7, and A9 shown in FIG. 7), symbols from the plurality of types of symbols that are to be displayed, so that there is a specific relationship among the symbols in each game, and draws in a case where predetermined symbols (for example, TRG shown in FIG. 7) are to be displayed stopped on a plurality of the display regions, and at the same time setting the display regions other than the specific display region as a general display region, and draws for the general display region, a symbol from the plurality of types of symbols that are to be displayed, so that there isn't a predetermined relationship among the symbols.

In this way, in a case where a predetermined symbol is stop displayed in a plurality of display regions, the display regions that stop display the predetermined symbols are set as specific display regions, and because drawing in a predetermined times of games after the first game is carried out from a plurality of types of symbols that are to be displayed, so that the symbols are displayed the same in each game, same symbols are displayed in the specific display region. By this, an independent re-drawing result which differs from the general display region can be displayed in the specific display region. The display regions other than the specific display regions are set as general display regions. In the general display regions, because drawing is carried out from a plurality of types of symbols that are to be displayed, so that symbols are independently displayed, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

Another control program is structured so that a series of processing including: processing of displaying a plurality of types of symbols in a plurality of display regions (for example W1 to W5 in FIG. 49) upon starting of a game, and setting the display regions where the predetermined symbols are to be displayed stopped, as specific display regions (W 1 and W2) for a predetermined number of games after the next game, in a case where symbols that establish a specific win is stop displayed in the plurality of display regions (for example, W1 and W2, shown in FIG. 49), and drawing for the specific display region, symbols from the plurality of types of symbols, so that at least one same win from a win group that the specific win belongs to is established, and at the same time, setting the display regions other than the specific display region as a general display region, and draws for the general display region, a symbol from the plurality of types of symbols that are to be displayed, so that symbols are displayed independently in each game.

In this way, in a case where a predetermined symbol that establishes a specific win is stop displayed in a plurality of display regions, the display regions that stop display the predetermined symbols that establish a specific win are set as specific display regions in a predetermined times of games from the next game, and because drawing is carried out from a plurality of types of symbols that are to be displayed, so that which ever one win that is the same as a win group that the specific win group belongs to (the group to which the win belongs to) is established in each game, wins can be changed in each game, maintaining a win situation. By this, players feel intrigued, and can raise the player's interest towards the game. The display regions other than the specific display regions are set as general display regions. In the general display regions, because drawing is carried out from a plurality of types of symbols that are to be displayed, so that symbols are independently displayed, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

The above program can be obtained by being recorded in a recording medium such as a CD-ROM and DVD, etc. This kind of program can also be obtained by receiving a signal sent by a computer that is a sending device, via communication networks, etc., constituted of a public telephone line, a dedicated phone line, a cable television circuit, or a radio communication line, etc., that structures a network. This signal is a computer data signal converted by a predetermined carrier wave that includes the program. At the time of sending, at the least, one part of the above program needs to be transmitted. Namely, every data that structures the above program, does not need to exist in the transmission media at one time. In a sending method for sending the program from the above computer, a case of sequentially sending data that structures the program, and a case of intermittently sending is included.

As described above, the gaming machine of the present invention comprises a display unit which can display a plurality of types of symbols on a plurality of display regions, upon starting a game, and a draw control unit which in a case where predetermined symbols are to be displayed stopped on a plurality of the display regions, sets the display regions where the predetermined symbols are to be displayed stopped, as a specific display region, and in a predetermined times of games after the first game, draws for the specific display region, symbols from the plurality of types of symbols that are to be displayed, so that there is a specific relationship among the symbols in each game, and at the same time which sets the display regions other than the specific display region as a general display region, and draws for the general display region, a symbol from the plurality of types of symbols that are to be displayed, so that there isn't a predetermined relationship among the symbols.

In this way, in a case where a predetermined symbol is stop displayed in a plurality of display regions, the display regions that stop display the predetermined symbols are set as specific display regions, and because drawing in a predetermined times of games after the first game is carried out from a plurality of types of symbols that are to be displayed, so that there is a specific relationship among the symbols in each game, symbols having a predetermined relationship are displayed in the specific display region. By this, an independent drawing result (re-drawing result) which differs from the general display region can be displayed in the specific display region. The display regions other than the specific display regions are set as general display regions. In the general display regions, because drawing is carried out from a plurality of types of symbols that are to be displayed without the symbols having a predetermined relationship, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

Figure 55:
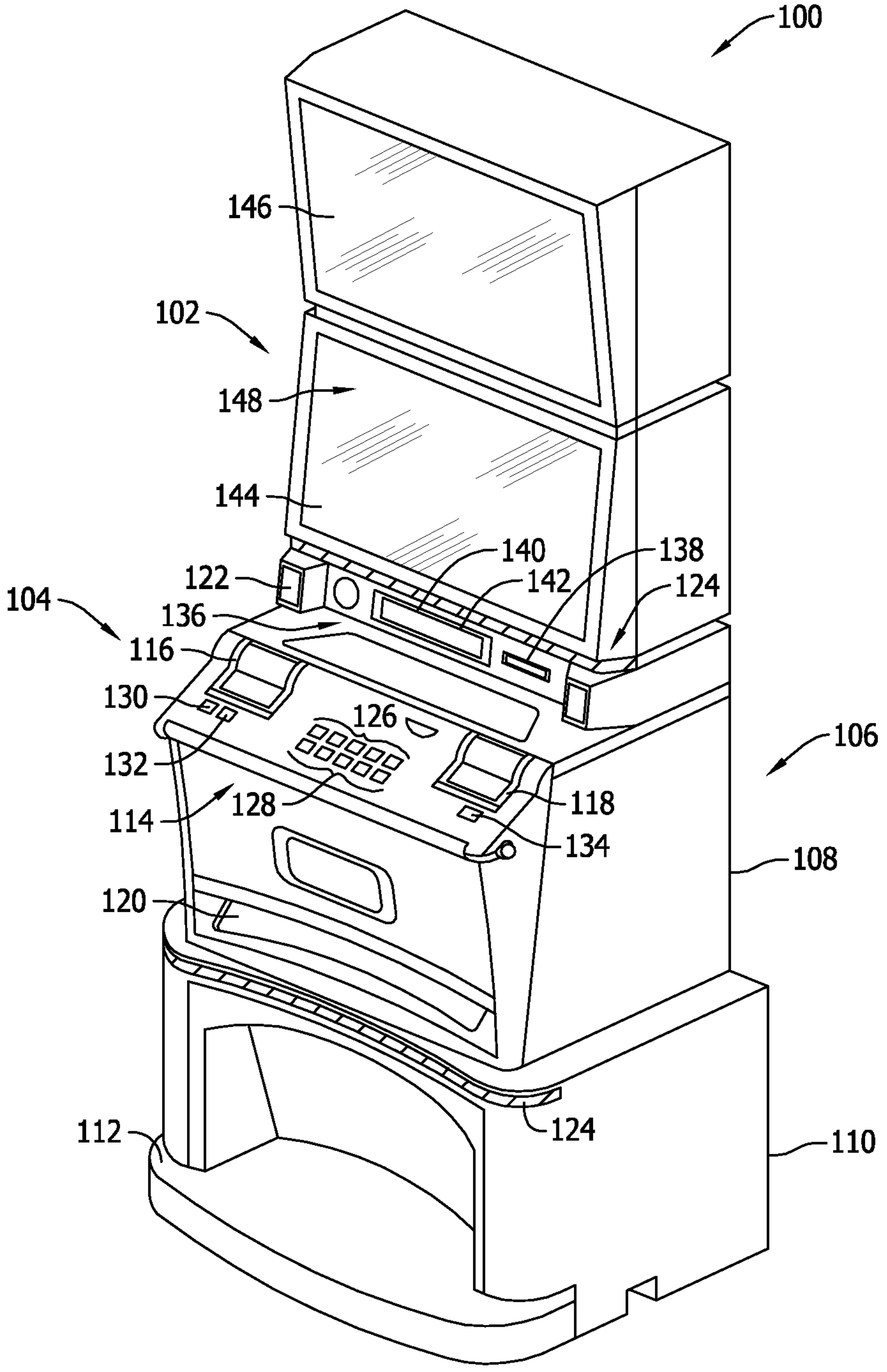
FIG. 55 is a perspective view of another embodiment of the gaming machine, according to an embodiment of the present invention.
Figure 56:
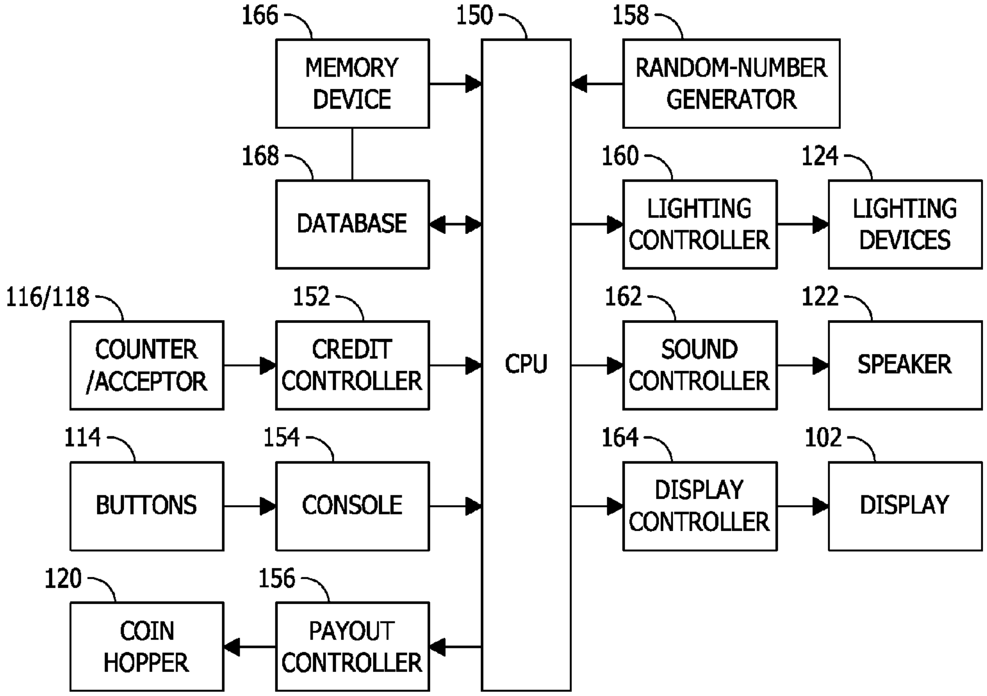
FIG. 56 is a schematic representation of the gaming machine shown in FIG. 55.

FIG. 55 is a perspective view of a gaming machine 100 such as, for example, gaming machine 1. FIG. 56 is a schematic representation of the gaming machine 100. In general, the gaming machine 100 allows a player to initiate a gaming session to play a plurality of video slot games via the gaming machine 100. The gaming machine 100 accepts a wager from a player and displays a game including a plurality of reels. Each of the reels has a reel strip that includes a plurality of symbol positions and a plurality of game symbols displayed in each of the symbol positions in a predetermined order. During game play, the gaming machine 100 randomly determines an outcome of the primary game and responsively spins and stops the reels to display the outcome of the primary game in a grid. The gaming machine detects if a triggering condition occurs in the primary game outcome including a trigger symbol displayed in at least one of the reels, and responsively modifies a reel feature of a reel strip and generates an outcome of a secondary game with the modified reel strip. More specifically, the gaming machine 100 modifies the reel feature of the reel that is associated with the trigger symbol, generates the second game outcome, and spins and stops the reels including the reel having the modified reel feature to display the secondary game outcome.

In one embodiment, a reel includes a WILD symbol that is displayed in the associated reel strip. Upon detecting the trigger symbol being displayed with the reel in the primary game outcome, the gaming machine 100 modifies the reel feature associated with the reel by replacing the WILD symbol with a WILD 2× symbol that has a greater symbol value than the WILD symbol value. In another embodiment, the reel includes a run of consecutive symbol positions and a special symbol that is displayed in each consecutive symbol position during the primary game. If a trigger symbol appears in the reel in the primary game outcome, the gaming machine 100 modifies the reel feature by replacing each of the special symbols displayed in each of the consecutive symbol positions with another special symbol such as, for example, a WILD symbol for use in the secondary game. In a further embodiment, the gaming machine 100 may synchronize each reel that displays the trigger symbol in the primary game outcome such that each synchronized reel displays the same symbols in the same order during the secondary game. Moreover, the gaming machine 100 may modify a reel feature as the corresponding reel is spinning during the secondary game such that the modification is visible to the player as the reels are rotated through a display area.

Because the gaming machine 100 modifies the reel feature of at least one of the reels, and spins and stops each of the reels to display the generated secondary game outcome, the modified reel feature is visible to the player as the corresponding reels spin through the display are, thereby increasing the player's anticipation of achieving an award during the secondary game. Thus, the period of time the gaming machine 100 is played by the player is increased.

A preferred embodiment of the present invention is a video gaming machine preferably installed in a casino. In the illustrated embodiment, the gaming machine 100 includes a display device 102 for displaying a plurality of games, a user input device 104 to enable a player to interface with the gaming machine 100, and a gaming controller 106 that is operatively coupled to the display device 102 and the user input device 104 to enable a player to play games displayed on the display device 102. The gaming machine 100 also includes a cabinet assembly 108 that is configured to support the display device 102, the user input device 104, and/or the gaming controller 106 from a gaming stand 110 and/or a supporting surface 112.

The display device 102 and the user input device 104 are each coupled to the cabinet assembly 108 and are each accessible by the player. In one embodiment, the gaming controller 106 is positioned within the cabinet assembly 108. Alternatively, the gaming controller 106 may be separated from the cabinet assembly 108, and connected to components of the gaming machine 100 through a network such as, for example, a local area network (LAN), a wide area network (WAN), dial-in-connections, cable modems, wireless modems, and/or special high-speed Integrated Services Digital Network (ISDN) lines.

In one embodiment, the user input device 104 includes a plurality of input buttons 114, a coin slot 116, and/or a bill acceptor 118. The coin slot 116 includes an opening that is configured to receive coins and/or tokens deposited by the player into the gaming machine 100. The gaming machine 100 converts a value of the coins and/or tokens to a corresponding amount of gaming credits that are used by the player to wager on games played on the gaming machine 100.

The bill acceptor 118 includes an input and output device that is configured to accept a bill, a ticket, and/or a cash card into the bill acceptor 118 to enable an amount of gaming credits associated with a monetary value of the bills, ticket, and/or cash card to be credited to the gaming machine 100. Moreover, the gaming machine 100 may also utilize a cashless wagering system (not shown), such as a ticket in ticket out (TITO) system (not shown). In one embodiment, the bill acceptor 118 also includes a printer (not shown) that is configured to dispense a printed voucher ticket that includes information indicative of an amount of credits and/or money paid out to the player by the gaming machine 100 during a gaming session. The voucher ticket may be used at other gaming machines, or redeemed for cash, and/or other items as part of a casino cashless system (not shown).

A coin tray 120 is coupled to the cabinet assembly 108 and is configured to receive a plurality of coins that are dispensed from the gaming machine 100. One or more speakers 122 are installed inside the cabinet assembly 108 to generate voice announcements and/or sound effects associated with game play. The gaming machine 100 also includes one or more lighting devices 124 that are configured to blink and/or change brightness and color in specific patterns to produce lighting effects to enhance a visual gaming experience for the player.

In one embodiment, the input buttons 114 include a plurality of BET switches 126 for inputting a wager on a game, a plurality of selection switches 128 for selecting a betting line and/or card, a MAXBET switch 130 for inputting a maximum wager, a PAYOUT switch 132 for ending a gaming session and dispensing accumulated gaming credits to the player, and a start switch, i.e., a SPIN/DEAL button 134 to initiate an output of a game.

In the illustrated embodiment, the BET switches 126 include five switches from 1BET to 5BET to enable a player to wager between a minimum bet up to 5× minimum bet. Each selection switch 128 corresponds to a betting line such as, for example, a payline and/or symbol for a reel game, one or more cards for a card game, and/or a symbol for a roulette game, to enable a player to associate a wager with one or more betting lines. The MAXBET switch 130 enables a player to input the maximum bet that a player can spend against one time of a game. The PAYOUT switch 132 enables a player to receive the amount of money and/or credits awarded to the player during a gaming session, which has been credited onto the gaming machine 100.

The gaming machine 100 also includes a player tracking device 136 that is coupled to the gaming controller 106 for identifying the player and/or a player tracking account that is associated with the player. The player tracking account may include, but is not limited to, gaming credits available to the player for use in playing the gaming machine 100. The player tracking device 136 is configured to communicate player account information between a player tracking controller (not shown) and the gaming machine 100. For example, the player tracking device 136 may be used to track bonus points and/or credits awarded to the player during a gaming session and/or track bonus and/or credits downloaded to the gaming machine 100 from the player tracking system. In the illustrated embodiment, the player tracking controller assigns a player status, e.g. a player ranking, based on the player account information. For example, the player tacking information may include, but is not limited to, a frequency in which the player plays a game, the average wager the player makes per play of a game, a total amount wagered by the player over a predefined period of time, and/or any other suitable player tracking information. In addition, the player tracking controller may assign a player a higher player ranking based on a high average wager and/or a high total wager amount as compared with other tracked players. The gaming machine 100 may receive the player tracking information from the player tracking controller and determine the symbol selection factor based at least in part on the received player tracking information associated with the current player.

The player tracking device 136 is coupled to the gaming cabinet assembly 108 and includes a player identification card reader 138, a data display 140, and a keypad 142. The player identification card reader 138 is configured to accept a player tracking card (not shown) inserted by the player, and read information contained on the player tracking card to identify the player account information. The player identification card reader 138 may include, but is not limited to, a barcode reader, a magnetic card reader, and/or a radio frequency identification (RFID) card reader. The keypad 142 is configured to accept a user selection input such as, for example, a unique player personal identification number (PIN) to facilitate enabling the gaming machine 100 to identify the player, and access player account information associated with the identified player to be displayed on the data display 140. In one embodiment, the data display 140 includes a touchscreen panel that includes the keypad 142. Alternatively, the data display 140 and the keypad 142 may be included in the display device 102.

In one embodiment, the display device 102 includes a first display 144 and a second display 146. The first display 144 is configured to display a game screen 148 (shown in FIG. 57) including indicia and/or symbols for use in a game, e.g., cards used by a card game, roulette wheel and symbols used in a roulette game, and reels used in a reel game. The game screen 148 may include any type of game including, but not limited to, a video slot game, a keno game, a blackjack game, a video poker game, or any type of game which allows a player to make a wager, play a game, and potentially provide the player an award based on an outcome of the game and a paytable. The second display 146 is configured to display game play instructions for performing the game including, but not limited to, playing instructions, paytables, paylines, betting lines and/or any other information to enable the gaming machine 100 to function as described herein. Moreover, each display 144 and 146 may be configured to display at least a portion of the game screen 148 and/or game play instructions. In one embodiment, the first and second displays 144 and 146 each include a flat panel display, such as a cathode ray tube display (CRT), a liquid crystal display (LCD), a light-emitting diode display (LED), an organic light-emitting diode display (OLED), an active-matrix organic light-emitting diode display (AMOLED), a plasma display, and/or any suitable visual output device capable of displaying graphical data and/or text to a user. Alternatively, a single component, such as a touch screen, may function as both the display device 102 and as the user input device 104. In an alternative embodiment, the first display 144 and/or the second display 146 includes a plurality of mechanical reels displaying a plurality of game symbols.

Referring to FIG. 56, in one embodiment, the gaming controller 106 includes a processor, i.e., a central processing unit (CPU) 150, a credit controller 152, a console unit 154, a payout controller 156, a random-number generator (RNG) 158, a lighting controller 160, a sound controller 162, a display controller 164, a memory device 166, and a database 168. Memory device 166 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the CPU 150 to store, retrieve, and/or execute instructions and/or data.

The CPU 150 executes various programs, and thereby controls other components of the gaming controller 106 according to player instructions and data accepted by the user input device 104. The CPU 150 in particular executes a game program, and thereby conducts a game in accordance with the embodiments described herein. The memory device 166 stores programs and databases used by the CPU 150. Moreover, the memory device 166 stores and retrieves information in the database 168 including, but not limited to, wagers, wager amounts, average wagers per game, a game type, a number of reels associated with a game, a number of reel strips associated with each reel, symbol values, reel features, reel strip characteristics, a number of symbol positions being displayed on each reel strip, a type of symbols being displayed with each symbol position, a predefined set of normal symbols, a predefined set of special symbols, image data for producing game images and/or screens on the display device 102, and temporarily stores variables, parameters, and the like that are used by the CPU 150. In addition, the memory device 166 stores indicia, symbol weights, symbol values, selection probabilities tables which represent relationships between symbol selection probabilities and symbol selection factors, paytables, and/or winning combination tables which represent relationships between combinations of random numbers and types of awards. In one embodiment, the memory device 166 utilizes RAM to temporarily store programs and data necessary for the progress of the game, and EPROM to store, in advance, programs and data for controlling basic operation of the gaming machine 100, such as the booting operation thereof.

The credit controller 152 manages the amount of player's credits, which is equivalent to the amount of coins and bills counted and validated by the bill acceptor 118. The console unit 154 is coupled to the user input device 104 to monitor player selections received through the input buttons 114, and accept various instructions and data that a player enters through the input buttons 114. The payout controller 156 converts a player's credits to coins, bills, or other monetary data by using the coin tray 120 and/or for use in dispensing a credit voucher via the bill acceptor 118.

The lighting controller 160 controls one or more lighting devices 124 to blink and/or change brightness and color in specific patterns in order to produce lighting effects associated with game play. The sound controller 162 controls the speakers 122 to output voice announcements and sound effects during game play. The display controller 164 controls the display device 102 to display various images on screens preferably by using computer graphics and image data stored in the memory device 166. More specifically, the display controller 164 controls video reels in a game screen displayed on the first display 144 and/or the second display 146 by using computer graphics and the image data.

The RNG 158 generates and outputs random numbers to the CPU 150 preferably at the start of each round of a game. The CPU 150 uses the random numbers to determine an outcome of the games. For example, if the game is a video slot game, the CPU 150 uses the RNG 158 to randomly select an arrangement of symbols to be displayed on video reels. Moreover, the CPU 150 generally uses random numbers generated by the RNG 158 to play the games and to determine whether or not to provide an award to a player. In addition, the CPU 150 generates game outcomes including combinations of random numbers, and compares the generated combinations with winning combinations stored in the winning combination table to determine if the generated outcome is a winning outcome that is associated with a type of award.

Figure 57:
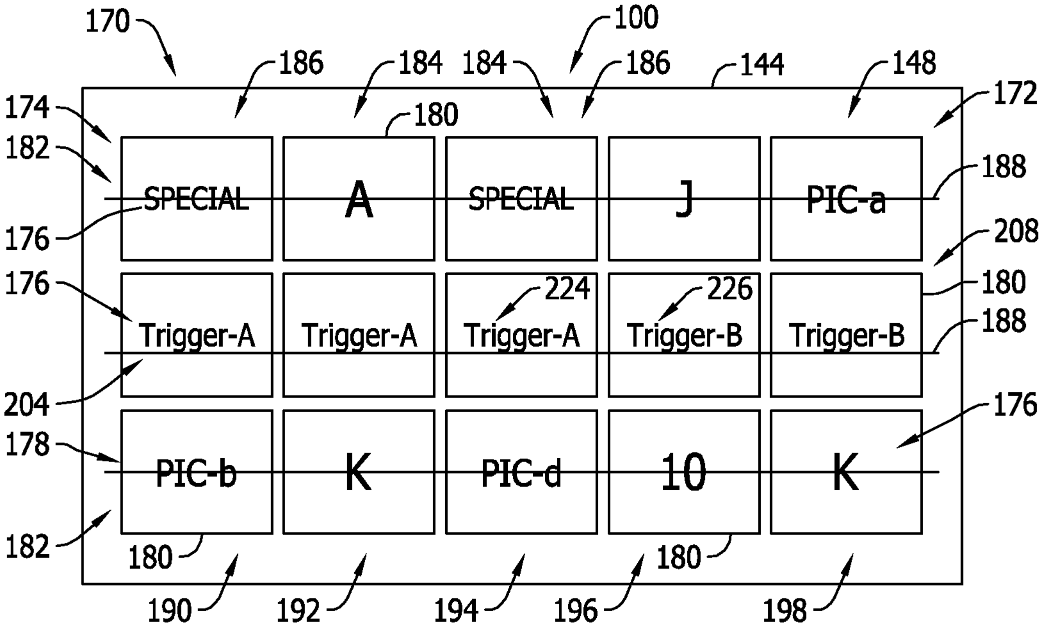
FIG. 57 is a graphical display of a video slot game, according to an embodiment of the present invention.
Figure 58:
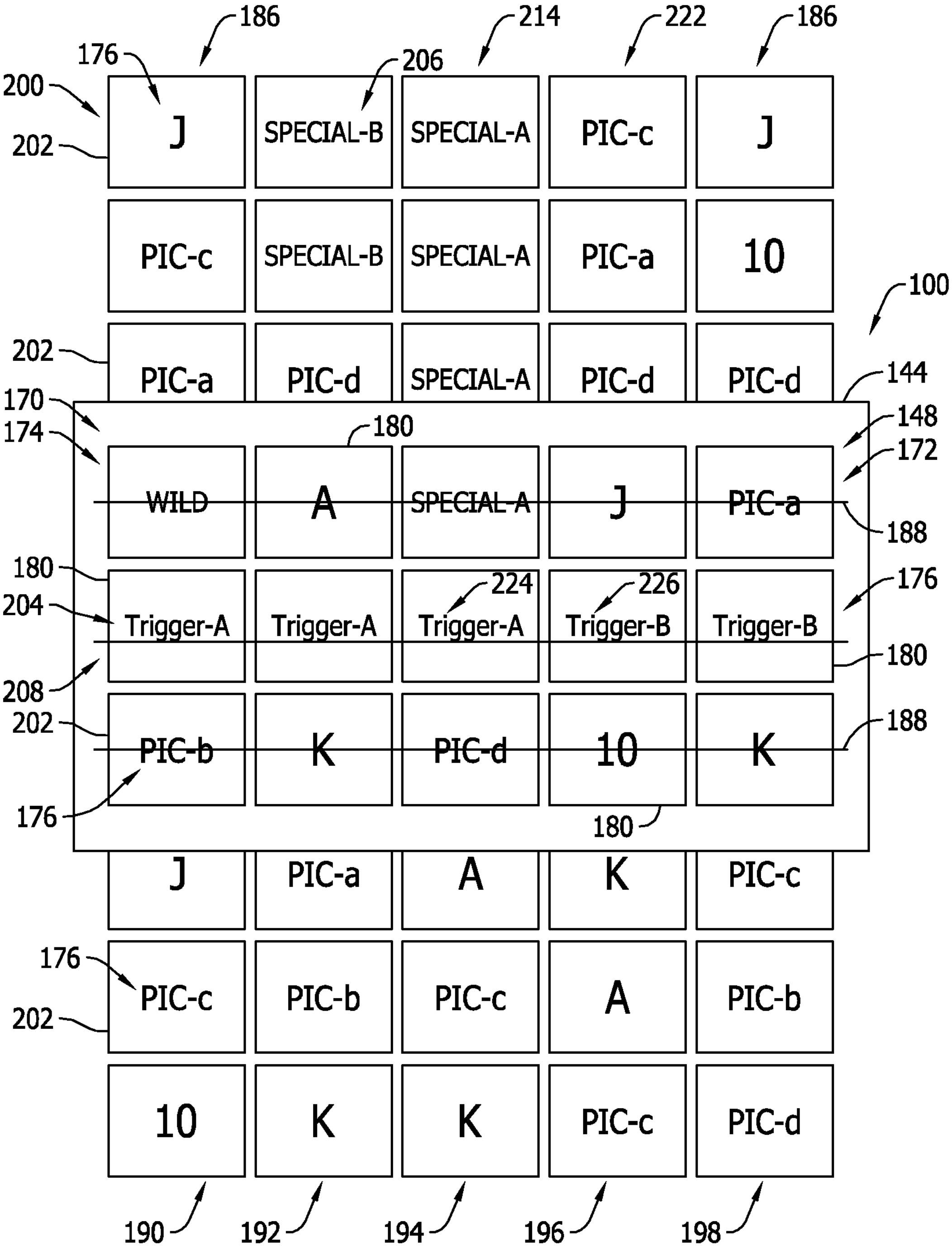
FIG. 58 is a schematic representation of a portion of the gaming machine shown in FIG. 55 including the video slot game of FIG. 57 illustrating a plurality of slot reels, according to an embodiment of the present invention.

FIG. 57 is an exemplary graphical display of a game 170 that is displayed by the gaming machine 100. FIG. 58 is a schematic representation of a portion of the gaming machine 100 including the game 170. In the illustrated embodiment, the gaming controller 106 is configured to display the game 170 on the display device 102. In one embodiment, the game 170 is a video slot game. However, it should be noted that the game 170 may be any type of game upon which a player could make a wager including, but not limited, to a keno game, a blackjack game, a video poker game, or any type of game that enables the gaming controller 106 to function as described herein. In the illustrated embodiment, the game 170 is displayed on the first display 144. Alternatively, the game 170 may be displayed on the first display 144 and/or the second display 146.

In general, during play of the game 170, the gaming controller 106 randomly generates an outcome 172 of the game 170 and displays the generated game outcome 172 in a display area 174. The gaming controller 106 randomly selects a plurality of game symbols 176 from a predefined set of possible game symbols and displays the selected game symbols 176 associated with the generated game outcome 172 in the game display area 174.

In the illustrated embodiment, the plurality of symbols 176 are displayed in a grid 178 having a plurality of cells 180 arranged along a plurality of rows 182 and a plurality of columns 184. Each cell 180 displays one or more game symbols 176 associated with the game outcome 172. In the illustrated embodiment, the gaming controller 106 displays the game symbols 176 within a plurality of reels 186. Each reel 186 is associated with a corresponding column 184. The game 170, in the illustrated embodiment, includes 5 reels 186 with 3 cells 180 per reel, respectively (a "5×3" arrangement) displayed in the display area 174. Alternatively, other reel arrangements may be used such as, for example, 3-4-3-4-3, 4-5-5-5-4, or 4-5-4-5-4 arrangements or arrangements with the same number of cells per column, such as 3×3, 3×4, 4×5, or 5×5 configurations. The game 170 also includes a plurality of paylines 188 that extend across one or more cells 180 to indicate, to the player, a combination of game symbols 176. In one embodiment, the gaming machine 100 displays the game 170 via a plurality of mechanical reels (not shown) that include a plurality of symbols displayed on a circumferential surface of each reel.

Each slot game is generally played in a conventional manner. The player makes a wager, which may be based on a predetermined denomination and a selected number of paylines, the gaming controller 106 randomly generates an outcome for the game, spins the reels, and selectively stops the reels to display a game symbol 176 in each of the display cells 180. If a predetermined pattern of symbols 176 is randomly chosen for each cell 180 on a played payline 188, the player may be awarded a payout based on the payline, the wager, and a predetermined paytable. Moreover, the player may be awarded a payout if the combination of symbols associated with a selected payline is a winning combination. In addition, a player may receive a bonus feature and/or a bonus game based on the combination of symbols associated with the selected payline and/or the appearance of one or more predefined symbols in the game outcome 172. Many variations to the above described general play of a slot game fall within the scope of the present invention. Such slot games are well-known in the art, and are therefore not further discussed.

In the illustrated embodiment, the gaming controller 106 receives a signal, from the user input device 104, that is indicative of a player's selection to initiate a gaming session including a wager amount, and a selection of one or more paylines 188 associated with a predefined set of cells 180 within the displayed grid 178. In the illustrated embodiment, the game 170 is a multi-line game, i.e., the paylines include horizontal paylines and/or diagonal pay-lines, and/or zig-zag paylines. Moreover, the user input device 104 may allow the player to toggle to increase the bet per payline a credit at a time (up to the maximum bet). The gaming controller 106 randomly generates an outcome 172 of the game 170, and displays the generated outcome 172 on the display device 102. In one embodiment, the gaming controller 106 is configured to rotate, and/or spin each reel 186 to initiate a game play, and stop each reel 186 to display a plurality of symbols 176 associated with the randomly generated outcome 172. In addition, the gaming controller 106 is adapted to determine if the generated outcome 172 is a winning outcome based on the displayed game symbols 176, a pay-table, a wager, and one or more player selected paylines 188. More specifically, the gaming controller 106 determines if a combination of symbols 176 arranged along the selected payline 188 is a winning combination. The gaming controller 106 may provide an award in response to the outcome 172 of the game 170. In general, the term "award" may be a payout, in terms of credits or money. Thus, the gaming controller 106 may award a regular payout in response to the outcome 172 of the game 170. However, it should be noted that the term award may also refer to other types of awards, including, prizes, e.g., meals, show tickets, etc. . . . , as well as in-game awards, such as free games or awarding the player one or more wild symbols or stacked wild symbols in each of the games.

In the illustrated embodiment, the gaming controller 106 displays the game 170 including a plurality of reels 186. For example, in one embodiment, the gaming controller 106 displays the game 170 having five reels 186 that are orientated horizontally and includes a 1st reel 190, a 2nd reel 192, a 3rd reel 194, a 4th reel 196, and a 5th reel 198. Each reel 186 includes one or more associated reel strips 200 (shown in FIGS. 59-66) that may be displayed on a respective reel 186. Each reel strip 200 includes a plurality of symbol positions 202 and a plurality of game symbols 176 displayed in each of the symbol positions 202 in a predetermined order. In the illustrated embodiment, the plurality of game symbols 176 includes at least one trigger symbol 204. During display of the generated game outcome 172, the gaming controller 106 spins each reel 186 such that the game symbols 176 are moved through each of the cells 180 in the display area 174.

In the illustrated embodiment, each reel strip 200 includes a reel feature 206 that is indicative of a characteristic of the associated reel strip 200. The reel feature 206 may be modified to adjust the characteristic of the associated reel strip 200 during subsequent game play. For example, in one embodiment, the reel feature 206 may include one or more game symbols 176 having a symbol value and/or a symbol appearance that may be modified for use in during subsequent games. Moreover, in another embodiment, the reel feature 206 may include a plurality of game symbols 176 that may be replaced with different game symbols 176 for use during subsequent game play. In addition, the reel feature 206 may include one or more characteristics of the reel strip 200 including, but not limited to, a game symbol theme, a game symbol type, a game symbol value, a visual appearance, a reel orientation, and or any suitable reel characteristic that may be modified to enable the gaming machine 100 to function as described herein.

In the illustrated embodiment, the game 170 includes a primary game and a secondary game. The secondary game may be, for example, a bonus feature game and/or a free spin game. During game play, the gaming controller 106 allows a player to make a wager on the game 170, initiates the primary game and responsively spins each reel 186 such that the game symbols 176 are visible in the display grid 178 as the reels 186 are spun through the grid 178. The gaming controller 106 randomly determines an outcome of the primary game, responsively stops each of the reels 186 to display the primary game outcome 172 in the display grid 178, and provides a first award to the player based on the primary game outcome. The gaming controller 106 also detects if a triggering condition occurs in the primary game outcome 172 and modifies a reel feature 206 of at least one reel 186 for use in a secondary game if the triggering condition is detected in the primary game outcome. More specifically, the gaming controller 106 modifies a reel feature 206 of the reel strip 200 associated with the reel 186 for use in the secondary game. During play of the secondary game, the gaming controller 106 generates an outcome of the secondary game including the modified reel strip 200 and displays the generated secondary outcome on the display grid 178. The gaming controller 106 also provides the player a second award based on the secondary game outcome.

In the illustrated embodiment, the triggering condition 208 is defined as the appearance of one or more triggering symbols 204 in one or more reels 186 in the primary game outcome. During game play, the gaming controller 106 detects the triggering condition 208 if at least one trigger symbol 204 is displayed in at least one reel 186 in the primary game outcome, and, upon detecting the triggering condition 208, the gaming controller 106 modifies a reel feature 206 of the reel strip 200 that is associated with the reel 186 having the trigger symbol 204 displayed therewith. The gaming controller 106 then generates the outcome of the secondary game including the modified reel strip 200.

Figure 59:
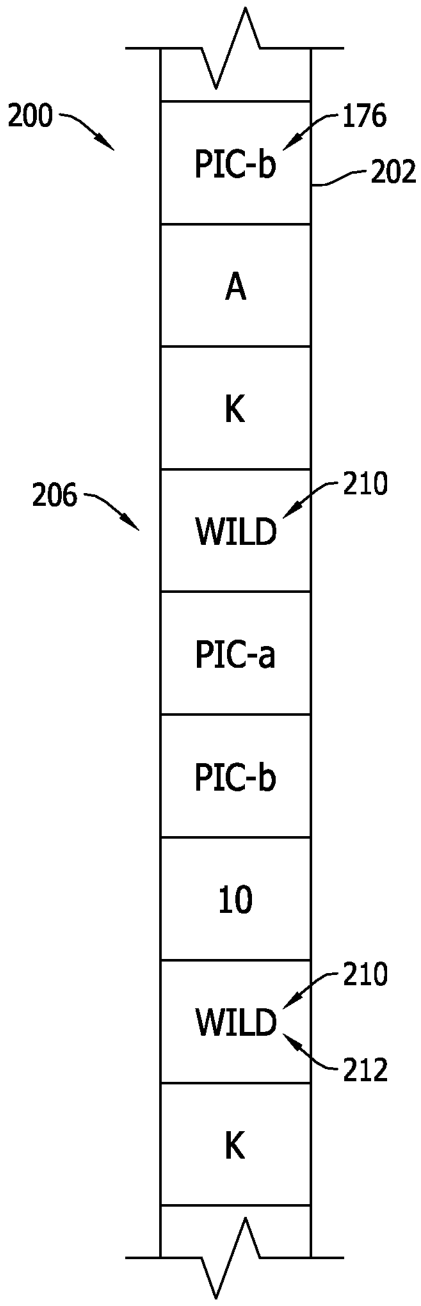
FIG. 59 is a schematic representation of a reel strip that may be used with at least one slot reel of the video slot game shown in FIG. 57 and FIG. 58, according to an embodiment of the present invention.
Figure 60:
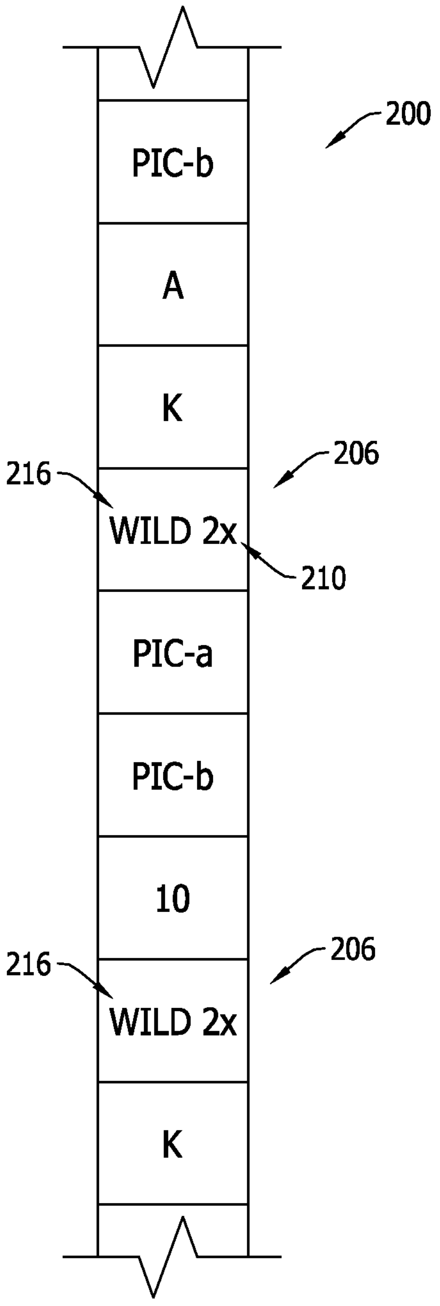
FIG. 60 is another schematic representation of the reel strip shown in FIG. 59, according to an embodiment of the present invention.

FIG. 59 is a schematic representation of the reel strip 200. FIG. 60 is schematic representation of the reel strip 200 shown in FIG. 59 and having a modified reel feature 206. With reference to FIGS. 57-60, in one embodiment, one or more reel strips 200 may include one or more special symbols 210, such as, for example, a “WILD” symbol 212 (shown in FIG. 59). The WILD symbol 212 may be substituted for any game symbol 176 that is displayed in a game outcome to generate a winning combination that includes the WILD symbol 212. In addition, the WILD symbol 212 includes an award multiplier value such that an award associated with a winning combination that includes the WILD symbol 212 may be increased by the corresponding award multiplier value.

In the illustrated embodiment, the reel feature 206 is defined as the WILD symbol 212 having a modifiable award multiplier value. For example, in one embodiment, a first reel 214 may include a reel strip 200 having one or more WILD symbols 212. During the primary game, the WILD symbol 212 includes a first multiplier value. The gaming controller 106 detects the triggering condition 208 if a trigger symbol 204 is displayed in the primary game outcome with the first reel 214, and, upon detecting the triggering condition 208, replaces the first multiplier value with a second multiplier value that is different than the first multiplier value to modifying the reel feature 206 of the first reel 214. In addition, in one embodiment, the gaming controller 106 may replace the WILD symbol 212 with another special symbol 210, such as, for example a “WILD 2×” symbol 216 that is indicative of the second multiplier value, to notify the player of the increased multiplier value. The gaming controller 106 then generates the outcome of the secondary game including the first reel 214 having the associated WILD 2× symbol 216. In one embodiment, the gaming controller 106 may spin the first reel 214 such that the modified reel feature 206 including the WILD 2× symbol 216 is visible to the player to notify the player that the reel feature 206 of the first reel 214 has been modified for use in the secondary game.

Figure 61:
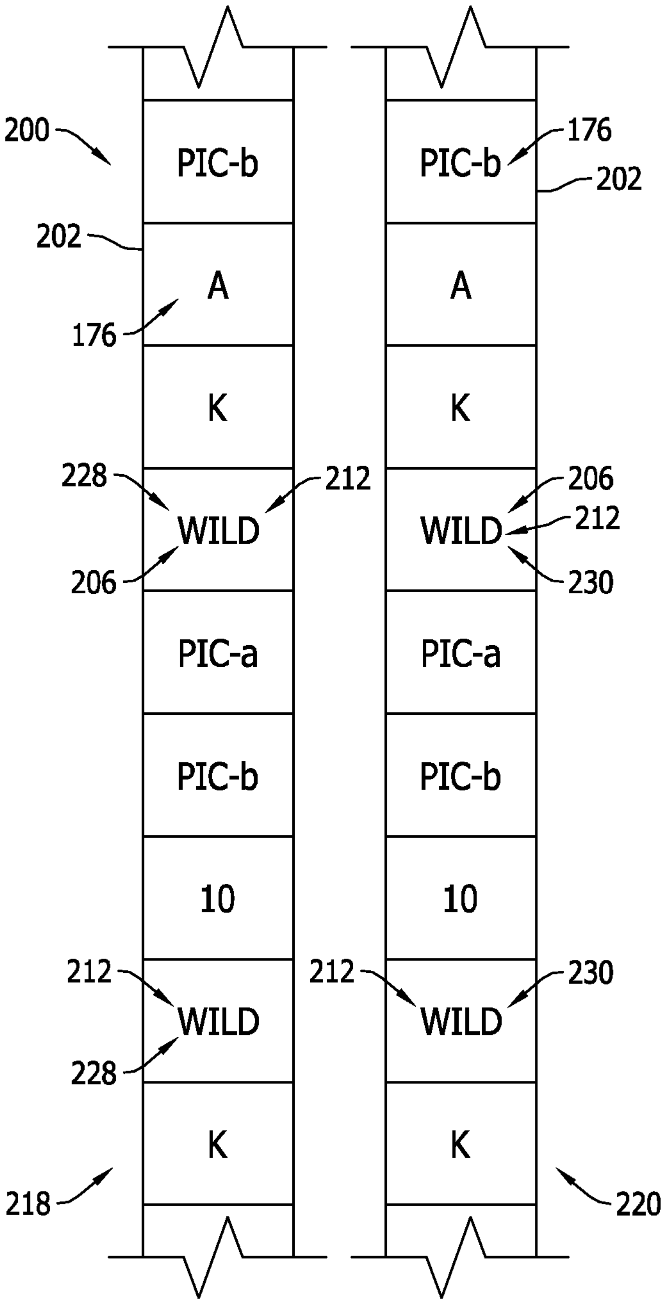
FIG. 61 is a schematic representation of a first reel strip and a second reel strip that may be used with a first reel and a second reel of the video slot game shown in FIG. 57 and FIG. 58, according to an embodiment of the present invention.
Figure 62:
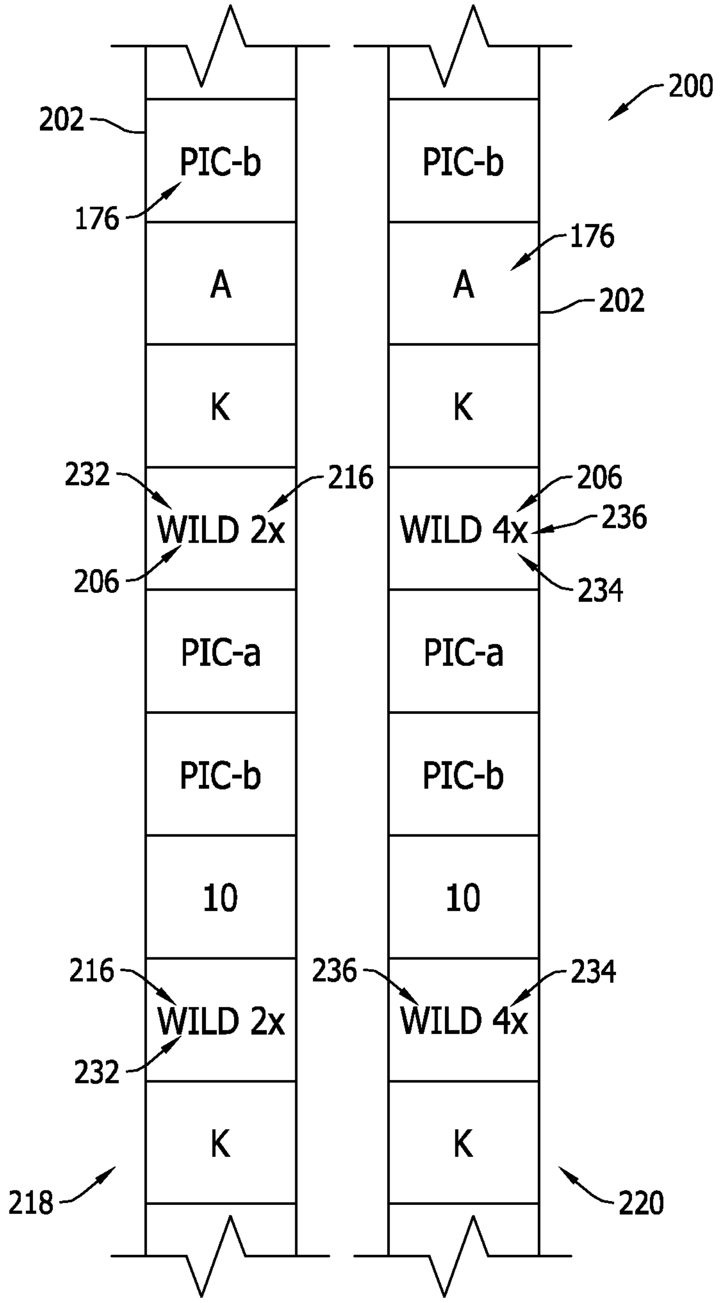
FIG. 62 is another schematic representation of the first and second reels strips shown in FIG. 61.

FIG. 61 is a schematic representation of a first reel strip 218 and a second reel strip 220. FIG. 62 is another schematic representation of the first reel strip 218 and the second reel strip 220 each having a modified reel feature 206. In the illustrated embodiment, the game 170 includes a first reel 214, such as, for example, the 3rd reel 194, and a second reel 222, such as, for example, the 4th reel 196. The first reel 214 being displayed with the first reel strip 218, and the second reel 222 being displayed with the second reel strip 220. In one embodiment, the triggering condition 208 is defined as a first trigger symbol 224, represented by a “Trigger-A” symbol shown in FIGS. 57 and 4, being displayed with the first reel 214 in the grid 178, and a second trigger symbol 226, represented by a “Trigger-B” symbol shown in FIGS. 57 and 4, being displayed with the second reel 222 in the grid 178. Upon detecting the triggering condition 208, the gaming controller 106 modifies the reel feature 206 associated with the first reel 214 and modifies the reel feature 206 associated with the second reel 222. For example, in the illustrated embodiment, the first reel 214 includes a first special symbol 228, such as, for example, a first WILD symbol 212 having a first multiplier value. The second reel 222 includes a second special symbol 230, such as, for example, a second WILD symbol 212 that has a second multiplier value. Upon detecting the triggering condition 208 in the primary game outcome, the gaming controller 106 modifies the reel feature 206 of the first reel 214 by replacing the first special symbol 228 having the first multiplier value with a third special symbol 232, e.g. the WILD 2× symbol 216 having a third multiplier value that is different than the first multiplier value. In addition, the gaming controller 106 modifies the reel feature 206 of the second reel 222 by replacing the second special symbol 230 having the second multiplier value with a fourth special symbol 234, e.g. a WILD 4× symbol 236 having a fourth multiplier value that is different than the second multiplier value. In one embodiment, the third and fourth multiplier values are selected based at least in part on the corresponding trigger symbol 204 appearing the first and second reels 214 and 222, respectively, in the primary game outcome.

In addition, in one embodiment, the gaming controller 106 modifies the reel feature 206 of each reel 186 based on the corresponding trigger symbol 204 appearing in the primary game outcome. For example, the triggering condition 208 may be defined as a trigger symbol 204 appearing in each reel 186. Moreover, each reel 186 may include one or more WILD symbols 212. During game play, the first trigger symbol 224 may appear in the 1st reel 190, the 2nd reel 192, and the 3rd reel 194, and the second trigger symbol 226 may appear in the 4th reel 196 and the 5th reel 198. The gaming controller 106 may replace the WILD symbol 212 in the 1st, 2nd, and 3rd reels 190, 192, and 194, with the WILD 2× symbol 216 based on the appearance of the first trigger symbol 224. In addition, the gaming controller 106 may replace the WILD symbol 212 in the 4th and 5th reels 196 and 198 with the WILD 4× symbol 236 based on the appearance of the second trigger symbol 226.

Figure 63:
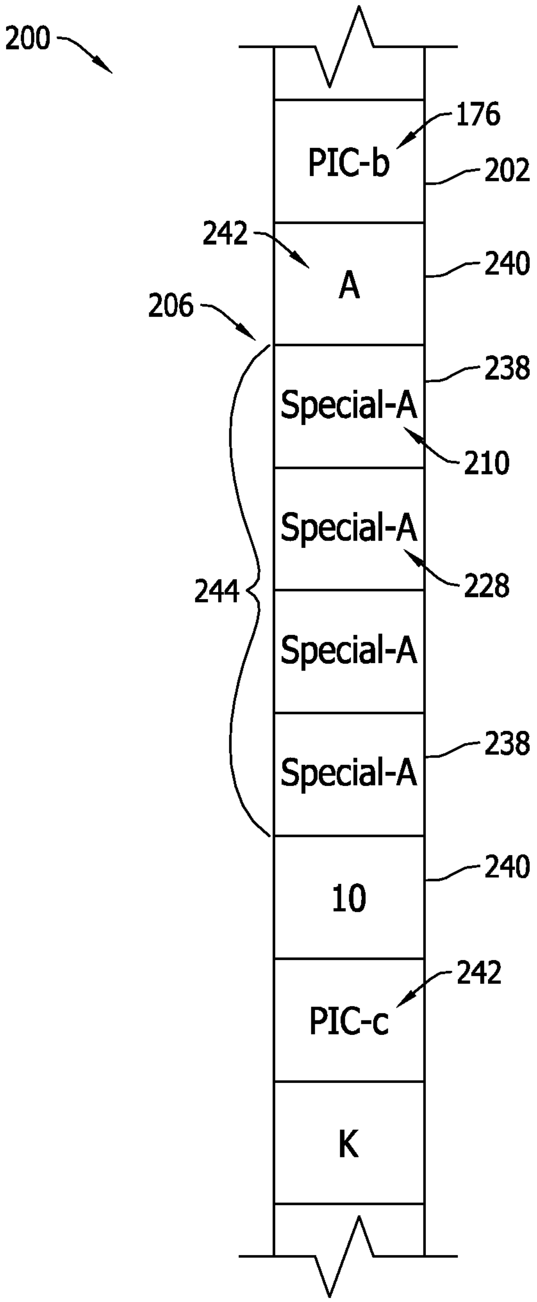
FIG. 63 is a schematic representation of a reel strip that may be used with at least one slot reel of the video slot game shown in FIG. 57 and FIG. 58, according to an embodiment of the present invention.
Figure 64:
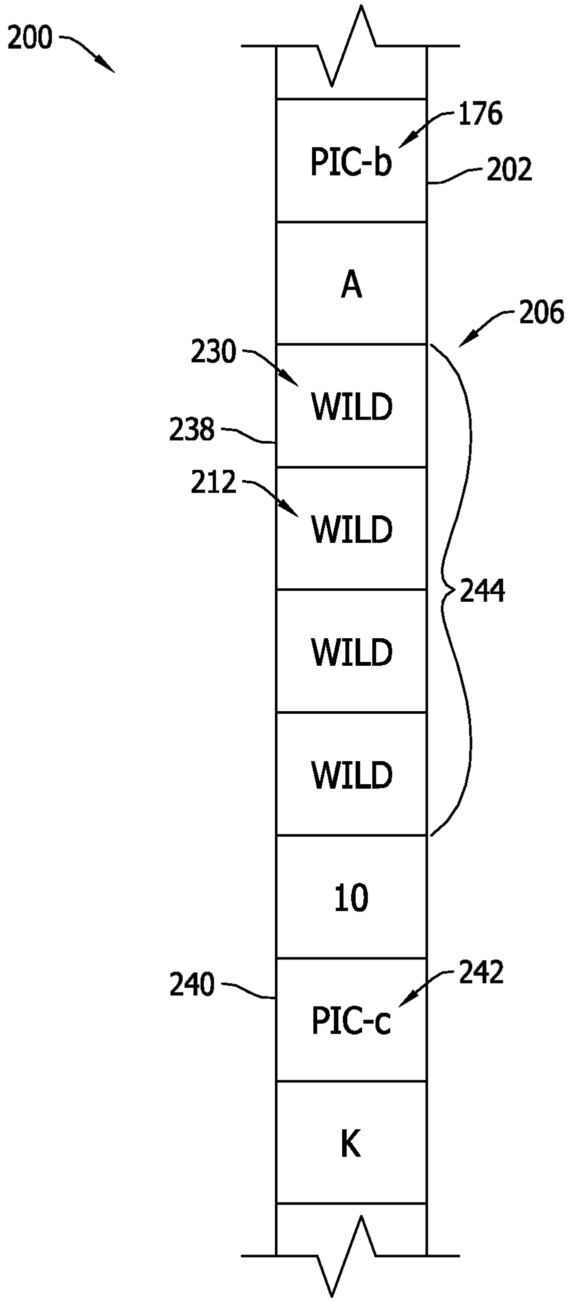
FIG. 64 is another schematic representation of the reel strip shown in FIG. 63.

FIG. 63 is a schematic representation of another reel strip 200, and FIG. 64 is another schematic representation of the reel strip 200 having a modified reel feature 206. In the illustrated embodiment, the reel strip 200 includes a plurality of adjacent special symbol positions 238 and a plurality of normal symbol position 240. Each normal symbol position 240 includes a static normal symbol 242. Moreover, the reel strip 200 includes at least one run 244 of consecutive special symbol positions 238 that include a plurality of adjacent special symbol positions 238. In one embodiment, during each play of the game 170, the gaming controller 106 may randomly select at least one special symbol 210 from a predefined set of special symbols 210, and display the selected special symbol 210 in each special symbol positions 238. Additional details of adjacent special symbol positions, which may be used in the present invention, are described in U.S. patent application Ser. No. 11/299,009 to Yoshimi, now U.S. Pat. No. 8,096,869, filed Dec. 9, 2005, titled "Gaming Machine with Runs of Consecutive Identical Symbols", which is incorporated herein by reference in its entirety.

In the illustrated embodiment, the gaming controller 106 displays the same special symbol 210 in each special symbol position 238. Alternatively, the gaming controller 106 may select a plurality of similar special symbols 210 and/or a plurality of associated special symbols such as, for example, a set of special symbols included in a category of special symbols, for display in each special symbol position 238. For example, the predefined set of special symbols may include, but is not limited to, a category of special symbols such as, for example, shapes, colors, sounds, items, characters, backgrounds, frames, and/or any category of special symbols that enable the gaming controller 106 to function as described herein. Each special symbol category includes a plurality of special symbols having predefined characteristics associated with the special symbol category. For example, the predefined set of special symbols may include a shape category that includes a plurality of special symbols that each have a shape associated with the shape category. The gaming controller 106 may select one or more special symbols indicative of the shapes within the shape category, and display the selected special symbols in each of the special symbol positions 238. In addition, referring to FIG. 70, in one embodiment, the gaming controller 106 may display a special symbol 210 having a plurality of symbol images 246 such that a plurality of adjacent special symbols 210 are displayed as a unitary image 248 that extends across the plurality of special symbol positions 238. In another embodiment, the gaming controller 106 may select a plurality of special symbols 210 from the same category of special symbols, wherein each selected special symbol 210 forms a portion of the unitary symbol image 248 such that when the selected special symbols 210 are displayed in each adjacent special symbol position 238, the unitary symbol image 248 is displayed across the adjacent special symbol positions 238.

In one embodiment, the first reel 214 may have a reel strip 200 that includes a run 244 of consecutive special symbol positions 238. During the primary game, the gaming controller 106 randomly selects a first special symbol 228 and displays the selected first special symbol 228 in each consecutive special symbol positions 238 during the primary game outcome. Upon detecting the appearance of the trigger symbol 204 in the first reel 214, the gaming controller 106 responsively modifies the reel feature 206 of the first reel 214 by replacing each first special symbol 228 with a second special symbol 230, and generates the secondary game outcome including the first reel 214 having the second special symbol 230 displayed in each consecutive special symbol positions 238. For example, in one embodiment, during the primary game, the gaming controller 106 may display the first reel 214 with the first special symbol 228 (represented by the "Special-A" symbol shown in FIGS. 63-70), and detects the triggering condition if a trigger symbol 204 appears in the first reel 214 in the primary game outcome. The gaming controller 106 may responsively replace the first special symbol 228 with the WILD symbol 212 to modify the first reel 214 and play the secondary game with the first reel 214 having the WILD symbol 212 being displayed in each consecutive special symbol positions 238.

Figure 65:
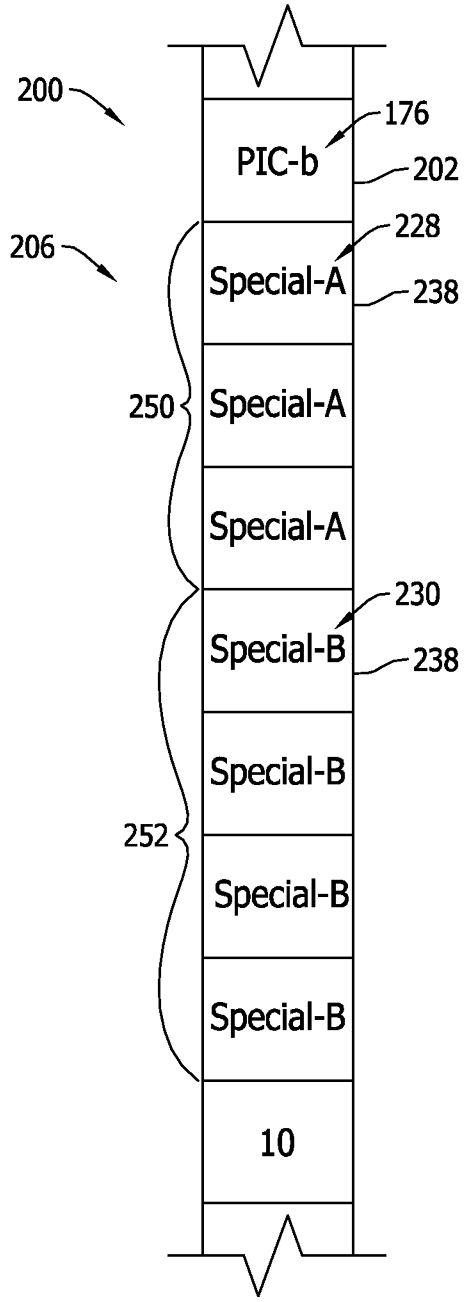
FIG. 65 is a schematic representation of a reel strip that may be used with at least one slot reel of the video slot game shown in FIG. 57 and FIG. 58, according to an embodiment of the present invention.
Figure 66:
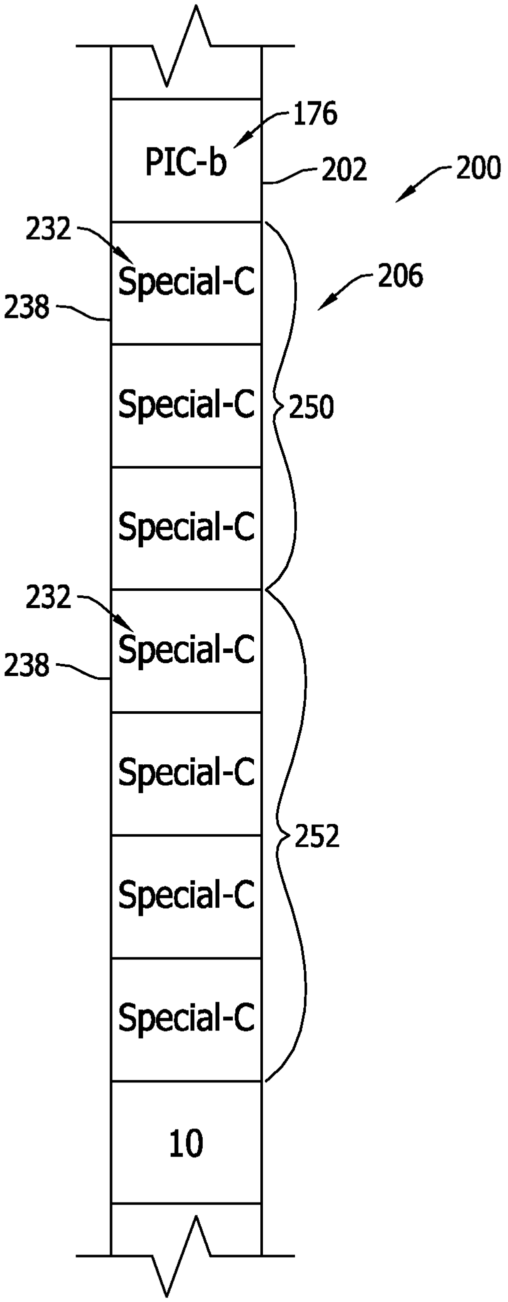
FIG. 66 is another schematic representation of the reel strip shown in FIG. 65.
Figure 69:
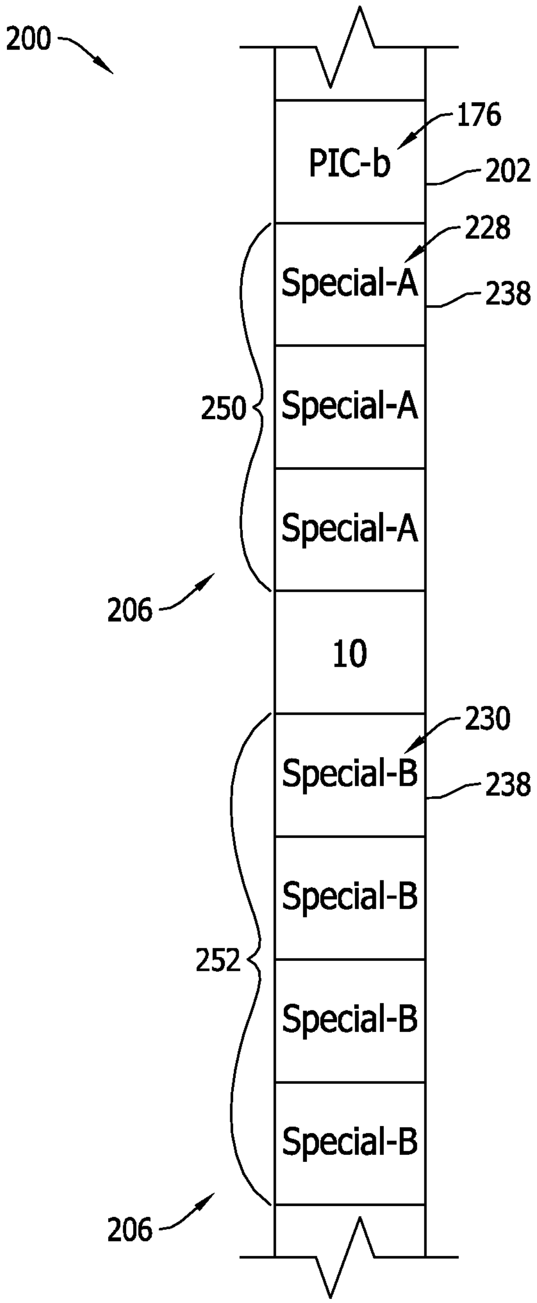
FIG. 69 is a schematic representation of a reel strip that may be used with at least one slot reel of the video slot game shown in FIG. 57 and FIG. 58, according to an embodiment of the present invention.
Figure 70:
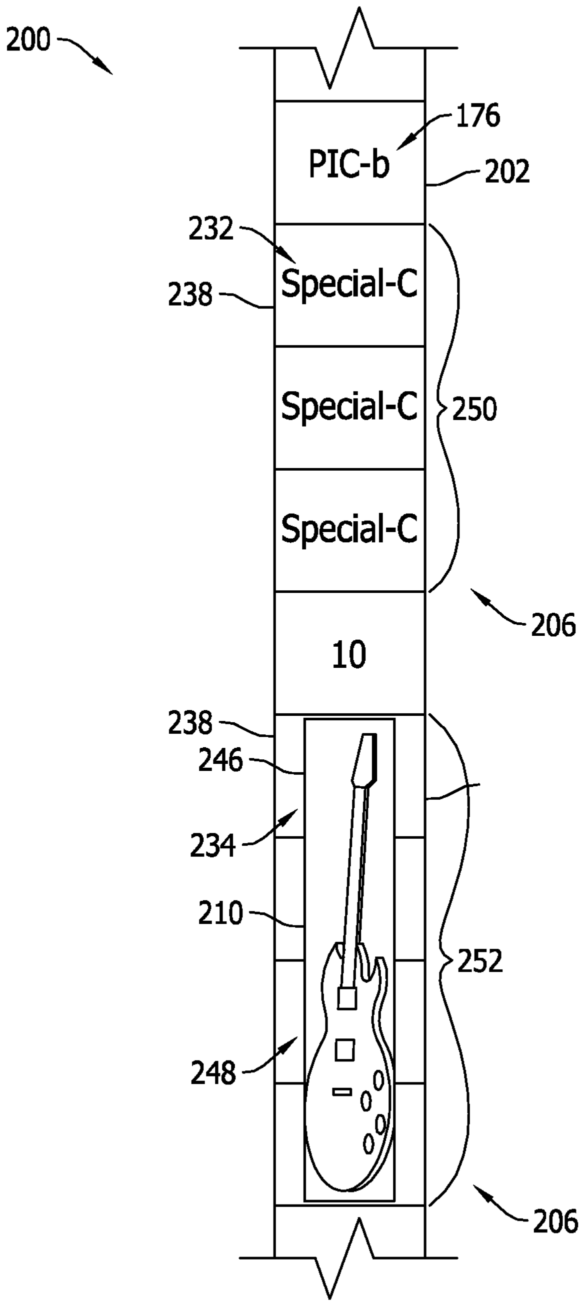
FIG. 70 is another schematic representation of the reel strip shown in FIG. 69.

Referring to FIGS. 65 and 66, in one embodiment, the first reel 214 may include a first run 250 of consecutive special symbol positions 238 and a second run 252 of consecutive special symbol positions 238. During the primary game, the gaming controller 106 may populate each special symbol position 238 of the first run 250 with the first special symbol 228, and populate each special symbol position 238 of the second run 252 with the second special symbol 230, represented by the "Special-B" symbol. In addition, the gaming controller 106 may detect the triggering condition in the primary game outcome and responsively replace each first special symbol 228 and second special symbol 230 with a third special symbol 232, represented by "Special-C" symbol, to modify the reel feature 206 of the first reel 214 for use in the secondary game. In another embodiment, as shown in FIGS. 69 and 70, the gaming controller 106 may modify the reel feature 206 by replacing the first special symbol 228 with the third special symbol 232, and replace the second special symbol 230 with a fourth special symbol 234, represented by the unitary "guitar" image, that is different from the third special symbol 232. In addition, the gaming controller 106 may replace the first and second special symbols 228 and 230 based on the trigger symbol 204 appearing in the first reel 214 in the primary game outcome. For example, in one embodiment, if the first trigger symbol 224 appears in the first reel 214, the gaming controller 106 may responsively replace the first and second special symbols 228 and 230 with the third special symbol 232, and if the second trigger symbol 226 appears in the first reel 214, the gaming controller may responsively replace the first special symbol 228 with the third special symbol 232 and replace the second special symbol 230 with the fourth special symbol 234.

Figure 67:
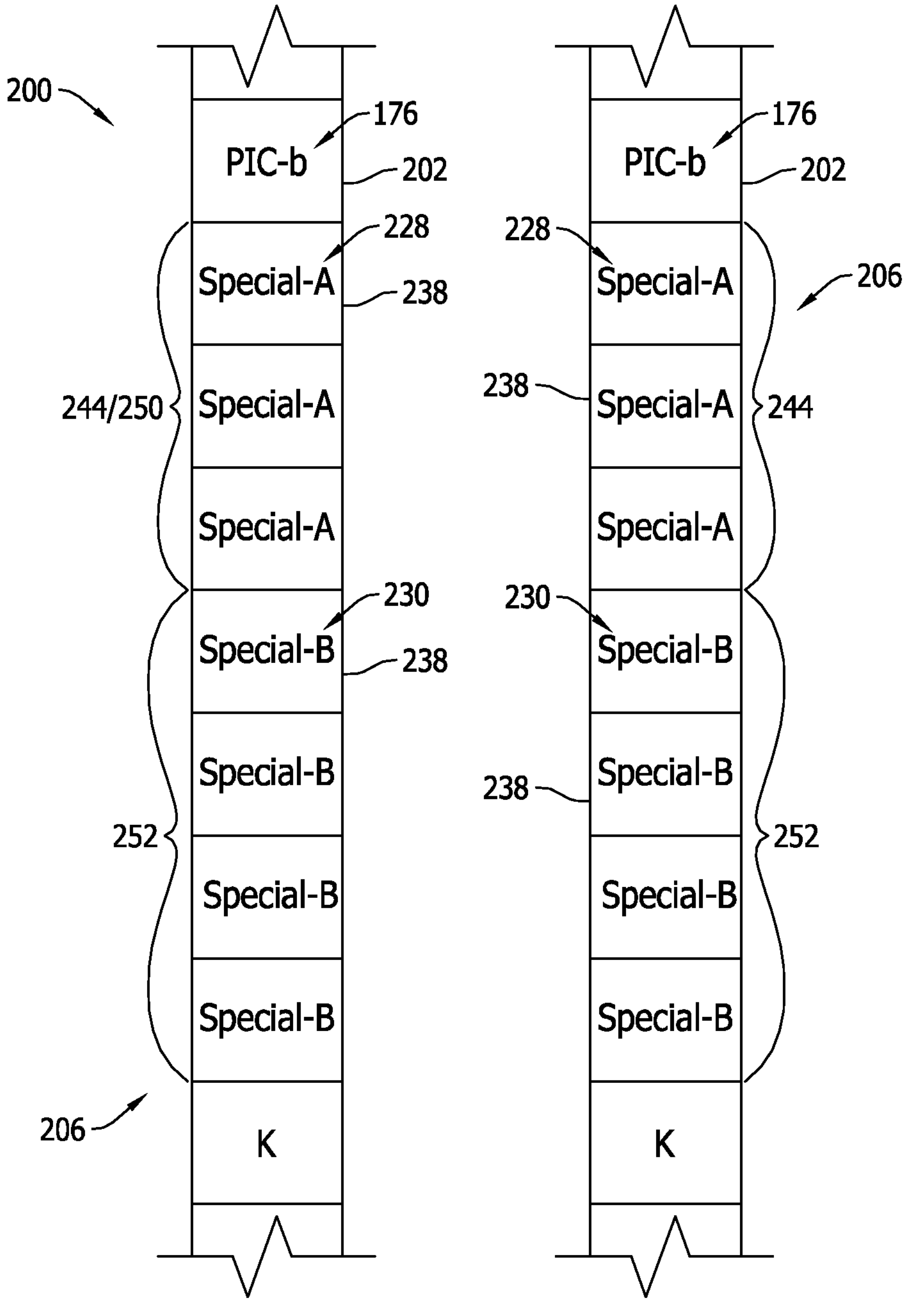
FIG. 67 is a schematic representation of a first reel strip and a second reel strip that may be used with a first reel and a second reel of the video slot game shown in FIG. 57 and FIG. 58, according to an embodiment of the present invention.
Figure 68:
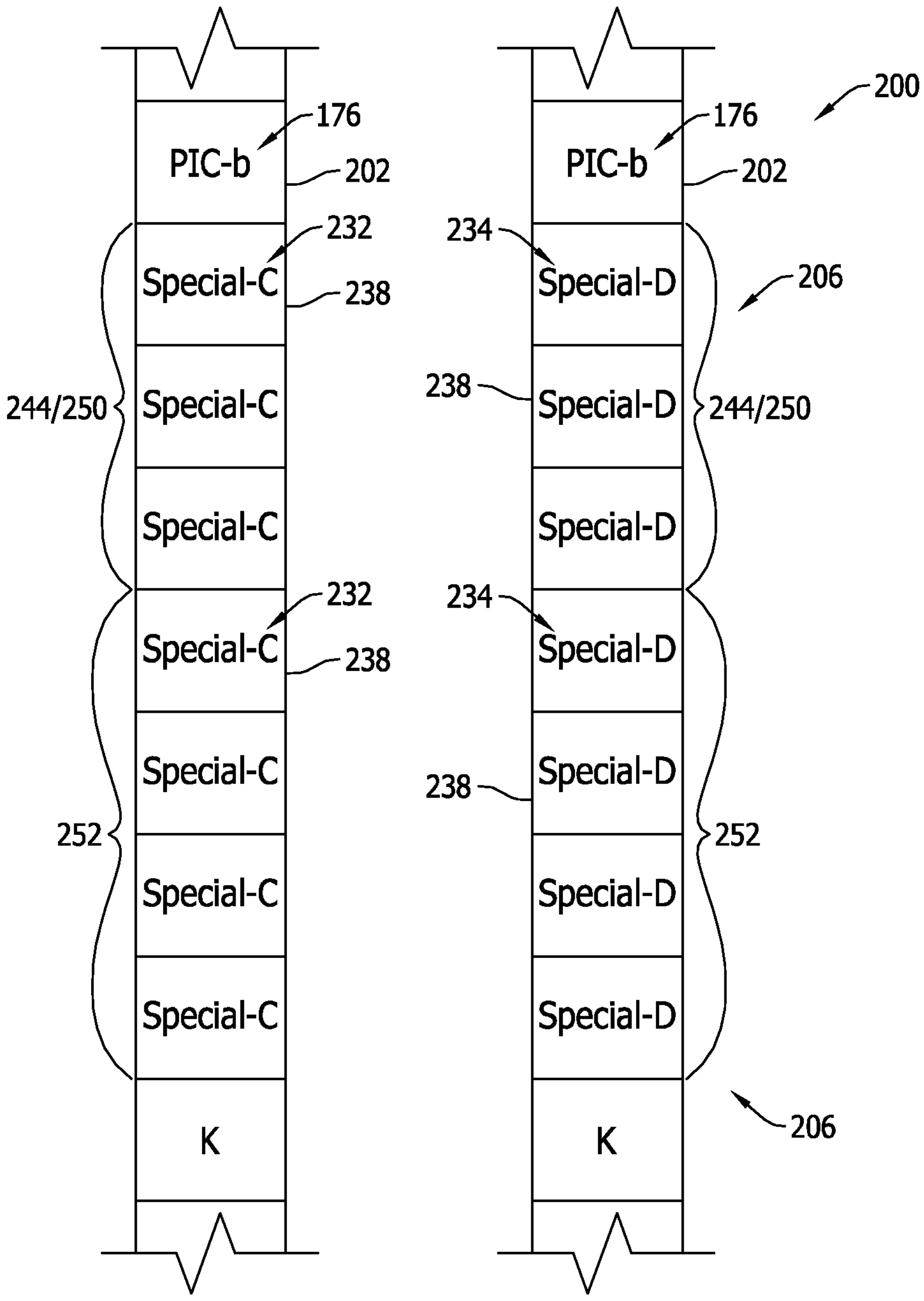
FIG. 68 is another schematic representation of the first and second reels strips shown in FIG. 67.

Referring to FIGS. 67 and 68, in one embodiment, the first reel 214 and the second reel 222 may each include a run 244 of consecutive special symbol positions 238. The first reel 214 includes the first special symbol 228 displayed in each consecutive special symbol positions 238 and the second reel 222 includes the second special symbol 230 displayed in each consecutive special symbol positions 238 in the primary game. In the illustrated embodiment, the gaming controller 106 detects the triggering condition in the primary game outcome if the first trigger symbol 224 is displayed in the first reel 214 and the second trigger symbol 226 is displayed in the second reel 222. Upon detecting the triggering condition, the gaming machine 100 replaces the each first special symbol 228 in the first reel 214 with the third special symbol 232, and replaces the second special symbol 230 with a fourth special symbol 234, represented by a "Special-D" symbol in FIG. 68, to modify the reel features 206 of the first and second reels 214 and 222 for use in the secondary game.

In another embodiment, during the primary game, the first and second reels 214 and 222 may each include a first run 250 of consecutive special symbol positions 238 populated with the first special symbol 228 and a second run 252 of consecutive special symbol positions 238 that are populated with the second special symbol 230. Upon detecting the triggering condition in the primary game outcome including the first trigger symbol 224 displayed with the first reel 214 and the second trigger symbol 226 displayed with the second reel 222, the gaming controller 106 modifies the first reel 214 to display the third special symbol 232 in each of the first reel special symbol positions 238, and modifies the second reel 222 to display the fourth special symbol 234 in each of the second reel special symbol positions 238.

Figure 71:
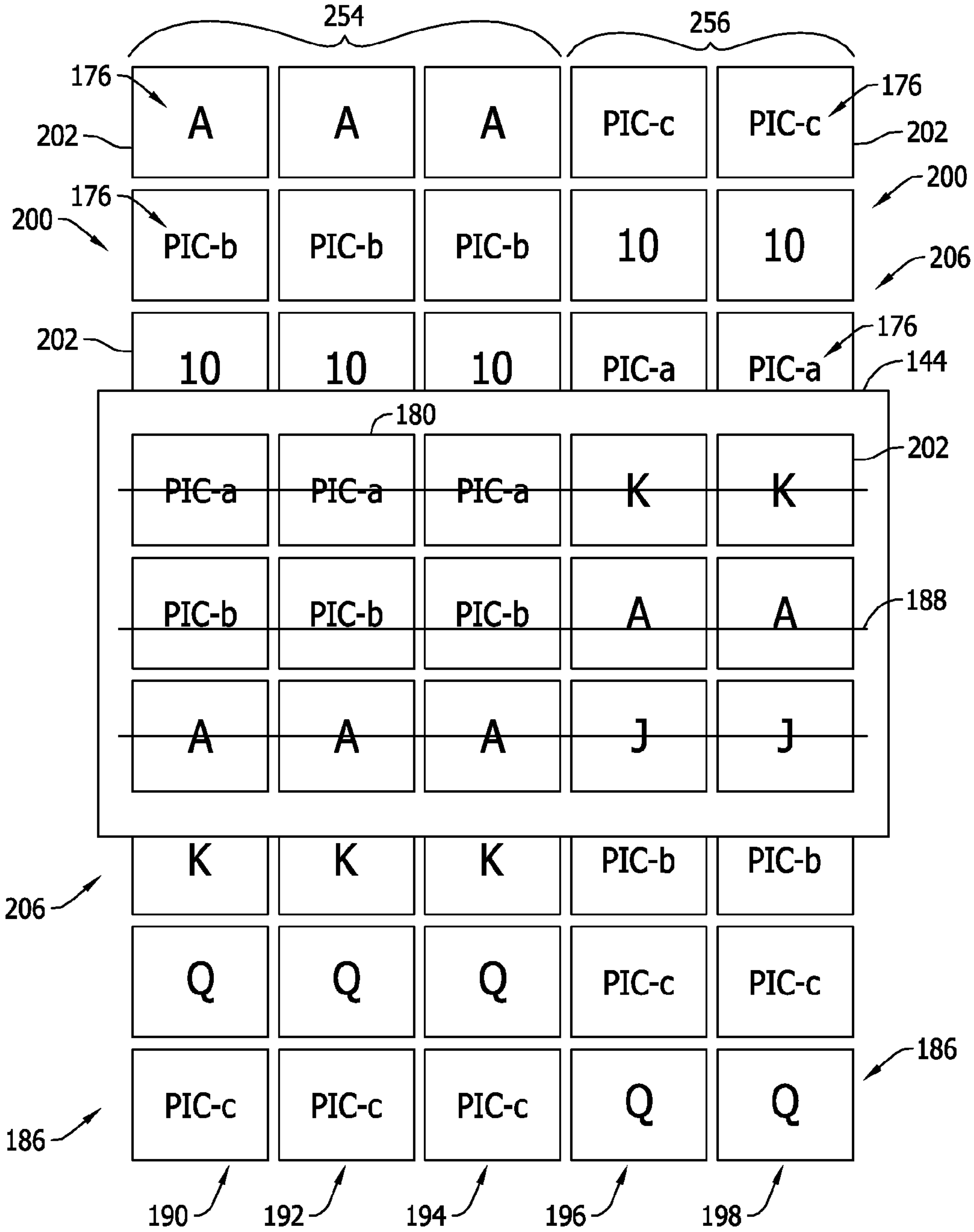
FIG. 71 is another schematic representation of the gaming machine shown in FIG. 57, according to an embodiment, of the present invention.

FIG. 71 is another schematic representation of the gaming machine 100. Referring to FIGS. 58 and 71, in one embodiment, the gaming machine 100 modifies a reel feature 206 of each reel including a corresponding trigger symbol 204 displayed therewith in the primary game outcome. Moreover, the gaming controller 106 may detect the appearance of the trigger symbol 204 in one or more reels 186, and responsively modifies the corresponding reels 186 to synchronize a display of each game symbol 176 in the corresponding reels 186 such that the same game symbols 176 appear in corresponding symbol positions 202 during play of the secondary game. For example, in one embodiment, the gaming controller 106 may detect the appearance of the first trigger symbol 224 in the 1st, 2nd, and 3rd reels 190, 192, and 194 in the primary game outcome. During play of the secondary game, the gaming controller 106 synchronizes the 1st, 2nd, and 3rd reels 190, 192, and 194 such that the same game symbols 176 are displayed in the same symbol positions 202 during rotation of each of the 1st, 2nd, and 3rd reels 190, 192, and 194, and the gaming controller 106 stops each of the 1st, 2nd, and 3rd reels 190, 192, and 194 such that the same game symbols 176 are displayed in the same symbol positions 202 in the display grid 178. In addition, the gaming controller 106 may rotate the 1st, 2nd, and 3rd reels 190, 192, and 194 such that the synchronized game symbols 176 are visible to the player as each reel 186 rotates through the grid 178.

In another embodiment, during the primary game outcome, the gaming controller 106 may detect the appearance of the first trigger symbol 224 in a first set 254 of reels 186 such as, for example, the 1st, 2nd, and 3rd reels 190, 192, and 194, and detects the appearance of the second trigger symbol 226 in a second set 256 of reels 186 such as, for example, the 4th and 5th reels 196 and 198. The gaming controller 106 responsively synchronizes each reel 186 included in the first set 254 such that the same game symbols 176 are displayed in the same symbol positions 202 in each reel 186 in the first set 254, and synchronizes each reel 186 included in the second set 256 such that the same game symbols 176 are displayed in the same symbol positions 202 in each reel 186 of the second set 256.

Figure 72:
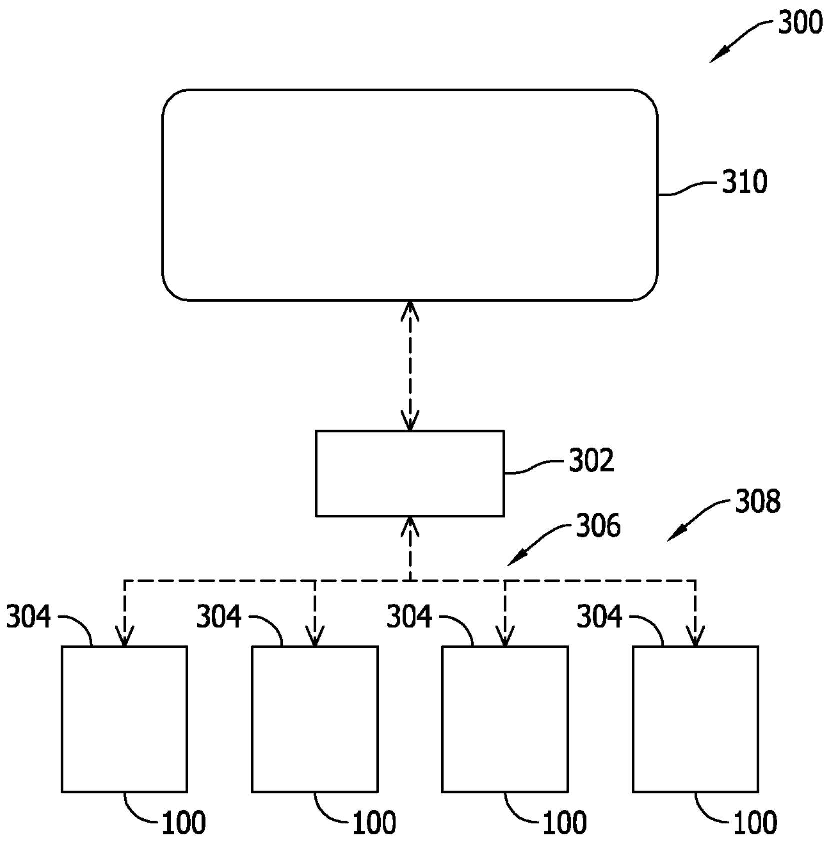
FIG. 72 is a schematic view of an exemplary gaming system of the present invention.
Figure 73:
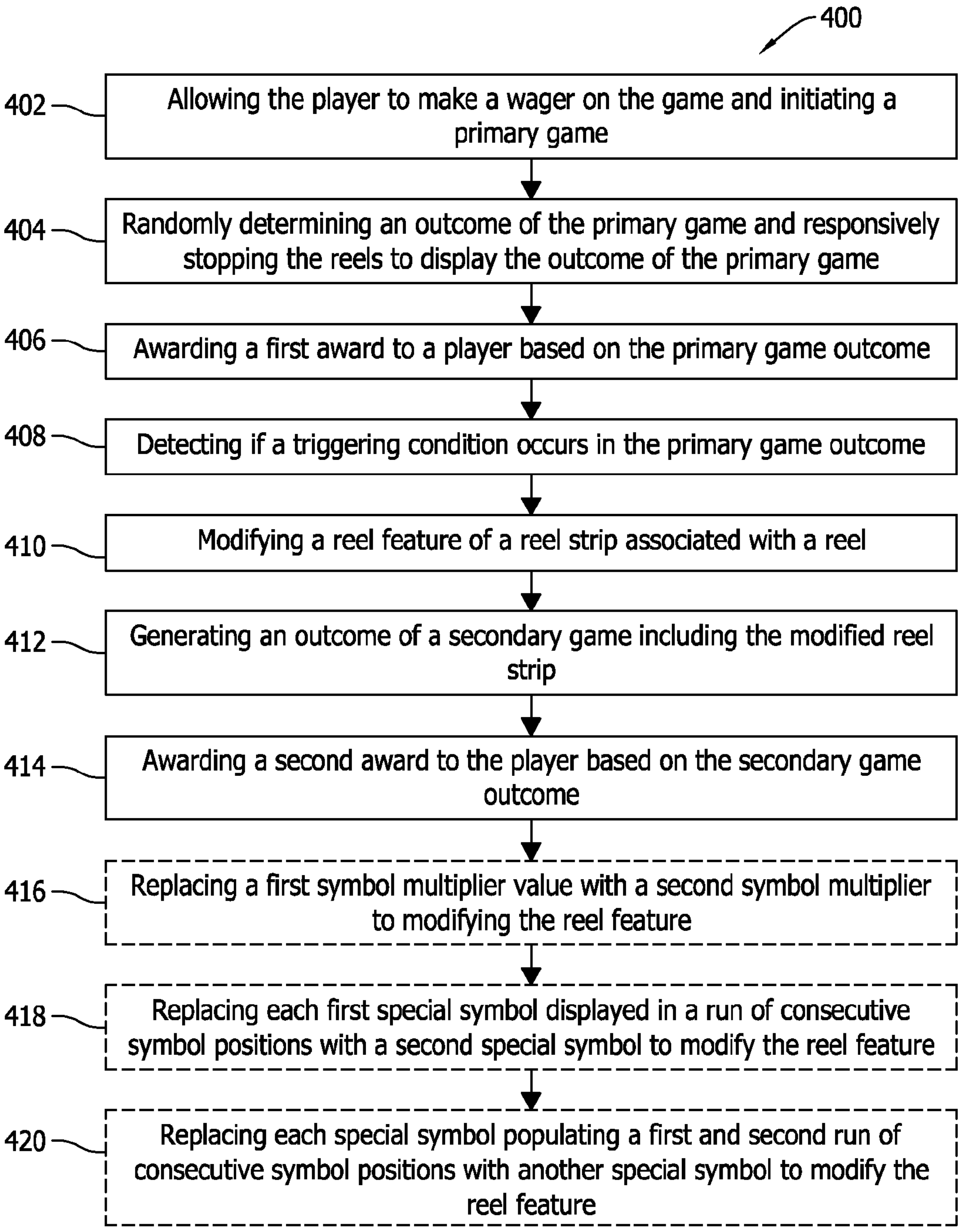
FIG. 73 is a flowchart of an exemplary method of allowing a player to play a gaming machine, according to an embodiment of the present invention.

FIG. 72 is a schematic view of an exemplary gaming system 300. The gaming system 300 includes a system controller 302 and one or more gaming devices 304 that are coupled to the system controller 302. In one embodiment, the gaming device 304 includes the gaming machine 100. In another embodiment, gaming device 304 may include a personal computer, laptop, cell phone, smartphone, tablet computer, personal data assistant, and/or any suitable computing device that enables a player to connect to system controller 302 to play the game 170.

In the illustrated embodiment, the system controller 302 is configured to perform all of the functions of the gaming controller 106 as described herein. The system controller 302 communicates with each gaming device 304 for playing the game 170 on each gaming device 304 based on user selection input received from each gaming device 304. In the illustrated embodiment, the system controller 302 plays a separate instance of the game 170 on each gaming device 304 such that each player associated with the gaming devices 304 may play a separate instance of the game 170 simultaneously.

Referring to FIG. 57, in the illustrated embodiment, the system controller 302 displays the game 170 on at least one of the gaming devices 304. Moreover, the system controller 302 initiates the primary game in response to a user selection input and responsively spins each reel 186 such that the game symbols 176 are visible in the display grid 178 as the reels 186 are spun through the grid 178. The system controller 302 randomly determines an outcome 172 of the primary game, responsively stops each of the reels 186 to display the primary game outcome 172 in the display grid 178, and provides a first award to the player based on the primary game outcome. The system controller 302 detects a triggering condition in the primary game outcome and responsively modifies a reel feature 206 of the reel strip 200 associated with a reel 186 for use in the secondary game. During play of the secondary game, the system controller 302 generates an outcome of the secondary game including the modified reel strip 200 and displays the generated secondary outcome on the display grid.

In the illustrated embodiment, the gaming machines 10 and the system controller 302 are coupled in communication with a local area network (LAN) 306. Alternatively, the gaming machines 100 and the system controller 302 may be coupled via a network such as, for example, an Internet link, an intranet, a WAN, dial-in-connections, cable modems, wireless modems, and/or ISDN lines. In the illustrated embodiment, the gaming system 300 includes four gaming machines 100, which in one embodiment as shown in FIG. 72 are arranged in a bank 308, i.e., are arranged together, adjacently. It should be noted, however, that the gaming system 300 may include any number of gaming machines 100 that may be arranged in any manner, such as in a circle or along a curved arc, or positioned within separate areas of a casino floor, and/or separate gaming establishments such as different casinos. Furthermore, additional groups of gaming machines 100 may be coupled to the system controller 302. In addition, in the illustrated embodiment, the gaming system 300 may also include a central display 310 that is coupled to the system controller 302 for displaying games played on one or more of the gaming machines 100.

In one embodiment, the system controller 302 may be implemented by one of the gaming controllers 106 associated with a gaming machine 100. In still another embodiment, the system controller 302 may be located remotely with respect to gaming machines 100, or within one of the gaming machine cabinet assemblies 108 (shown in FIG. 55).

In one embodiment, the system controller 302 may also determine if a bonus triggering event occurs in a game outcome being played at one or more of the gaming machines 100, and displays a bonus game such as, for example, the game 170 on the central display 310 if the bonus triggering event occurs. Alternatively, the system controller 302 may display the game 170 at one or more gaming machines 100 based on one or more bonus triggering events occurring in games played at the gaming machines 100. The bonus triggering event may be the appearance of a predefined symbol and/or a predefined symbol combination in a game outcome.

FIG. 67 is a flowchart of an exemplary method 400 of providing a slot game to a player. In the illustrated embodiment, the method 400 includes the steps of allowing 402 the player to make a wager on the game and initiating a primary game, randomly determining 404 an outcome of the primary game and responsively stopping the reels to display the outcome of the primary game, and awarding 406 a first award to the player based on the primary game outcome. The method 400 also includes the steps of detecting 408 if a triggering condition occurs in the primary game outcome, responsively modifying 410 a reel feature of a reel strip associated with the at least one reel, generating 412 an outcome of a secondary game including the modified reel strip, and awarding 414 a second award to the player based on the secondary game outcome.

In one embodiment, the method 400 may include replacing 416 a first symbol multiplier value with a second symbol multiplier value that is different than the first multiplier value to modifying the reel feature. In addition, the method 400 may include the step of replacing 418 each first special symbol displayed in a run of consecutive symbol positions with a second special symbol to modify the reel feature of the at least one reel. Moreover, the method 400 may include replacing 420 each special symbol populating a first and second run of consecutive symbol positions with another special symbol to modify the reel feature of the at least one reel.

An exemplary technical effect of the methods, systems, and apparatus described herein includes at least one of (a) displaying game including a plurality of reels, each reel having a reel strip including a plurality of symbol positions and a plurality of game symbols displayed in each of the symbol positions in a predetermined order; (b) allowing the player to make a wager on the game, the game including a primary game and a secondary game; (c) initiating the primary game and responsively spinning the reels; (d) randomly determining an outcome of the primary game and responsively stopping the reels to display the outcome of the primary game, the outcome of the primary game being displayed in a grid, the spinning reels being visible in the grid during play of the game; (e) awarding a first award to the player based on the primary game outcome; (f) detecting if a triggering condition occurs in the primary game outcome, the triggering condition being defined as the at least one trigger symbol being displayed in at least one reel of the plurality of reels in the primary game outcome; (g) responsively modifying a reel feature of a reel strip associated with the at least one reel to generate an outcome of a secondary game including the modified reel strip; and, (h) awarding a second award to the player based on the secondary game outcome.

The above-described system, apparatus, and methods overcome at least some disadvantages of known gaming machines by providing a gaming machine that modifies a reel feature of a reel for use in subsequent games. More specifically, the gaming machine generates and displays a primary game outcome, detects if a triggering condition occurs in the primary game outcome, and responsively modifies a reel feature of a reel strip associated with a reel to generate an outcome of a secondary game that includes the modified reel strip. By providing a gaming machine that modifies a reel feature for use in a bonus game, the player's expectation for achieving a win during the bonus game is increased and the enjoyment of the game is improved. Thus, the amount of time that the game is played by patrons of a gaming establishment is thereby increased.

Exemplary embodiments of a gaming machine, a gaming system, and a method of allowing a player to play a gaming machine are described above in detail. The gaming machine, system, and method are not limited to the specific embodiments described herein, but rather, components of the gaming machine and/or system and/or steps of the method may be utilized independently and separately from other components and/or steps described herein. For example, the gaming machine may also be used in combination with other gaming systems and methods, and is not limited to practice with only the gaming machine as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A method of providing a slot game to a player with a gaming machine that includes an input device, a display device, and a controller including a game program for executing the slot game, including the steps of:

displaying, by the controller on the display device, the slot game including a plurality of reels, each reel having a reel strip including a plurality of symbol positions and a plurality of game symbols displayed in each of the symbol positions in a predetermined order, the plurality of game symbols including at least one trigger symbol;

allowing the player to make a wager on the game with the input device which accepts physical media indicating a monetary value, to make a wager on the game, the game including a primary game and a secondary game;

adjusting, by the controller, a credit balance associated with the player as a function of an amount of the wager;

initiating, by the controller, the primary game and responsively spinning the reels, at least one of the reels having a first run of consecutive special symbol positions and a second run of consecutive special symbol positions, each symbol position included in the first run being populated with an identical first symbol, each symbol position included in the second run being populated with an identical second symbol;

randomly determining, by the controller, an outcome of the primary game and responsively stopping the reels to display the outcome of the primary game, the outcome of the primary game being displayed in a grid, the spinning reels being visible in the grid during play of the game;

awarding a first award to the player based on the primary game outcome and responsively adjusting the credit balance as a function of the award;

detecting if a triggering condition occurs in the primary game outcome, the triggering condition being defined as the at least one trigger symbol being displayed in the at least one reel in the primary game outcome;

selecting a third symbol in response to detecting the triggering condition;

responsively modifying a reel feature of a reel strip associated with the at least one reel including replacing each of the first and second symbols with the selected third symbol to modify the reel feature of the at least one reel;

generating an outcome of the secondary game including the third symbol being displayed in each of the symbol positions included in the first and second runs and spinning and stopping the reels to display the outcome of the secondary game; and, awarding a second award to the player based on the secondary game outcome.

2. A method in accordance with claim 1, the triggering condition being defined as a first trigger symbol being displayed in a first reel and a second trigger symbol being displayed in a second reel, the method including the step of responsively modifying a first reel feature of the first reel and modifying a second reel feature of the second reel.

3. A method in accordance with claim 1, wherein the at least one reel includes at least one special symbol having a first multiplier value, the method includes the step of replacing the first multiplier value with a second multiplier value that is different than the first multiplier value to modify the reel feature of the at least one reel.

4. A method in accordance with claim 3, wherein the at least one special symbol is a wild symbol.

5. A gaming machine, comprising:

a display device for displaying a game, the game including a plurality of reels, each reel having a reel strip including a plurality of symbol positions and a plurality of game symbols displayed in each of the symbol positions in a predetermined order, the plurality of game symbols including at least one trigger symbol;

a user input device configured to generate a signal indicative of a player's selection input and which accepts physical media associated with a monetary value to establish a credit balance; and a controller coupled to the display device and the user input device, the controller for allowing the player to make a wager on the game with the input device and adjust the credit balance by an amount of the wager, the game including a primary game and a secondary game, the controller for initiating the primary game and responsively spinning the reels, randomly determining an outcome of the primary game and responsively stopping the reels to display the outcome of the primary game in a grid, and awarding a first award to the player based on the primary game outcome and responsively adjust the credit balance as a function of the award, at least one of the reels having a first run of consecutive special symbol positions and a second run of consecutive special symbol positions, each symbol position included in the first run being populated with an identical first symbol, each symbol position included in the second run being populated with an identical second symbol, the controller for detecting if a triggering condition occurs in the primary game outcome, the triggering condition being defined as the at least one trigger symbol being displayed in the at least one reel in the primary game outcome, the controller for selecting a third symbol in response to detecting the triggering condition, responsively modifying a reel feature of a reel strip associated with the at least one reel including replacing each of the first and second symbols with the selected third symbol to modify the reel feature of the at least one reel, generating an outcome of the secondary game including the selected third symbol being displayed in each of the symbol positions included in the first and second runs, spinning and stopping the reels to display the outcome of the secondary game, and awarding a second award to the player based on the secondary game outcome.

6. A gaming machine in accordance with claim 5, the triggering condition being defined as a first trigger symbol being displayed in a first reel and a second trigger symbol being displayed in a second reel, the controller for responsively modifying a first reel feature of the first reel and modifying a second reel feature of the second reel.

7. A gaming machine in accordance with claim 5, wherein the at least one reel includes at least one special symbol having a first multiplier value, the controller for replacing the first multiplier value with a second multiplier value that is different than the first multiplier value to modify the reel feature of the at least one reel.

8. A system, comprising:

a user input device configured to generate a signal indicative of a player's selection input and which accepts physical media associated with a monetary value to establish a credit balance;

a plurality of gaming devices, each gaming device including a user input device for accepting a player selection input and a display device for allowing a player to play a game; and a system controller coupled to each gaming device of the plurality of gaming devices for displaying the game including a primary game and a secondary game on at least one of the gaming devices, the game including a plurality of reels, each reel having a reel strip including a plurality of symbol positions and a plurality of game symbols displayed in each of the symbol positions in a predetermined order, the plurality of game symbols including at least one trigger symbol, the system controller for initiating the primary game based on the player selection input and responsively spinning the reels, the plurality of reels including at least one reel having a first run of consecutive special symbol positions and a second run of consecutive special symbol positions, each symbol position included in the first run being populated with an identical first symbol, each symbol position included in the second run being populated with an identical second symbol in the primary game, the system controller for randomly determining an outcome of the primary game and responsively stopping the reels to display the outcome of the primary game in a grid, and awarding a first award to the player based on the primary game outcome, the system controller for detecting if a triggering condition occurs in the primary game outcome, the triggering condition being defined as the at least one trigger symbol being displayed in the at least one reel in the primary game outcome, the system controller for selecting a third symbol in response to detecting the triggering condition, responsively modifying a reel feature of a reel strip associated with the at least one reel including replacing each of the first and second symbols with the selected third special symbol to modify the reel feature of the at least one reel, generating an outcome of the secondary game including the selected third symbol being displayed in each of the symbol positions included in the first and second runs, spinning and stopping the reels to display the outcome of the secondary game, and awarding a second award to the player based on the secondary game outcome.

* * * * *